United States Patent
Wilson et al.

(10) Patent No.: US 12,026,887 B2
(45) Date of Patent: Jul. 2, 2024

(54) PROCESSING THREE-DIMENSIONAL (3D) ULTRASOUND IMAGES

(71) Applicants: Case Western Reserve University, Cleveland, OH (US); UH Cleveland Medical Center, Cleveland, OH (US)

(72) Inventors: David L. Wilson, Cleveland Heights, OH (US); Hao Wu, Cleveland, OH (US); Tahseen Minhaz, Cleveland, OH (US); Faruk Orge, Cleveland, OH (US); Richard Helms, Cleveland, OH (US); Juhwan Lee, Cleveland, OH (US)

(73) Assignees: Case Western Reserve University, Cleveland, OH (US); UH Cleveland Medical Center, Cleveland, OH (US)

( * ) Notice: Subject to any disclaimer, the term of this patent is extended or adjusted under 35 U.S.C. 154(b) by 396 days.

(21) Appl. No.: 17/403,994

(22) Filed: Aug. 17, 2021

(65) Prior Publication Data
US 2021/0383548 A1     Dec. 9, 2021

Related U.S. Application Data

(63) Continuation of application No. PCT/US2020/018958, filed on Feb. 20, 2020.

(60) Provisional application No. 62/808,435, filed on Feb. 21, 2019.

(51) Int. Cl.
    G06K 9/00     (2022.01)
    G06T 7/11     (2017.01)
(52) U.S. Cl.
    CPC ...... G06T 7/11 (2017.01); *G06T 2207/10136* (2013.01); *G06T 2207/20081* (2013.01);
    (Continued)

(58) Field of Classification Search
    CPC ............. G06T 7/11; G06T 2207/10136; G06T 2207/20081; G06T 2207/20084;
    (Continued)

(56) References Cited

U.S. PATENT DOCUMENTS

| | | |
|---|---|---|
| 2010/0234080 A1 | 9/2010 | Holman, IV et al. |
| 2018/0089834 A1 | 3/2018 | Spizhevoy et al. |

(Continued)

FOREIGN PATENT DOCUMENTS

WO     2018064248 A1     4/2018

OTHER PUBLICATIONS

International Preliminary Report on Patentability dated Aug. 10, 2021 for International Application No. PCT/US2020/018958.
(Continued)

*Primary Examiner* — Dhaval V Patel
(74) *Attorney, Agent, or Firm* — Eschweiler & Potashnik, LLC

(57) ABSTRACT

A first set of embodiments relates to an apparatus comprising one or more processors configured to: access three-dimensional (3D) ultrasound imaging of an eye; generate at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging; compute at least one clinical metric associated with the at least one segmented ocular structure based on the at least one segmented ocular structure; and display at least one of: the at least one segmented ocular structure, the at least one clinical metric, the 3D ultrasound imaging, or at least one portion of the 3D ultrasound imaging.

26 Claims, 38 Drawing Sheets

(52) U.S. Cl.
CPC .............. *G06T 2207/20084* (2013.01); *G06T 2207/20182* (2013.01); *G06T 2207/30041* (2013.01)

(58) Field of Classification Search
CPC . G06T 2207/20182; G06T 2207/30041; G06T 2200/04; G06T 2200/24; G06T 2207/20192; G06T 5/002; G06T 7/0012; G06T 7/62
See application file for complete search history.

(56) References Cited

U.S. PATENT DOCUMENTS

| | | |
|---|---|---|
| 2018/0344293 A1 | 12/2018 | Raju et al. |
| 2019/0282086 A1 | 9/2019 | Cohen et al. |
| 2020/0234080 A1 | 7/2020 | Ciller Ruiz et al. |
| 2020/0305706 A1* | 10/2020 | Amil Marletti ... G06F 18/24147 |
| 2021/0082184 A1* | 3/2021 | Claessen ................... G06N 3/08 |
| 2021/0133932 A1* | 5/2021 | Lee ........................... G06T 7/90 |

OTHER PUBLICATIONS

Jifara et al. "Medical Image Denoising Using Convolutional Neural Network: A Residual Learning Approach" J. Supercomput (2019) 75:704-718, published Jun. 1, 2017.

International Search Report & Written Opinion of the International Searching Authority dated May 4, 2020 for International Application No. PCT/US2020/018958.

Communication Pursuant to Article 94(3) EPC dated Feb. 28, 2024 for European Application No. 20713441.2.

* cited by examiner

PROCESSING THREE-DIMENSIONAL (3D) ULTRASOUND IMAGES

CROSS REFERENCE TO RELATED APPLICATIONS

This application is a Continuation of International Patent Application number PCT/US2020/018958, filed on Feb. 20, 2020, which claims priority to U.S. Provisional Application 62/808,435, filed on Feb. 21, 2019. The contents of the above-referenced Patent Applications are hereby incorporated by reference in their entirety.

BACKGROUND

Glaucoma affects over 2.7 million people in the United States. Glaucoma is a leading cause of irreversible blindness. In pediatric practice, one the most complex conditions is childhood glaucoma. An affected child typically needs over three surgeries per eye, and further diagnostic exams conducted under anesthesia. The region of the human eye behind the light-opaque iris plays a critical role in glaucoma. Blockage of Schlemm's canal, which leads to reduced fluid drainage, may further lead to severe glaucoma. Existing approaches to acquiring ultrasound imaging of the eye, pre-processing ultrasound imaging of the eye, processing ultrasound imaging of the eye, segmenting an ocular structure represented in ultrasound imaging of the eye, computing clinical metrics related to an ocular structure represented in ultrasound imaging of the eye, or visualizing ultrasound imaging of the eye, including, for example, the region behind the light-opaque iris, are underutilized at least because of a lack of clinical expertise, and the need for a dedicated clinical ultrasonographer.

BRIEF DESCRIPTION OF THE DRAWINGS

The accompanying drawings, which are incorporated in and constitute a part of the specification, illustrate various example operations, apparatus, circuits, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that, in some examples, one element may be designed as multiple elements or that multiple elements may be designed as one element. In some examples, an element shown as an internal component of another element may be implemented as an external component and vice versa. Furthermore, elements may not be drawn to scale.

BRIEF SUMMARY

Figure 1:
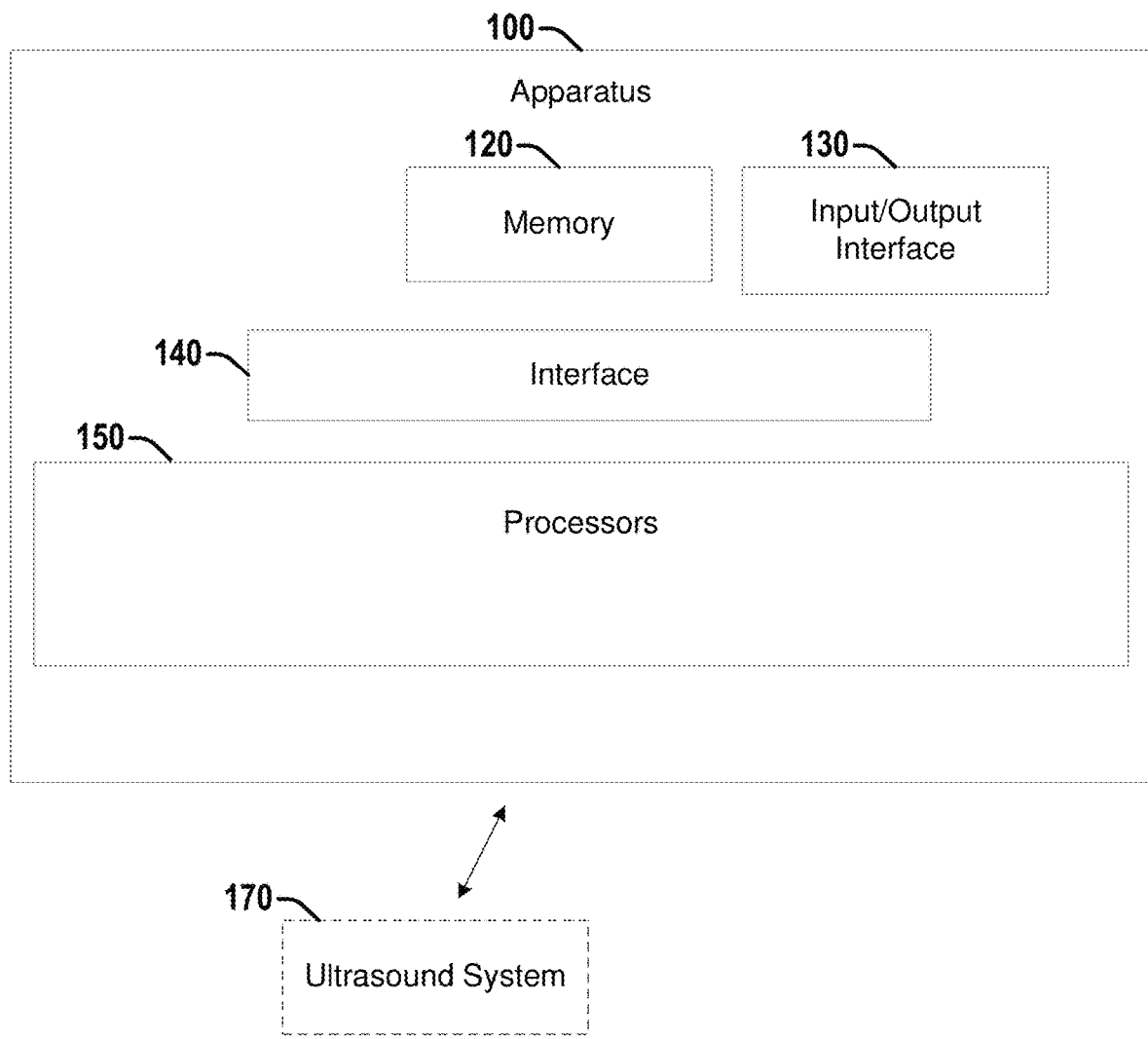
FIG. 1 illustrates an example apparatus for processing or analyzing three-dimensional (3D) ultrasound images according to various embodiments described herein.

Disclosed herein are apparatus, operations, systems, circuits, methods, or other embodiments for acquiring, processing, display or visualization, or analysis of, ultrasound imaging of the eye, including three dimensional (3D) ultrasound imaging of the human eye. In accordance with an aspect, one embodiment comprises an apparatus comprising one or more processors configured to: access three-dimensional (3D) ultrasound imaging of an eye; generate at least one segmented ocular structure by segmenting at least one ocular structure represented in the 3D ultrasound imaging using at least one deep learning ocular structure segmentation model configured to generate a predicted segmentation volume of the ocular structure based on the 3D ultrasound imaging; compute at least one clinical metric associated with the at least one segmented ocular structure based on the at least one segmented ocular structure; and display at least one of: the 3D ultrasound imaging, the at least one segmented ocular structure, or the at least one clinical metric. In accordance with an aspect, in one embodiment, the one or more processors are configured to: align at least one portion of the 3D ultrasound imaging to reduce misalignment among the 3D ultrasound imaging. In accordance with an aspect, in one embodiment, the one or more processors are configured to: noise-reduce the 3D ultrasound imaging. In accordance with an aspect, in one embodiment, the one or more processors are configured to: generate a 3D volume rendering based on the 3D ultrasound imaging using a gradient-based optical transfer function (OTF) opacity enhancement ray casting approach. In accordance with an aspect, in one embodiment, the one or more processors are configured to display the 3D volume rendering.

DETAILED DESCRIPTION

Various embodiments may employ apparatus, operations, systems, processors, circuits, methods, or other techniques discussed herein for acquiring, processing, display or visualization, or analysis of ultrasound imagery of the eye, including three dimensional (3D) ultrasound imaging of an eye or a portion of the 3D ultrasound imaging, including, for example, 2D ultrasound imaging of the eye. Embodiments discussed herein can provide improved processing, display or visualization, or analysis of ocular structures in a variety of pathologies, including glaucoma, to further facilitate improved analysis of pathophysiology, treatment planning, or treatment results assessment. Embodiments can provide improved processing, display or visualization, or analysis of ocular structures in ultrasound imagery via any technique or combination of techniques described herein, including pre-processing of ultrasound imagery, segmentation of ocular structures represented in ultrasound imagery, generation of a 3D volume rendering, display or visualization of ultrasound imaging including a 3D volume rendering, quantification of clinical metrics associated with ocular structures represented in ultrasound imaging, or the provision of a specific, structured graphical user interface that improves the workflow in performing various techniques described herein.

Embodiments facilitate improved pre-processing of ultrasound imaging of the eye, and can thereby facilitate improved 3D volume rendering of the eye, and facilitate improved segmentation of ocular structures represented in the 3D ultrasound imaging, and further facilitate improved quantification of values associated with the segmented ocular structures represented in the 3D ultrasound imaging, as well as facilitating improved display or visualization of the ultrasound imaging, the pre-processed ultrasound imaging, the 3D volume rendering, or segmented ocular structures represented in the 3D ultrasound imaging. Embodiments may facilitate improved pre-processing of ultrasound imagery of the eye via reducing the effects of eye movement during image acquisition via various image alignment techniques described herein, by reducing noise in ultrasound imagery of the eye via various noise reduction techniques described herein, including deep learning noise reduction, by generating Schlemm's canal enhanced image volumes via various techniques described herein, including deep learning noise reduction, or by extraction of radial images from 3D ultrasound imaging via various techniques described herein. Embodiments may facilitate improved noise reduction in ultrasound imagery of the eye via various noise reduction techniques described herein via improved training of a deep learning noise reduction model according to various techniques described herein. Embodiments may facilitate improved training of a deep learning noise reduction model via improved acquisition of or generation of training data, including low-noise training data or noisy training data, for training a deep learning noise reduction model according to various techniques described herein.

Embodiments facilitate improved segmentation of ocular structures represented in ultrasound imagery of the eye through various techniques described herein. Embodiments may facilitate improved segmentation of ocular structures represented in ultrasound imagery of the eye via deep learning segmentation of the anterior chamber, via deep learning segmentation of tumors or other ocular abnormalities or pathologies represented in ultrasound imagery of the eye, or via deep learning segmentation of Schlemm's canal or a collecting channel represented in ultrasound imagery of the eye. Embodiments may facilitate improved segmentation of ocular structures represented in ultrasound imagery of the eye through various techniques described herein via improved training of a deep learning segmentation model, including, for example, a deep learning Schlemm's canal segmentation model, a deep learning anterior chamber segmentation model, or a deep learning ocular abnormality segmentation model, according to various techniques described herein. Embodiments may facilitate improved training of a deep learning segmentation model via improved acquisition of or generation of training data for training a deep learning segmentation model according to various techniques described herein.

Embodiments facilitate improved computation, quantification, or display of clinical metrics associated with a patient, including values associated with ocular structures represented in ultrasound imagery of the eye, according to various techniques described herein. Embodiments may facilitate improved quantification of values associated with ocular structures represented in ultrasound imagery of the eye via improved measurement of the iridocorneal angle via improved segmentation of the anterior chamber according to various techniques described herein. Embodiments may facilitate improved measurement of the iridocorneal angle via improved detection of a location of a Schwalbe's line or a scleral spur represented in ultrasound imaging, according to various techniques described herein. Embodiments may facilitate improved quantification of values associated with ocular structures represented in ultrasound imagery of the eye via computation of other values associated with the anterior chamber, including a volume of the anterior chamber or area of the anterior chamber via improved segmentation of the anterior chamber according to various techniques described herein. Embodiments may facilitate improved quantification of values associated with ocular structures represented in ultrasound imagery of the eye via computation of values associated with a Schlemm's canal or a collecting channel segmented according to various techniques described herein, including, for example, a cross sectional area of Schlemm's canal, a number of collecting channels, or a volume of a collecting channel.

Embodiments facilitate improved display or visualization of ultrasound imagery of the eye according to various techniques described herein. Embodiments facilitate improved display or visualization of ultrasound imagery of the eye via generating a 3D volume rendering via a 3D volume rendering ray casting approach that employs transfer functions, including a gradient-based optical transfer function, that provide improved 3D views of ocular structures, including, for example, the anterior chamber, Schlemm's canal, collecting channels, the ciliary body, ciliary process, iris, cornea, sclera, tumor, or other structures of interest. Embodiments may further facilitate improved treatment strategy via improved display or visualization of ocular structures of interest represented in the improved 3D volume rendering according to various techniques described herein.

Embodiments described herein may facilitate improved diagnosis of ocular diseases or ocular injuries, improved planning of therapies, or improved observation of or quantification of effects of treatments, at least via improved pre-processing of ultrasound imagery, improved segmentation of ocular structures represented in ultrasound imaging, improved generation of a 3D volume rendering of the eye, display or visualization of ultrasound imaging, computation, quantification, or display of properties associated with ocular structures represented in ultrasound imaging, including for example, clinical metrics, or the provision of a specific, structured graphical user interface that improves ophthalmological workflow in performing various techniques described herein, according to various techniques described herein. Embodiments may facilitate generation of en face views of the eye that cannot be obtained with existing ultrasound approaches, via various techniques described herein including via improved generation of a 3D volume rendering using a ray-casting volume rendering technique via at least one gradient-based optical transfer function (OTF). Embodiments may facilitate more accurate and faster diagnosis of ocular diseases or injuries, improved selection or planning of therapies, and improved observation or quantification of the effect of therapies compared to existing approaches, via various techniques described herein. Embodiments may facilitate improved planning and guidance of surgical interventions, including glaucoma surgeries, ocular tumor treatments, or cataract surgery, via improved 3D volume rendering, improved segmentation of ocular structures, improved quantification of clinical metric associated with segmented ocular structures, providing improved speed, confidence, and success rates over existing approaches, via various techniques described herein. Embodiments may facilitate improved assessment of medical, surgical, or drug treatment strategies through more frequent examination of tumor volumes via various techniques described herein. Embodiments may facilitate improved assessment of the iridocorneal angle in three dimensions, facilitating improved assessment of the type and severity of glaucoma, via various techniques described herein.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities. Such actions and processes are not practically performed in the human mind or via pencil and paper.

Example apparatus, operations, methods, systems, techniques, approaches, or other embodiments may be better appreciated with reference to flow diagrams. While for purposes of simplicity of explanation, the illustrated methodologies or operations are shown and described as a series of blocks, it is to be appreciated that the methodologies or operations are not limited by the order of the blocks, as some blocks can occur in different orders and/or concurrently with other blocks from that shown and described. Moreover, less than all the illustrated blocks may be required to implement an example methodology, operations, technique, or other embodiment. Blocks may be combined or separated into multiple components. Furthermore, additional and/or alternative methodologies can employ additional, not illustrated blocks.

While FIGS. 1-38 may illustrate various actions occurring in serial, it is to be appreciated that various actions illustrated in FIGS. 1-38, could occur substantially in parallel. By way of illustration, a first process could involve denoising a portion of a 3D ultrasound imaging, a second process could involve aligning a portion of a 3D ultrasound imaging, and a third process could involve segmenting an ocular structure represented in a portion of a 3D ultrasound imaging. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer, processor) cause the machine to perform methods or operations described or claimed herein including operations 200, 800, 900, 1000, 1100, 1200, 1600, 1800, 1900, 2000, 2200, 2300, 2400, 2700, 2800, 3000, 3100, 3300, 3400, 3500, or 3600, or any other operations, methods, processes, approaches, or techniques described herein. While executable instructions associated with the listed methods, operations, techniques, or approaches are described as being stored on a computer-readable storage device, it is to be appreciated that executable instructions associated with other example methods, operations, techniques, or approaches described or claimed herein may also be stored on a computer-readable storage device. In different embodiments the example methods or operations described herein may be triggered in different ways. In one embodiment, a method or operation or process may be triggered manually by a user. In another example, a method or operation may be triggered automatically. Techniques and aspects of various embodiments are further explained below, in connection with an example embodiment that facilitates at least automatically segmenting an ocular structure represented in 3D ultrasound imaging of an eye.

FIG. 1 illustrates an example apparatus 100. Apparatus 100 comprises a memory 110 configured to store instructions that when executed control a processor to perform operations. Memory 110 may configured to store an ultrasound image of an eye. The ultrasound image may be associated with a patient. Apparatus 100 also comprises an input/output (I/O) interface 130. Apparatus 100 also comprises one or more processors 150. Apparatus 100 also comprises an interface 140 that connects the memory 110, the I/O interface 130, and the one or more processors 150. In one embodiment, apparatus 100 may be operably connected with an optional ultrasound system 170, or configured to transmit data to or receive data from ultrasound system 170, or may be practically integrated with ultrasound system 170.

Memory 110 is configured to store instructions that when executed control a processor to perform operations. Memory 110 may be configured to store an ultrasound image of an eye, including 3D ultrasound imaging. The ultrasound image may be associated with a patient. 3D ultrasound imaging may comprise at least an ultrasound image. An ultrasound image has a plurality of pixels, a pixel having an associated intensity. An associated intensity may comprise, for example, a grayscale level intensity. For example, an ultrasound image may comprise a 2D ultrasound image which may comprise a plurality of pixels. A 3D ultrasound imaging may comprise a plurality of voxels, a voxel having an associated intensity. A pixel or voxel may also have an associated opacity value, color value, or other associated value. Memory 110 may be configured to store information associated with a patient associated with an image stored in memory 110, including clinical information associated with the patient. Memory 110 may be configured to store a deep learning model including, for example, a deep learning noise reduction model, or a deep learning ocular structure segmentation model.

I/O interface 130 may be configured to transfer data between memory 110, one or more processors 150, and external devices, for example, an ultrasound system. In one embodiment, an ultrasound system may comprise, for example, ultrasound system 300, wherein ultrasound system 170 comprises a 2D ultrasound system, a 3D ultrasound system, a linear scan ultrasound system, a gimballed scan ultrasound system, a phased array 3D ultrasound system, a freehand 3D ultrasound system, a 3D ultrasound biomicroscopy (UBM) system. In various embodiments described herein, an external device may comprise a computer assisted diagnosis (CADx) system, a glaucoma analysis system, a personalized medicine system, a database, a non-transitory computer-readable storage device, or the cloud.

A processor(s) as employed by embodiments described herein may include any combination of general-purpose processors and dedicated processors (e.g., graphics processors, application processors, etc.). The processors may be coupled with or may include memory or storage and may be configured to execute instructions stored in the memory or storage to enable various systems, apparatus, applications, or operating systems to perform the operations or methods described herein. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage. A processor(s) as employed herein may be operably connected to or integrated with at least one of: a linear scan ultrasound system, a gimballed scan ultrasound system, a phased array 3D ultrasound system, a freehand 3D ultrasound system, or a 3D ultrasound biomicroscopy (UBM) ultrasound system. A processor(s) may be coupled with or operably connected to a user interface including, for example, a graphical user interface (GUI). A processor(s) may be configured to receive input from the user interface. A processor(s) may be configured to, in response to receipt of input from the user interface, change an operating parameter associated with the processor(s) or a device with which the processor(s) is operably connected to or integrated with.

The one or more processors 150 may be configured to access 3D ultrasound imaging of an eye. The 3D ultrasound imaging may be associated with a patient. 3D ultrasound imaging of an eye may comprise a plurality of voxels, a voxel having an associated intensity or other value. The 3D ultrasound imaging may, in one example, comprise at least one 2D ultrasound image of the eye. A 2D ultrasound image may comprise a plurality of pixels, a pixel having an associated intensity, or other value. A 2D ultrasound image may be referred to herein as a slice, or as a scan. The 3D ultrasound imaging may define a 3D volume in Cartesian (x, y, z) co-ordinates, or in radial (θ, r, z) co-ordinates. In one embodiment, the 3D ultrasound imaging is acquired using at least one of a: a linear scan acquisition technique, a gimballed scan acquisition technique, a phased array 3D ultrasound acquisition technique, a freehand 3D ultrasound acquisition technique, or a 3D ultrasound biomicroscopy (UBM) acquisition technique according to various techniques described herein. In one embodiment, the 3D ultrasound imaging may be acquired concurrently with or prior to the operation of apparatus 100. Accessing 3D ultrasound imaging includes acquiring electronic data, reading from a computer file, receiving a computer file, reading from a computer memory, or other computerized activity not practically performed in a human mind.

Embodiments described herein, including apparatus 100, or other embodiments described herein, may control an ultrasound system, for example ultrasound system 170, to acquire ultrasound imagery of a region of tissue, for example, of an eye associated with a patient, or of a cadaver eye, or may be practically integrated as part of an ultrasound system configured to acquire ultrasound imagery of a region of tissue. Example embodiments may include processors, circuits, systems, or apparatus configured to acquire 3D ultrasound imagery by controlling an ultrasound system, for example a 2D ultrasound system, to mechanically sweep across an eye, including for example, an eye of a patient, or a cadaver eye. For example, one or more processors 150, or other circuits, logics, systems, operations, or apparatus described herein, may be configured to control an ultrasound system to acquire ultrasound imaging according to various techniques described herein.

In one embodiment, the one or more processors 150 are configured to align at least one portion of the 3D ultrasound imaging to reduce misalignment among the at least one portion of the 3D ultrasound imaging. In one embodiment, aligning at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique. Aligning at least one portion of the 3D ultrasound imaging may, in one example, comprise aligning a first portion of the 3D ultrasound imaging, for example, a first 2D ultrasound image, with a second, different portion of the 3D ultrasound imaging, for example, a second, different 2D ultrasound image using at least one of: a pairwise alignment technique, a pairwise-model alignment technique, a pairwise-orthogonal alignment technique, a full-orthogonal alignment technique, or a 3D grayscale alignment with a normalized cross correlation objective function technique. The one or more processors 150 may be configured to align at least one portion of the 3D ultrasound imaging according to various techniques described herein, including, for example, operations 800, 900, 1000, or 1100.

In one embodiment, the one or more processors 150 are configured to noise-reduce the 3D ultrasound imaging. In one embodiment, noise-reducing the 3D ultrasound imaging comprises noise-reducing the 3D ultrasound imaging or a portion of the 3D ultrasound imaging using at least one of: a rotational frames averaging noise reduction technique, an edge preserving filters noise reduction technique, a median kernel and center-weighted linear filter noise reduction technique, or at least one deep learning noise reduction model. In one embodiment, the at least one deep learning noise reduction model may comprise a convolutional neural network (CNN) configured to reduce noise on at least a portion of the 3D ultrasound imaging. The one or more processors 150 may be configured to noise-reduce the 3D ultrasound imaging or a portion of the 3D ultrasound imaging according to various techniques described herein, including, for example, operations 1900, or 3300.

In one embodiment, the one or more processors 150 are configured to train the at least one deep learning noise reduction model. In one embodiment, the one or more processors 150 are configured to generate at least one deep learning noise reduction model training set, wherein training the at least one deep learning noise reduction model comprises training the at least one deep learning noise reduction model with the at least one deep learning noise reduction model training set. A deep learning noise reduction training set may comprise, for example, at least one low noise ideal image (e.g., ground truth), and at least one noisy image associated with the at least one low noise ideal image. The one or more processors 150 may be configured to train the at least one deep learning noise reduction model according to various techniques described herein, including, for example, operations 2300, 3100, or 3600.

In one embodiment, the at least one ocular structure comprises Schlemm's canal and collecting ducts. In this embodiment, wherein the at least one ocular structure comprises Schlemm's canal and collecting ducts, generating the at least one deep learning noise reduction model training set comprises generating a Schlemm's canal enhanced noise reduction training set comprising at least one set of noise-reduced 3D ultrasound imaging of eyes, wherein at least one of the eyes have been injected with an intraocular contrast agent. The one or more processors 150 may be configured to generate the Schlemm's canal enhanced noise reduction training set according to various techniques described herein, including, for example, operations 3400. In one embodiment, at least one of the eyes has been injected with an intraocular agent prior to or concurrent with the operation of apparatus 100 or other systems, apparatus, operations, methods, or techniques described herein. Injecting an eye represented in the set of 3D ultrasound images with an intraocular agent may facilitate raising the intraocular pressure and distend or dilate Schlemm's canal and collecting channels, which may facilitate improved visualization, segmentation, or assessment of Schlemm's canal and collecting channels.

In one embodiment, the one or more processors 150 are configured to generate at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging. An ocular structure may comprise, for example, an anterior chamber, a Schlemm's canal or collecting channel, an ocular abnormality, an iris, a ciliary process, or other ocular structure. In one embodiment, the at least one deep learning ocular structure segmentation model comprises: a first deep learning ocular structure segmentation model configured to accept at least one portion of the 3D ultrasound imaging in Cartesian (x, y, z) coordinates as an input, and configured to generate a first predicted segmentation volume of the ocular structure based on the at least one portion of the 3D ultrasound imaging in Cartesian (x, y, z) coordinates; or a second, different deep learning ocular structure segmentation model configured to accept at least one portion of the 3D ultrasound imaging in (θ, r, z) coordinates as an input, and configured to generate a second predicted segmentation volume of the ocular structure based on the at least one portion of the 3D ultrasound imaging in (θ, r, z) coordinates. The one or more processors 150 may be configured to generate the at least one segmented ocular structure according to various techniques described herein, including, for example, operations 2200, 3000, or 3500. In one embodiment, the first deep learning ocular structure segmentation model comprises a convolutional neural network (CNN) configured to generate a first predicted segmentation volume of the ocular structure based on the at least one portion of the 3D ultrasound imaging in Cartesian (x, y, z) coordinates. In one embodiment, the second deep learning ocular structure segmentation model comprises a CNN configured to generate a second predicted segmentation volume of the ocular structure based on the at least one portion of the 3D ultrasound imaging in (θ, r, z) coordinates.

In one embodiment, wherein the at least one deep learning ocular structure segmentation model comprises the first deep learning ocular structure segmentation model and the second deep learning ocular structure segmentation model, generating the at least one segmented ocular structure comprises computing a weighted average of the first predicted segmentation volume and the second predicted segmentation volume. In another embodiment, generating the at least one segmented ocular structure comprises computing an average of the first predicted segmentation volume and the second predicted segmentation volume.

Figure 32:
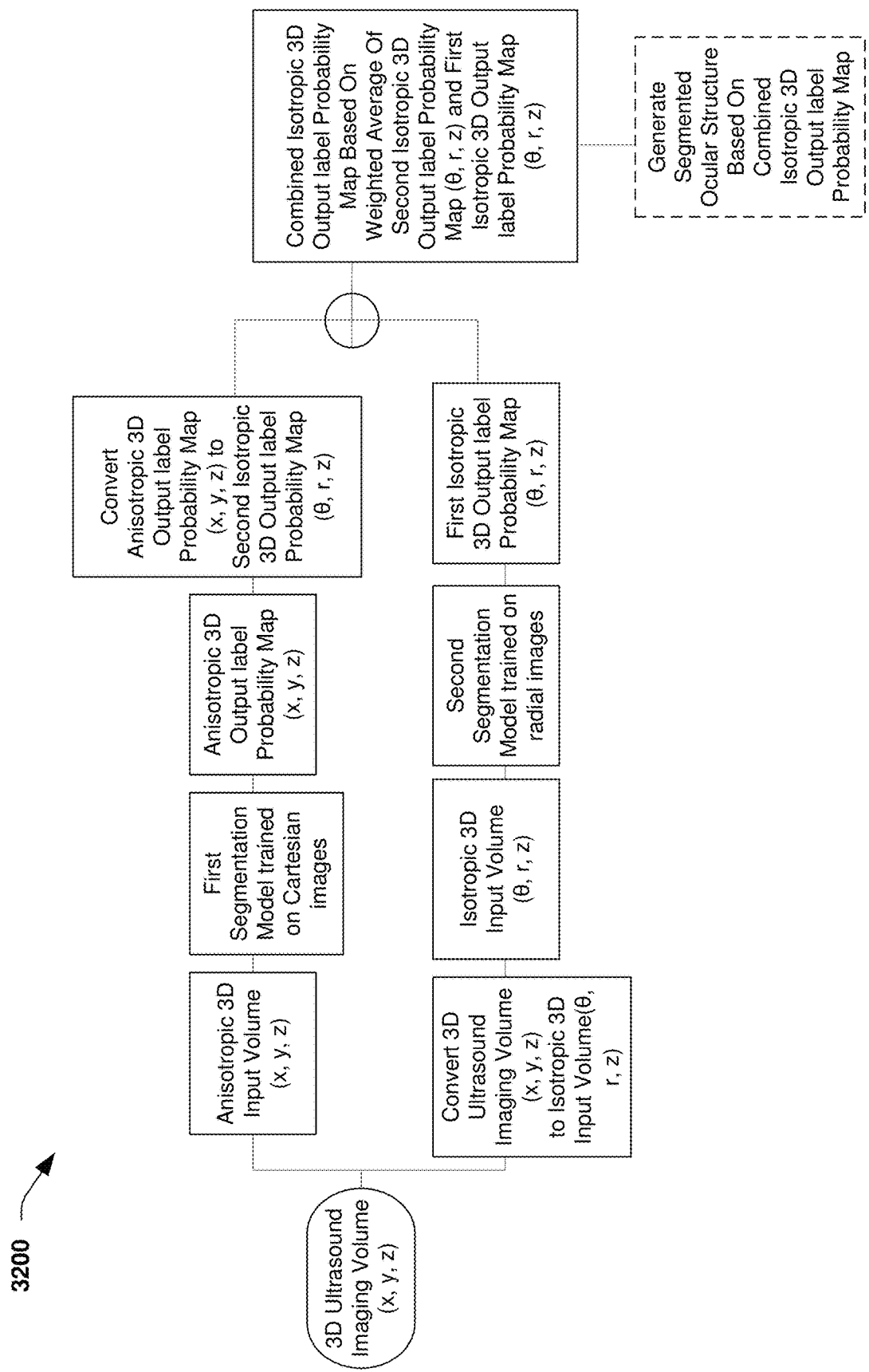
FIG. 32 illustrates an example workflow diagram for generating a weighted average of an output of a first deep learning ocular structure segmentation model and a second deep learning ocular structure segmentation model according to various embodiments described herein.

In one embodiment, the weighted average may be computed based on a weight associated with an ocular structure being segmented. For example, in a first example wherein the ocular structure to be segmented is a tumor, a first weighting that privileges the output of the first deep learning ocular structure segmentation model may be employed, while in a second example, wherein the ocular structure is a Schlemm's canal, a second, different weighting that privileges the output of the second deep learning ocular structure segmentation model may be employed. For example, the second, different deep learning ocular structure segmentation model configured to accept at least one portion of the 3D ultrasound imaging in (θ, r, z) coordinates as an input, and configured to generate a second predicted segmentation volume of the ocular structure based on the at least one portion of the 3D ultrasound imaging in (θ, r, z) coordinates, may provide more accurate segmentation of a Schlemm's canal than the first deep learning ocular structure segmentation model configured to accept at least one portion of the 3D ultrasound imaging in Cartesian (x, y, z) coordinates as an input, and configured to generate a first predicted segmentation volume of the ocular structure based on the at least one portion of the 3D ultrasound imaging in Cartesian (x, y, z) coordinates, due at least to symmetries in the representation of Schlemm's canal in the at least one portion of the 3D ultrasound imaging in (θ, r, z) coordinates. In various embodiments, the weight may be preset, or may be user selectable. For example, a first weight may be preset or selectable for segmenting an anterior chamber, a second, different weight may be preset or selectable for segmenting an ocular abnormality, or a third, different weight may be preset or selectable for segmenting a Schlemm's canal or collecting channel. The one or more processors 150 may be configured to compute the weighted average according to various techniques described herein. FIG. 32 is a workflow diagram of a deep learning ocular structure segmentation model pipeline 3200 wherein the at least one deep learning ocular structure segmentation model comprises the first deep learning ocular structure segmentation model and the second deep learning ocular structure segmentation model, wherein generating the at least one segmented ocular structure comprises computing a weighted average of the first predicted segmentation volume and the second predicted segmentation volume.

In one embodiment, the one or more processors 150 are configured to compute at least one clinical metric associated with the at least one segmented ocular structure based on the at least one segmented ocular structure according to various techniques described herein. In one embodiment, the one or more processors 150 may be configured to compute the clinical metric based on the 3D ultrasound imaging or a portion of the 3D ultrasound imaging, and the at least one segmented ocular structure. In one embodiment, the one or more processors 150 may be configured to extract a rotational or 2D radial image from the 3D ultrasound imaging and compute the at least one clinical metric based on the extracted rotational or 2D radial image and the at least one segmented ocular structure according to various techniques described herein.

In one embodiment, the one or more processors 150 may be configured to generate a 3D volume rendering based on the 3D ultrasound imaging. The one or more processors 150 may be configured to generate the 3D volume rendering based on the 3D ultrasound imaging using a gradient-based optical transfer function (OTF) opacity enhancement ray casting approach. In one embodiment, the gradient-based optical transfer function (OTF) opacity enhancement ray casting approach comprises gradient-based OTF edge-enhancement during a surface classification operation. Edge-enhancement via a gradient-based OTF facilitates improved rendering of an interface between a transparent region and a tissue surface represented in 3D ultrasound imaging of eyes. In one embodiment, the gradient-based OTF opacity enhancement ray casting approach further comprises performing feature enhancement relying on visual cues provided by an edge of an object represented in 3D ultrasound imagery, where the opacity of a voxel is increased where a gradient associated with the voxel is orthogonal to a view direction, or where the gradient associated with the voxel approaches orthogonal to the view direction. The one or more processors 150 may be configured to generate the 3D volume rendering according to various techniques described herein, including but not limited to, for example, operations 1200, or 1600.

In one embodiment, the one or more processors 150 may be configured to display at least one of: the at least one segmented ocular structure, the at least one clinical metric, the 3D ultrasound imaging, or at least one portion of the 3D ultrasound imaging. In one embodiment, the one or more processors 150 may be configured to display the 3D volume rendering. Displaying at least one of: the 3D volume rendering, the at least one segmented ocular structure, the at least one clinical metric, the 3D ultrasound imaging, or at least one portion of the 3D ultrasound imaging may include displaying at least one of: the 3D volume rendering, the at least one segmented ocular structure, the at least one clinical metric, the 3D ultrasound imaging, or at least one portion of the 3D ultrasound imaging on a computer monitor, a smartphone display, a tablet display, or other displays. Displaying the at least one of: the 3D volume rendering, the at least one segmented ocular structure, the at least one clinical metric, the 3D ultrasound imaging, or at least one portion of the 3D ultrasound imaging may also include printing at least one of: the 3D volume rendering, the at least one segmented ocular structure, the at least one clinical metric, the 3D ultrasound imaging, or at least one portion of the 3D ultrasound imaging. Displaying at least one of: the 3D volume rendering, the at least one segmented ocular structure, the at least one clinical metric, the 3D ultrasound imaging, or at least one portion of the 3D ultrasound imaging may also include controlling a 3D ultrasound system, a personalized medicine system, a computer assisted diagnostic (CADx) system, a monitor, or other display, to display operating parameters or characteristics of a deep learning model during both training and testing, or during clinical operation of the deep learning model. By displaying at least one of: the 3D volume rendering, the at least one segmented ocular structure, the at least one clinical metric, the 3D ultrasound imaging, or at least one portion of the 3D ultrasound imaging, example embodiments provide a timely and intuitive way for an ophthalmologist or other medical practitioner, including a non-specialist medical practitioner, to more accurately assess ocular structures in 3D ultrasound, to inform more precise treatments, to prevent unnecessary surgeries, to more accurately and rapidly diagnose ocular diseases or injuries, to plan more appropriate therapies, or to more accurately treat glaucoma with external laser ablation of ciliary processes, compared to existing approaches.

In one embodiment, the one or more processors 150 may be configured to extract a 2D slice from the 3D ultrasound imaging. In one embodiment, the one or more processors 150 may be configured to display the 2D slice according to various techniques described herein. For example, a 2D slice may comprise a cross-sectional view of the 3D ultrasound imaging in the x-y axis, x-z axis, or y-z axis.

In one embodiment, the at least one ocular structure comprises an anterior chamber. In this embodiment, the at least one deep learning ocular structure segmentation model comprises at least one deep learning anterior chamber segmentation model trained on an anterior chamber training set. The at least one deep learning anterior chamber segmentation model is configured to generate a segmented anterior chamber. In this embodiment, the at least one clinical metric comprises at least one of: an iridocorneal angle, a volume of the anterior chamber, or an area of the anterior chamber. The volume of the anterior chamber can be calculated, in one example, by multiplying the number of pixels by pixel area to get the area, and the number of voxels by voxel volume to get the volume.

Figure 26:
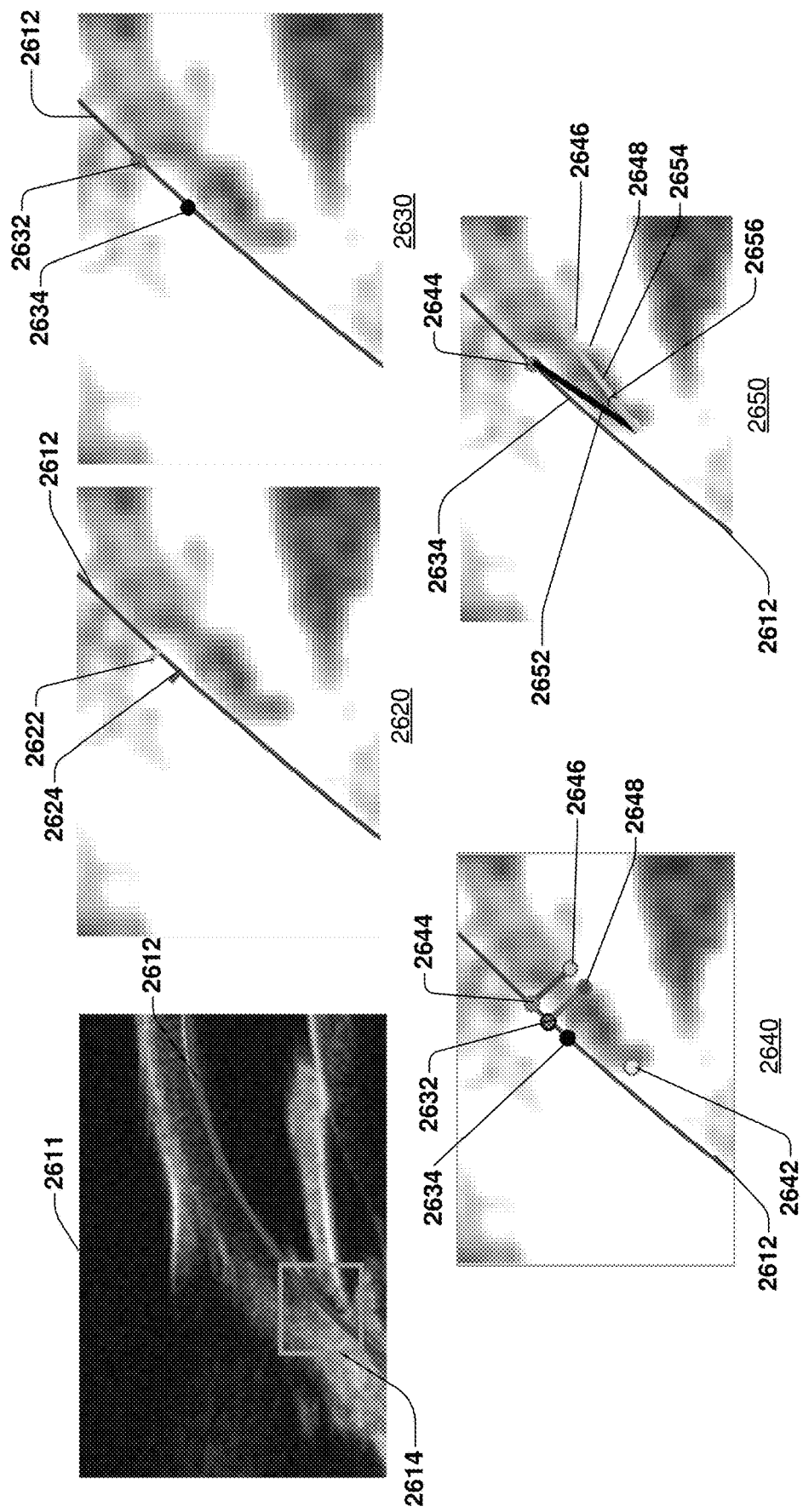
FIG. 26 illustrates an example technique for measuring an iridocorneal angle from a rotational or radial image of an eye according to various embodiments described herein.
Figure 27:
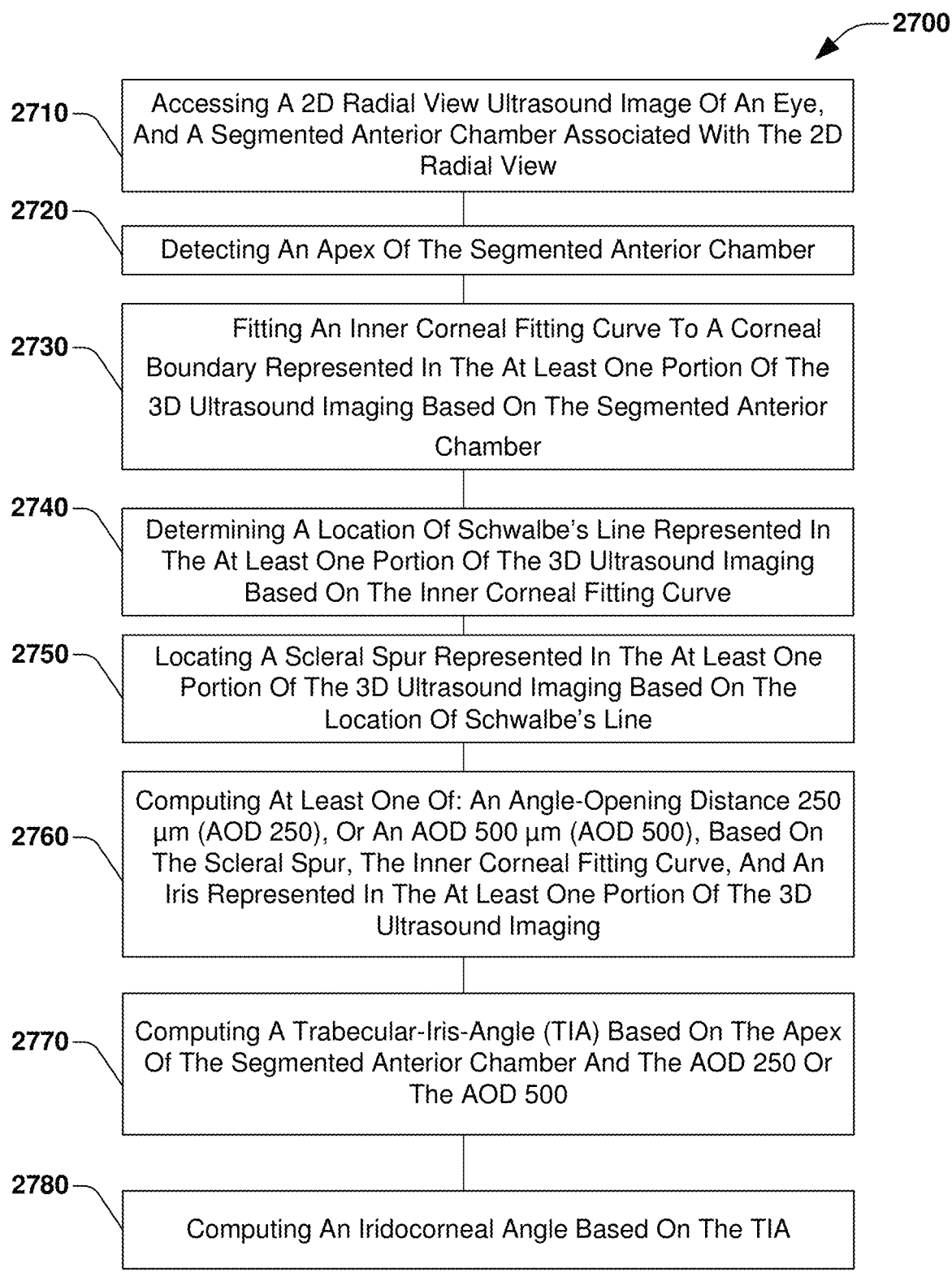
FIG. 27 illustrates a flow diagram of an example methodology or operations for computing an iridocorneal angle according to various embodiments described herein.
Figure 28:
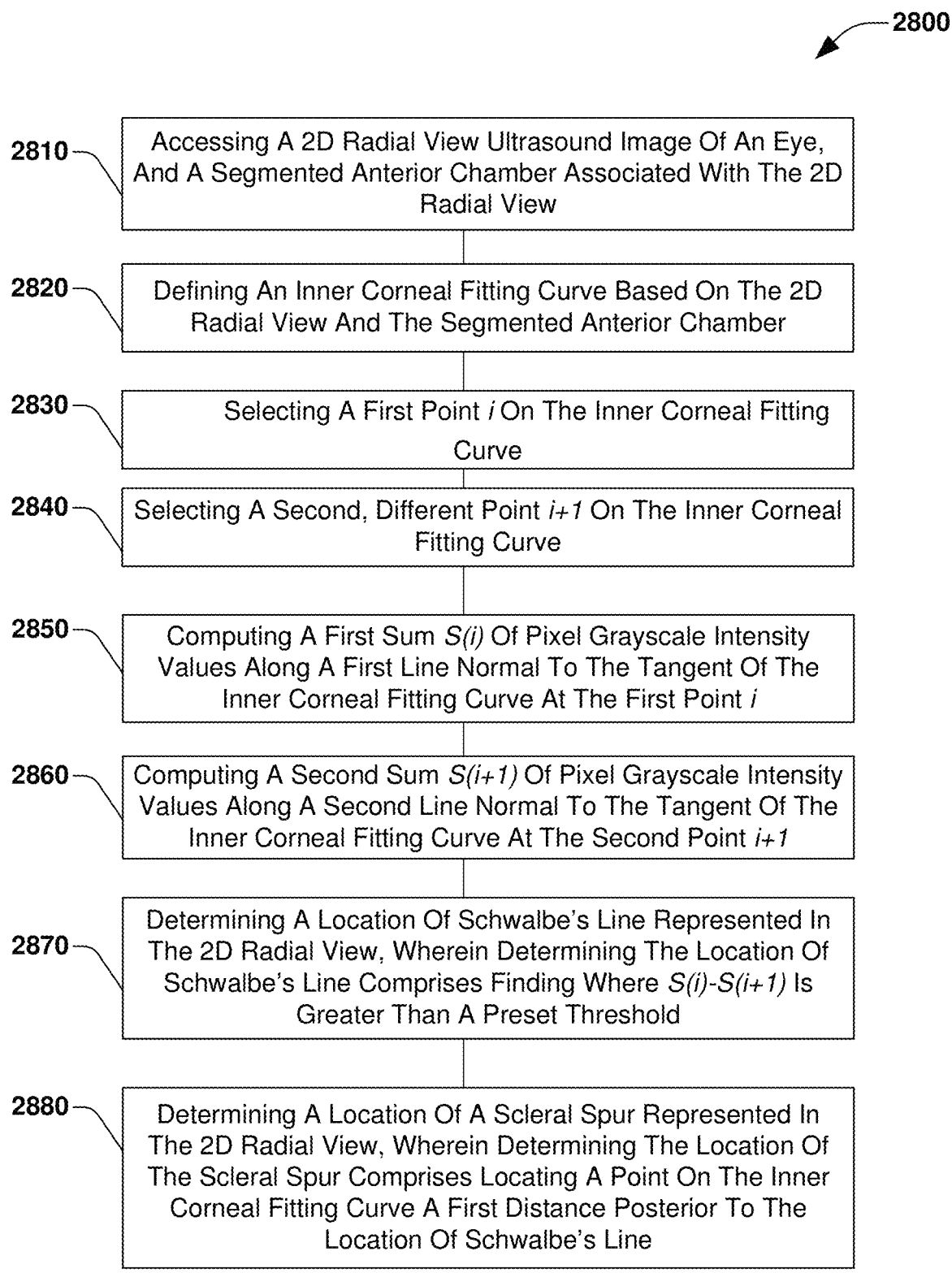
FIG. 28 illustrates a flow diagram of an example methodology or operations for locating a scleral spur according to various embodiments described herein.

In one embodiment, wherein the at least one clinical metric comprises an iridocorneal angle, wherein the at least one segmented ocular structure comprises a segmented anterior chamber: the one or more processors are configured to: detect an apex of the segmented anterior chamber; fit an inner corneal fitting curve to a corneal boundary represented in the at least one portion of the 3D ultrasound imaging based on the segmented anterior chamber; determine a location of Schwalbe's line based on the inner corneal fitting curve; locate a scleral spur based on the location of Schwalbe's line; compute at least one of: a trabecular-iris-angle (TIA), an angle-opening distance 250 µm (AOD 250), or an AOD 500 µm (AOD 500) based on the scleral spur, the inner corneal fitting curve, the segmented anterior chamber and the at least one portion of the 3D ultrasound imaging; and compute an iridocorneal angle based on at least one of the TIA, the AOD 250, or the AOD 500. In another embodiment, other AOD values may be employed. FIG. 26 illustrates an example technique for measuring an iridocorneal angle according to various embodiments described herein. FIG. 27 illustrates a flow diagram of an example set of operations 2700 for measuring an iridocorneal angle according to various embodiments described herein. FIG. 28 illustrates an example set of operations 2800 that may be employed by embodiments described herein to locate a scleral spur. In another embodiment, the one or more processors may be configured to compute the iridocorneal angle using another, different technique, for example, an angle opening sequence iridocorneal angle measurement technique, or an angle opening minimum iridocorneal angle measurement technique.

In one embodiment, the at least one ocular structure comprises at least one ocular abnormality. In one embodiment, the at least one ocular abnormality comprises a tumor, a cyst, a melanoma, or a nevus. In this embodiment, the at least one deep learning ocular structure segmentation model comprises at least one deep learning ocular abnormality segmentation model trained on an ocular abnormality training set. In this embodiment, the at least one clinical metric comprises at least one of: a location of the ocular abnormality, a volume of the ocular abnormality, an area of the ocular abnormality, or a length of the ocular abnormality. Upon segmentation of the ocular structure, the location of the abnormality within the volume may, in one example, may be determined by deep learning.

In one embodiment, the at least one ocular structure comprises a Schlemm's canal or collecting channel. In this embodiment, the at least one deep learning ocular structure segmentation model comprises at least one deep learning Schlemm's canal segmentation model trained on a Schlemm's canal training set. In this embodiment, the at least one clinical metric comprises at least one of: a cross sectional area of the Schlemm's canal, a number of collecting channels, or a volume of collecting channels.

In one embodiment, the 3D ultrasound imaging comprises 3D ultrasound imaging described in Cartesian (x, y, z) co-ordinates, wherein the 3D ultrasound imaging described in Cartesian (x, y, z) co-ordinates defines an anisotropic volume in Cartesian (x, y, z) co-ordinates, wherein the one or more processors are configured to convert the 3D ultrasound imaging described in Cartesian (x, y, z) co-ordinates to 3D ultrasound imaging described in (θ, r, z) co-ordinates, wherein the 3D ultrasound imaging described in (θ, r, z) co-ordinates defines an isotropic volume in (θ, r, z) coordinates. In one embodiment, converting the 3D ultrasound imaging from Cartesian (x, y, z) co-ordinates to (θ, r, z) co-ordinates further comprises correcting a tilt of an optic axis of the eye represented in the 3D ultrasound imaging described in (θ, r, z) relative to the z-axis of the 3D ultrasound imaging described in (θ, r, z), according to various techniques described herein. Correcting a tilt of an optic axis of the eye represented in the 3D ultrasound imaging described in (θ, r, z) relative to the z-axis of the 3D ultrasound imaging described in (θ, r, z) facilitates improved segmentation of an ocular structure represented in the 3D ultrasound imaging described in (θ, r, z), and may further facilitate improved computation of clinical metrics associated with the ocular structure.

In one embodiment, the one or more processors 150 are configured to receive input via a user interface for changing an operating parameter of the one or more processors, and in response to receiving the input, change the operating parameter of the one or more processors, wherein the operating parameter is associated with at least one of: accessing 3D ultrasound imaging of the eye, aligning the at least one portion of the 3D ultrasound imaging, noise-reducing the at least one portion of the 3D ultrasound imaging, generating the at least one segmented ocular structure, correcting a tilt of an optic axis of the eye represented in the 3D ultrasound imaging, generating a 3D volume rendering, or displaying the at least one of: the 3D volume rendering, the at least one segmented ocular structure, the at least one clinical metric, the 3D ultrasound imaging, or a portion of the 3D ultrasound imaging. In one embodiment, the one or more processors 150 may be configured to receive input via a user interface including, for example, graphical user interface (GUI) 400.

In one embodiment, the one or more processors 150 are configured to train the at least one deep learning ocular segmentation model according to various techniques described herein. In one embodiment, the one or more processors are configured to generate at least one deep learning ocular segmentation model training set, wherein the at least one deep learning ocular segmentation training set comprises an anterior chamber training set, an ocular abnormality training set, or a Schlemm's canal training set. An anterior chamber training set may comprise, for example, a plurality of 3D ultrasound imaging of eyes wherein an anterior chamber is represented in at least one of the plurality of 3D ultrasound imaging, and further comprising associated anterior chamber ground truths. An ocular abnormality training set may comprise, for example, a plurality of 3D ultrasound imaging of eyes wherein an ocular abnormality is represented in at least one of the plurality of 3D ultrasound imaging, and further comprising associated ocular abnormality ground truths. A Schlemm's canal training set may comprise, for example, a plurality of 3D ultrasound imaging of eyes wherein a Schlemm's canal or collection channel is represented in at least one of the plurality of 3D ultrasound imaging, and further comprising associated Schlemm's canal ground truths. In one embodiment, the one or more processors 150 are configured to generate the at least one deep learning ocular segmentation model training set according to various techniques described herein.

Embodiments described herein may train a deep learning model (e.g., at least one deep learning ocular segmentation model), for example, a Convolutional Neural Network (CNN) based on a training dataset, and, for each image in the training dataset, a known ground truth label (e.g., background, anterior chamber, other ocular structure) associated with that image. Based on the training dataset, and, for each image in the training dataset, a known ground truth label, for example, background, anterior chamber, other ocular structure, associated with that image, the model can determine a probability of a class label for the image or for portions of the image, for example, background, ocular structure, noise.

Figure 2:
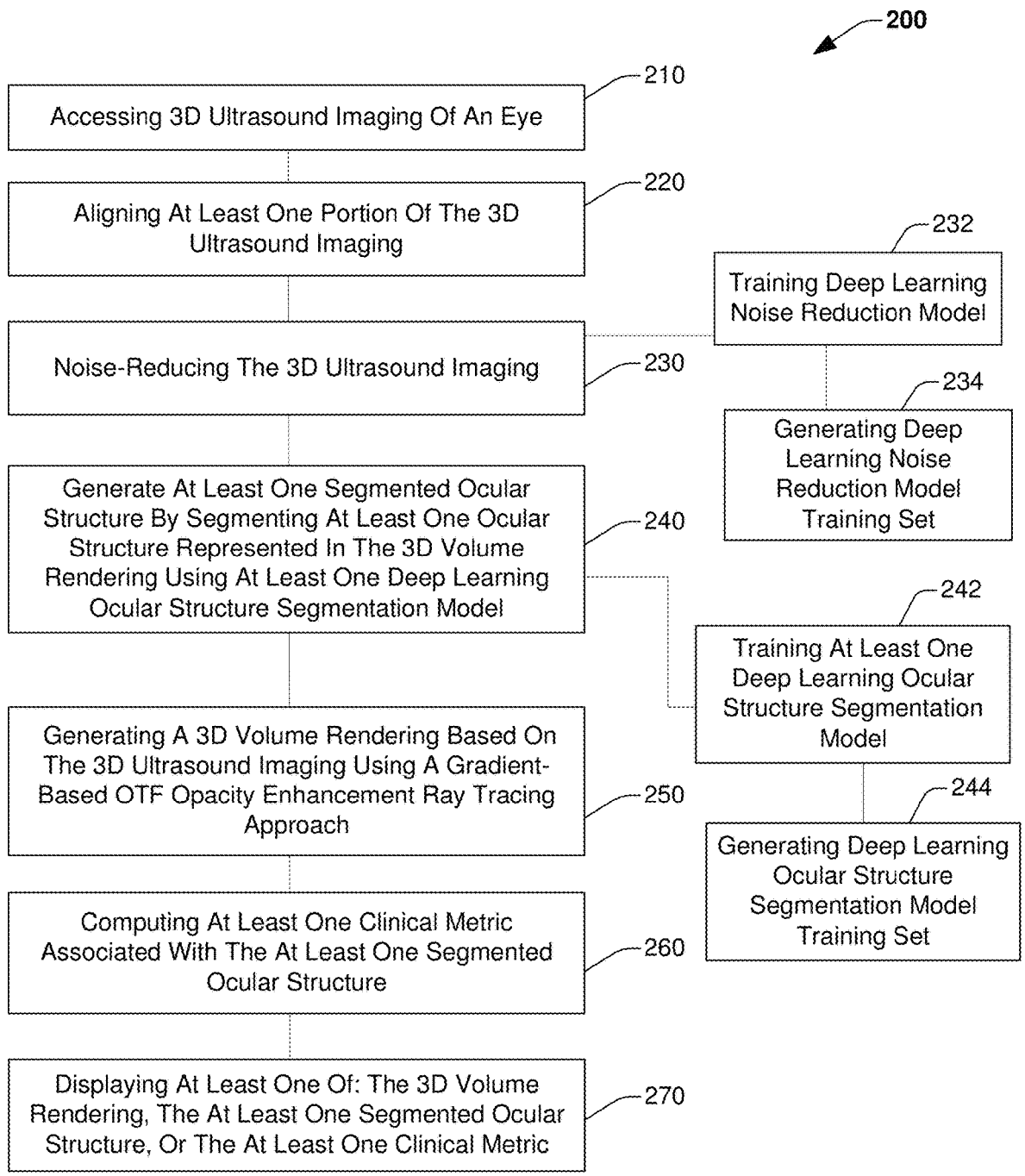
FIG. 2 illustrates a flow diagram of an example methodology or operations for processing or analyzing 3D ultrasound images according to various embodiments described herein.

FIG. 2 illustrates a flow diagram of an example set of operations 200 that when executed, control a processor to perform operations. A processor as used herein may include circuitry such as, but not limited to, one or more single-core or multi-core processors. A processor as used herein may include any combination of general-purpose processors and dedicated processors (e.g., graphics processors, application processors, etc.). A processor as used herein may be coupled with or may include memory or storage and may be configured to execute instructions stored in the memory or storage to enable various processors, apparatus, systems, applications, or operating systems to perform the operations. Operations 200 comprises acquiring electronic data, reading from a computer file, receiving a computer file, reading from a computer memory, or other computerized activity not practically performed in a human mind.

Operations 200 comprises, at 210, accessing 3D ultrasound imaging of an eye. The 3D ultrasound imaging may be associated with a patient. The 3D ultrasound imaging of an eye may comprise a plurality of voxels or pixels, a voxel or pixel having an associated intensity, or other value. The 3D ultrasound imaging may, in one example, comprise at least one 2D ultrasound images of an eye. A 2D ultrasound image may comprise a plurality of pixels, a pixel having an associated intensity, or other value. The 3D ultrasound imaging may define a 3D volume in Cartesian (x, y, z) co-ordinates, or in radial (θ, r, z) co-ordinates. In one embodiment, a portion of the 3D ultrasound imaging, for example, at least one 2D ultrasound image, is acquired using at least one of: a linear scan acquisition technique, a gimballed scan acquisition technique, a phased array 3D ultrasound acquisition technique, a freehand 3D ultrasound acquisition technique, or a 3D ultrasound biomicroscopy (UBM) acquisition technique. The 3D ultrasound imaging may be acquired concurrently with, or prior to, the implementation of operations 200. Accessing the 3D ultrasound imaging includes acquiring electronic data, reading from a computer file, receiving a computer file, reading from a computer memory, or other computerized activity not practically performed in a human mind.

In one embodiment, operations 200 also comprises, at 220, aligning at least one portion of the 3D ultrasound imaging to reduce misalignment among the at least one portion of the 3D ultrasound imaging. In one embodiment, aligning at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique. Embodiments may align the at least one portion of the 3D ultrasound imaging according to various techniques described herein, including, for example, operations 800, 900, 1000, or 1100.

In one embodiment, operations 200 also comprises, at 230 noise-reducing the 3D ultrasound imaging. In one embodiment, noise-reducing the 3D ultrasound imaging comprises noise-reducing the 3D ultrasound imaging or a portion of the 3D ultrasound imaging using at least one of: a rotational frames averaging noise reduction technique, an edge preserving filters noise reduction technique, a median kernel and center-weighted linear filter noise reduction technique, or at least one deep learning noise reduction model. Embodiments may noise-reduce the 3D ultrasound imaging or a portion of the 3D ultrasound imaging according to various techniques described herein, including, for example, operations 1900, or 3300.

In one embodiment, operations 200 comprises, at 232 training the at least one deep learning noise reduction model. In one embodiment, training the at least one deep learning noise reduction model comprises training the at least one deep learning noise reduction model with at least one deep learning noise reduction model training set according to various techniques described herein.

In one embodiment, operations 200 comprises, at 234 generating at least one deep learning noise reduction model training set. In one embodiment, the at least one ocular structure comprises Schlemm's canal and collecting ducts. In this embodiment, wherein the at least one ocular structure comprises Schlemm's canal and collecting ducts, generating the at least one deep learning noise reduction model training set comprises generating a Schlemm's canal enhanced noise reduction training set comprising at least one set of noise-reduced 3D ultrasound imaging of eyes, wherein at least one of the eyes have been injected with an intraocular contrast agent. Embodiments may generate the Schlemm's canal enhanced noise reduction training set according to various techniques described herein. In one embodiment, the eye has been injected with an intraocular agent prior to or concurrent with the execution of operations 200, or other methods or techniques described herein. Injecting the eye represented in the set of 3D ultrasound images with an intraocular agent may facilitate raising the intraocular pressure and distend or dilate Schlemm's canal and collecting channels, which may facilitate improved visualization, segmentation, or assessment of Schlemm's canal and collecting channels. Embodiments may generate at least one deep learning noise reduction model training set according to various techniques described herein, including, for example, operations 2000 or 3300.

In one embodiment, operations 200 comprises, at 240 generating at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging.

In one embodiment of operations 200, the at least one deep learning ocular structure segmentation model comprises at least one of: a first deep learning ocular structure segmentation model configured to accept at least one portion of the 3D ultrasound imaging in Cartesian (x, y, z) coordinates as an input, and configured to generate a first predicted segmentation volume of the ocular structure based on the at least one portion of the 3D ultrasound imaging in Cartesian (x, y, z) coordinates; or a second, different deep learning ocular structure segmentation model configured to accept at least one portion of the 3D ultrasound imaging in (θ, r, z) coordinates as an input, and configured to generate a second predicted segmentation volume of the ocular structure based on the at least one portion of the 3D ultrasound imaging in (θ, r, z) coordinates.

In one embodiment of operations 200, wherein the at least one deep learning ocular structure segmentation model comprises the first deep learning ocular structure segmentation model and the second deep learning ocular structure segmentation model, generating the at least one segmented ocular structure comprises computing a weighted average of the first predicted segmentation volume and the second first predicted segmentation volume. In one embodiment, the weighted average may be computed based on a weight associated with an ocular structure being segmented. For example, in a first example wherein the ocular structure to be segmented is a tumor, a first weighting may be employed, while in a second example, wherein the ocular structure is a Schlemm's canal, a second, different weighting may be employed. The weight may be preset, or may be user selectable.

In one embodiment, operations 200 comprises, at 242 training the at least one deep learning ocular segmentation model. Training the at least one deep learning ocular segmentation model may comprise training the at least one deep learning ocular segmentation model according to various techniques described herein, including, for example, operations 2300, 3100, or 3600.

In one embodiment, operations 200 comprises, at 244, generating at least one deep learning ocular segmentation model training set, wherein the at least one deep learning ocular segmentation training set comprises an anterior chamber training set, an ocular abnormality training set, or a Schlemm's canal training set.

In one embodiment, operations 200 comprises, at 250, computing at least one clinical metric associated with the at least one segmented ocular structure based on the at least one segmented ocular structure. In one embodiment, computing the at least one clinical metric associated with the at least one segmented ocular structure may comprise computing at least one clinical metric based on the 3D ultrasound imaging or a portion of the 3D ultrasound imaging and the at least one segmented ocular structure. In one embodiment, computing the at least one clinical metric may comprise extracting a rotational or 2D radial image from the 3D ultrasound imaging and, computing the at least one clinical metric based on the extracted rotational or 2D radial image and the at least one segmented ocular structure according to various techniques described herein. Embodiments may extract a rotational or 2D radial image from the 3D ultrasound imaging according to various techniques described herein, including, for example, operations 1800.

In one embodiment, operations 200 also comprises, at 260, generating a 3D volume rendering based on the 3D ultrasound imaging using a gradient-based optical transfer function (OTF) opacity enhancement ray casting approach. In another embodiment, another, different 3D volume rendering approach may be employed. Embodiments may generate the 3D volume rendering according to various techniques described herein, including, for example, operations 1200 or 1600.

In one embodiment, operations 200 also comprises, at 270, displaying at least one of: the 3D volume rendering, the at least one segmented ocular structure, the at least one clinical metric, the 3D ultrasound imaging, or at least one portion of the 3D ultrasound imaging. Displaying at least one of: the 3D volume rendering, the at least one segmented ocular structure, the at least one clinical metric, the 3D ultrasound imaging, or at least one portion of the 3D ultrasound imaging may include displaying at least one of: the 3D volume rendering, the at least one segmented ocular structure, the at least one clinical metric, the 3D ultrasound imaging, or at least one portion of the 3D ultrasound imaging on a computer monitor, a smartphone display, a tablet display, or other displays. Displaying the at least one of: the 3D volume rendering, the at least one segmented ocular structure, the at least one clinical metric, the 3D ultrasound imaging, or at least one portion of the 3D ultrasound imaging may also include printing at least one of: the 3D volume rendering, the at least one segmented ocular structure, the at least one clinical metric, the 3D ultrasound imaging, or at least one portion of the 3D ultrasound imaging. Displaying at least one of: the 3D volume rendering, the at least one segmented ocular structure, the at least one clinical metric, the 3D ultrasound imaging, or at least one portion of the 3D ultrasound imaging may also include controlling a 3D ultrasound system, a personalized medicine system, a computer assisted diagnostic (CADx) system, a monitor, or other display, to display operating parameters or characteristics of a deep learning model during both training and testing, or during clinical operation of the deep learning model. By displaying at least one of: the 3D volume rendering, the at least one segmented ocular structure, the at least one clinical metric, the 3D ultrasound imaging, or at least one portion of the 3D ultrasound imaging, example embodiments provide a timely and intuitive way for an ophthalmologist or other medical practitioner, including a non-specialist medical practitioner, to more accurately assess ocular structures in 3D ultrasound, to inform more precise treatments, to prevent unnecessary surgeries, to more accurately and rapidly diagnose ocular diseases or injuries, to plan more appropriate therapies, or to more accurately treat glaucoma with external laser ablation of ciliary processes, compared to existing approaches.

In one embodiment of operations 200, the at least one ocular structure comprises an anterior chamber, and wherein the at least one deep learning ocular structure segmentation model comprises at least one deep learning anterior chamber segmentation model trained on an anterior chamber training set. The at least one deep learning anterior chamber segmentation model is configured to generate a predicted segmentation volume of an anterior chamber based on at least one portion of the 3D ultrasound imaging. In this embodiment, the at least one clinical metric comprises at least one of: an iridocorneal angle, a volume of the anterior chamber, or an area of the anterior chamber.

Figure 25:
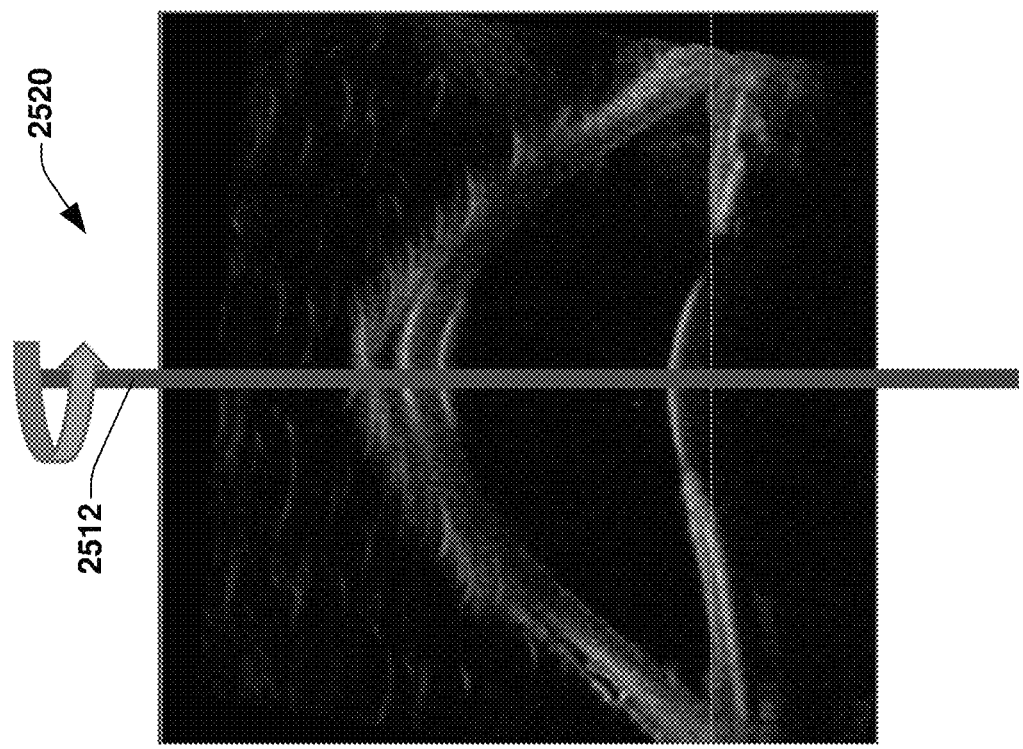
FIG. 25 illustrates example ultrasound imaging of an eye demonstrating an optic axis misaligned with a z-axis.
Figure 25:
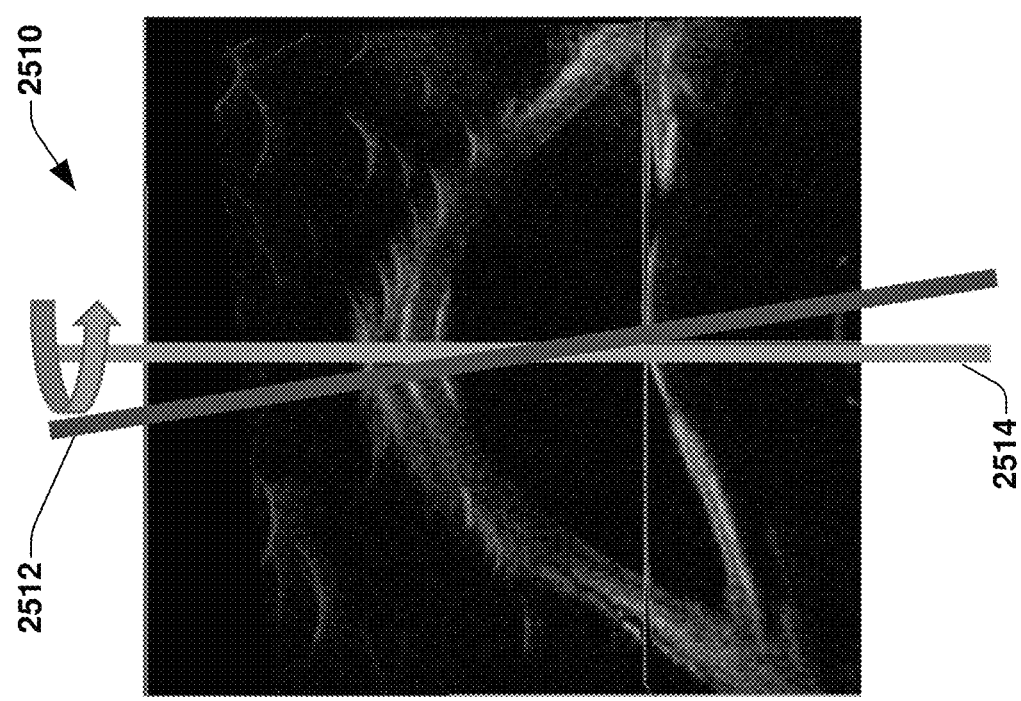

In one embodiment of operations 200, wherein the at least one clinical metric comprises an iridocorneal angle, computing the at least one clinical metric associated with the at least one segmented ocular structure based on the at least one segmented ocular structure comprises: detecting an apex of the segmented anterior chamber; fitting an inner corneal fitting curve to a corneal boundary represented in the at least one portion of the 3D ultrasound imaging based on the segmented anterior chamber; determining a location of Schwalbe's line represented in the at least one portion of the 3D ultrasound imaging based on the inner corneal fitting curve; locating a scleral spur represented in the at least one portion of the 3D ultrasound imaging based on the location of Schwalbe's line; computing at least one of: an angle-opening distance 250 μm (AOD 250), or an AOD 500 μm (AOD 500), based on the scleral spur, the inner corneal fitting curve, and an iris represented in the at least one portion of the 3D ultrasound imaging; computing a trabecular-iris-angle (TIA) based on the apex of the segmented anterior chamber and the AOD 250 or the AOD 500; and computing an iridocorneal angle based on the TIA. In another embodiment, computing at least one clinical metric may comprise computing the iridocorneal angle using another, different technique, for example, an angle opening sequence iridocorneal angle measurement technique, or an angle opening minimum iridocorneal angle measurement technique. FIG. 25 illustrate an example technique for measuring an iridocorneal angle according to various embodiments described herein that may be employed by embodiments described, including, in one example, operations 200. Embodiments may locate a scleral spur according to various techniques described herein, including, for example, operations 2800.

In one embodiment of operations 200, the at least one ocular structure comprises at least one ocular abnormality. In this embodiment, the at least one deep learning ocular structure segmentation model comprises at least one deep learning ocular abnormality segmentation model trained on an ocular abnormality training set. The at least one deep learning ocular abnormality segmentation model is configured to generate a predicted segmentation volume of an ocular abnormality based on at least one portion of the 3D ultrasound imaging. In this embodiment, the at least one clinical metric comprises at least one of: a location of the ocular abnormality, a volume of the ocular abnormality, an area of the ocular abnormality, or a length of the ocular abnormality. In another embodiment, the at least one clinical metric may comprise another, different clinical metric associated with the ocular abnormality. In one embodiment, the at least one ocular abnormality comprises a tumor, a cyst, a melanoma, or a nevus. In another embodiment, the at least one ocular abnormality may comprise another, different ocular abnormality.

In one embodiment of operations 200, the at least one ocular structure comprises a Schlemm's canal and collecting channel. In this embodiment, the at least one deep learning ocular structure segmentation model comprises at least one deep learning Schlemm's canal segmentation model trained on a Schlemm's canal training set. The at least one deep learning Schlemm's canal segmentation model is configured to generate a predicted segmentation volume of a Schlemm's canal or collecting channels based on at least one portion of the 3D ultrasound imaging. In one embodiment, the at least one clinical metric comprises at least one of: a cross sectional area of the Schlemm's canal, a number of collecting channels, or a volume of collecting channels.

In one embodiment of operations 200, the 3D ultrasound imaging comprises 3D ultrasound imaging described in Cartesian (x, y, z) co-ordinates, wherein the 3D ultrasound imaging described in Cartesian (x, y, z) co-ordinates defines an anisotropic volume in Cartesian (x, y, z) co-ordinates, the operations comprising converting the 3D ultrasound imaging described in Cartesian (x, y, z) co-ordinates to 3D ultrasound imaging described in (θ, r, z) co-ordinates, wherein the 3D ultrasound imaging described in (θ, r, z) co-ordinates defines an isotropic volume in (θ, r, z) coordinates.

In one embodiment of operations 200, converting the 3D ultrasound imaging from Cartesian (x, y, z) co-ordinates to (θ, r, z) co-ordinates further comprises correcting a tilt of an optic axis of the eye represented in the 3D ultrasound imaging described in (θ, r, z) relative to the z-axis of the 3D ultrasound imaging described in (θ, r, z).

In one embodiment, operations 200 comprises receiving input via a user interface for changing an operating parameter of a processor, and in response to receiving the input, changing the operating parameter of the processor, wherein the operating parameter is associated with at least one of: accessing 3D ultrasound imaging of the eye, aligning the at least one portion of the 3D ultrasound imaging, noise-reducing the at least one portion of the 3D ultrasound imaging, generating the at least one segmented ocular structure, correcting a tilt of an optic axis of the eye represented in the 3D ultrasound imaging, generating the 3D volume rendering, or displaying the at least one of: the 3D volume rendering, the at least one segmented ocular structure, the at least one clinical metric, the 3D ultrasound imaging, or a portion of the 3D ultrasound imaging. Embodiments may receive input via a user interface including, for example, graphical user interface (GUI) 400.

Figure 37:
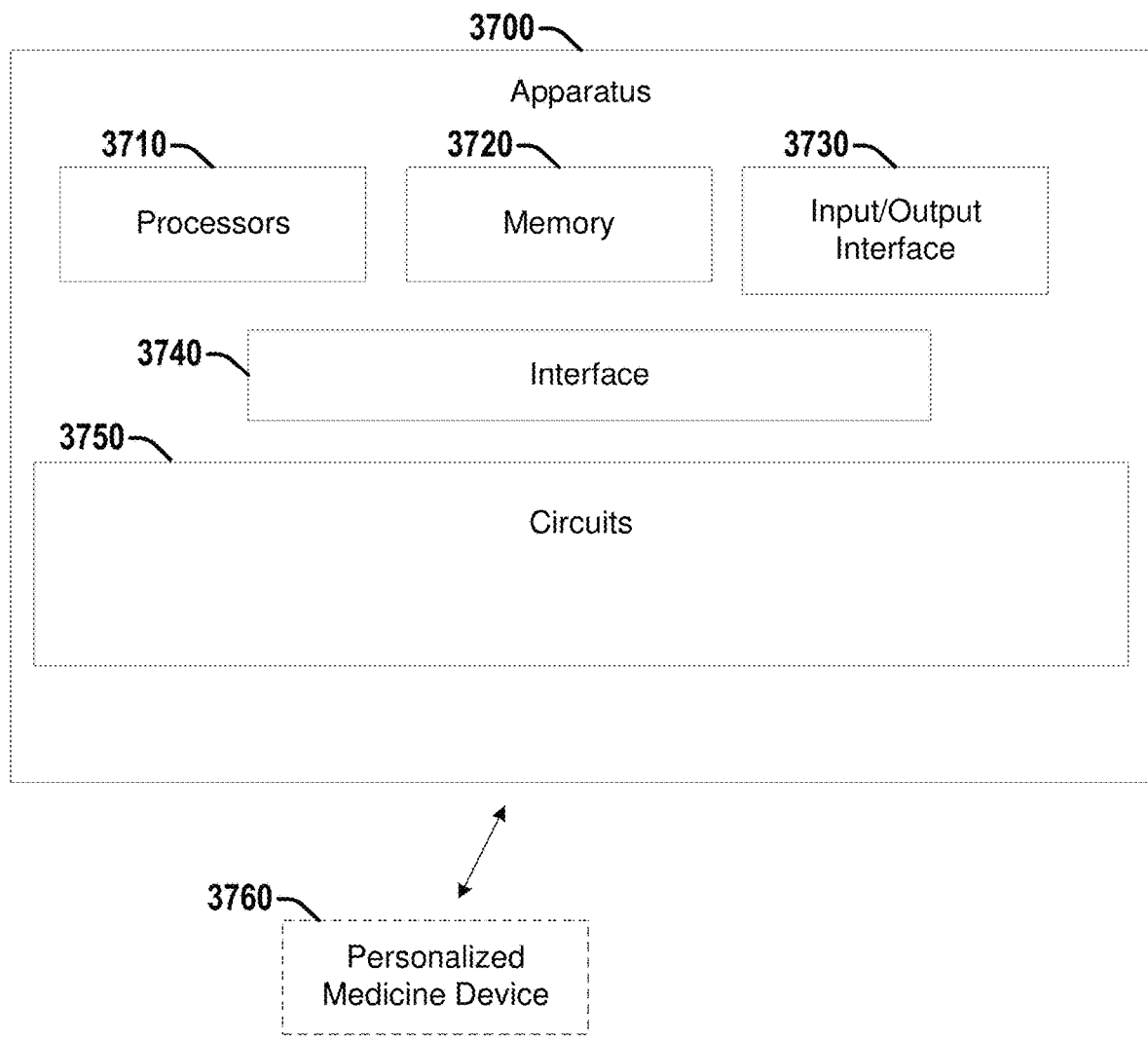
FIG. 37 illustrates an example apparatus according to various embodiments described herein.

Referring to FIG. 37, illustrated is a diagram of an example apparatus 3700 that can facilitate segmentation of at least one ocular structure represented in 3D ultrasound imaging of an eye via a machine learning (ML) or deep learning (DL) model, and/or training a ML or DL model to segment at least one ocular structure represented in the 3D ultrasound imaging, and/or computing a clinical metric associated with the at least one ocular structure, according to various embodiments discussed herein. Apparatus 3600 can be configured to perform various techniques discussed herein, for example, various operations discussed in connection with sets of operations 200, 800, 900, 1000, 1100, 1200, 1600, 1800, 1900, 2000, 2200, 2300, 2400, 2700, 2800, 2900, 3000, 3100, 3300, 3400, 3500, or 3600. Apparatus 3600 comprises one or more processors 3610. Apparatus 3600 also comprises a memory 3720. Processor(s) 3710 can, in various embodiments, comprise circuitry such as, but not limited to, one or more single-core or multi-core processors. Processor(s) 3710 can include any combination of general-purpose processors and dedicated processors (e.g., graphics processors, application processors, etc.). The processor(s) can be coupled with and/or can comprise memory (e.g., of memory 3720) or storage and can be configured to execute instructions stored in the memory 3720 or storage to enable various apparatus, applications, or operating systems to perform operations and/or methods discussed herein. Memory 3720 can be configured to store ultrasound imaging of an eye, for example, 3D ultrasound imaging of an eye. Each of the image(s) of the imaging can comprise a plurality of pixels or voxels, each pixel or voxel having an associated intensity. Memory 3720 can be further configured to store additional data involved in performing operations discussed herein, such as for pre-processing (e.g., image alignment, noise reduction) of 3D ultrasound imaging and/or training a ML or DL model to noise reduce 3D ultrasound imaging, as discussed in greater detail herein.

Apparatus 3700 also comprises an input/output (I/O) interface 3730 (e.g., associated with one or more I/O devices), a set of circuits 3750, and an interface 3740 that connects the processor 3710, the memory 3720, the I/O interface 3730, and the set of circuits 3750. I/O interface 3730 can be configured to transfer data between memory 3720, processor 3710, circuits 3750, and external devices, for example, a medical imaging device (e.g., ultrasound system or apparatus, etc.), and/or one or more remote devices for receiving inputs and/or providing outputs to a clinician, patient, etc., such as optional personalized medicine device 3760.

The processor(s) 3710 and/or one or more circuits of the set of circuits 3750 can be configured to receive ultrasound imaging (e.g., from memory 3720 or from an external device, etc.). The ultrasound imaging can comprise 3D ultrasound imaging of an eye as described herein.

The processor(s) 3710 and/or one or more circuits of the set of circuits 3750 can perform one or more acts associated with a method or set of operations discussed herein, such as set of operations 200, 800, 900, 1000, 1100, 1200, 1600, 1800, 1900, 2000, 2200, 2300, 2400, 2700, 2800, 2900, 3000, 3100, 3300, 3400, 3500, or 3600.

As one example, the processor(s) 3710 and/or one or more circuits of the set of circuits 3750 can perform one or more operations associated with set of operations 200.

In one embodiment, the processor(s) 3710 and/or one or more circuits of the set of circuits 3750 may be configured to access three-dimensional (3D) ultrasound imaging of an eye according to various techniques described herein.

In one embodiment, the processor(s) 3710 and/or one or more circuits of the set of circuits 3750 may be configured to pre-process the 3D ultrasound imaging. In one embodiment, wherein pre-processing the 3D ultrasound imaging comprises aligning at least one portion of the 3D ultrasound imaging to reduce misalignment among the 3D ultrasound imaging; wherein aligning the at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique. As one example, the processor(s) 3610 and/or one or more circuits of the set of circuits 3750 can perform one or more operations associated with set of operations 800, 900, 1000, or 1100.

In one embodiment, pre-processing the 3D ultrasound imaging comprises noise-reducing at least one portion of the 3D ultrasound imaging, wherein noise-reducing the 3D ultrasound imaging comprises noise-reducing the 3D ultrasound imaging using at least one of: a rotational frames averaging noise reduction technique, an edge preserving filters noise reduction technique, a median kernel and center-weighted linear filter noise reduction technique, or a deep learning noise reduction model. As one example, the processor(s) 3710 and/or one or more circuits of the set of circuits 3750 can perform one or more operations associated with set of operations 1900, 2000, 3300, or 3400.

In one embodiment, the processor(s) 3710 and/or one or more circuits of the set of circuits 3750 may be configured to segment at least one ocular structure represented in the 3D ultrasound imaging using at least one deep learning ocular structure segmentation model configured to generate a predicted segmentation volume of the at least one ocular structure based on at least one portion of the 3D ultrasound imaging. In one embodiment, wherein the at least one deep learning ocular structure segmentation model comprises at least one of: a first deep learning ocular structure segmentation model configured to accept at least one portion of the 3D ultrasound imaging in Cartesian (x, y, z) coordinates as an input, and configured to generate a first predicted segmentation volume of the ocular structure based on the at least one portion of the 3D ultrasound imaging in Cartesian (x, y, z) coordinates; or a second, different deep learning ocular structure segmentation model configured to accept at least one portion of the 3D ultrasound imaging in (θ, r, z) coordinates as an input, and configured to generate a second predicted segmentation volume of the ocular structure based on the at least one portion of the 3D ultrasound imaging in (θ, r, z) coordinates. As one example, the processor(s) 3610 and/or one or more circuits of the set of circuits 3750 can perform one or more operations associated with set of operations 2200, 2300, 3000, 3100, 3500, or 3600.

In one embodiment, wherein the at least one deep learning ocular structure segmentation model comprises the first deep learning ocular structure segmentation model and the second deep learning ocular structure segmentation model, generating the at least one segmented ocular structure comprises computing an average of the first predicted segmentation volume and the second first predicted segmentation volume. In one embodiment, computing an average of the first predicted segmentation volume and the second first predicted segmentation volume comprises computing a weighted averaged of the first predicted segmentation volume and the second first predicted segmentation volume.

In one embodiment, wherein the at least one ocular structure comprises at least one of: an anterior chamber, a Schlemm's canal and collecting channels, or an ocular abnormality.

In one embodiment, the processor(s) 3710 and/or one or more circuits of the set of circuits 3750 may be configured to compute at least one clinical metric associated with the at least one segmented ocular structure based on the at least one segmented ocular structure. As one example, the processor(s) 3710 and/or one or more circuits of the set of circuits 3750 can perform one or more operations associated with set of operations 2400, 2700, or 2800.

In one embodiment, the processor(s) 3710 and/or one or more circuits of the set of circuits 3750 may be configured to output a visual representation of at least one of: the at least one segmented ocular structure, the at least one clinical metric, the 3D ultrasound imaging, or at least one portion of the 3D ultrasound imaging.

In one embodiment, the processor(s) 3710 and/or one or more circuits of the set of circuits 3750 may be configured to generate a 3D volume rendering based on the 3D ultrasound imaging using a gradient-based optical transfer function (OTF) opacity enhancement ray casting approach; and output a visual representation of the 3D volume rendering. As one example, the processor(s) 3710 and/or one or more circuits of the set of circuits 3750 can perform one or more operations associated with set of operations 1200, or 1600.

Figure 3:
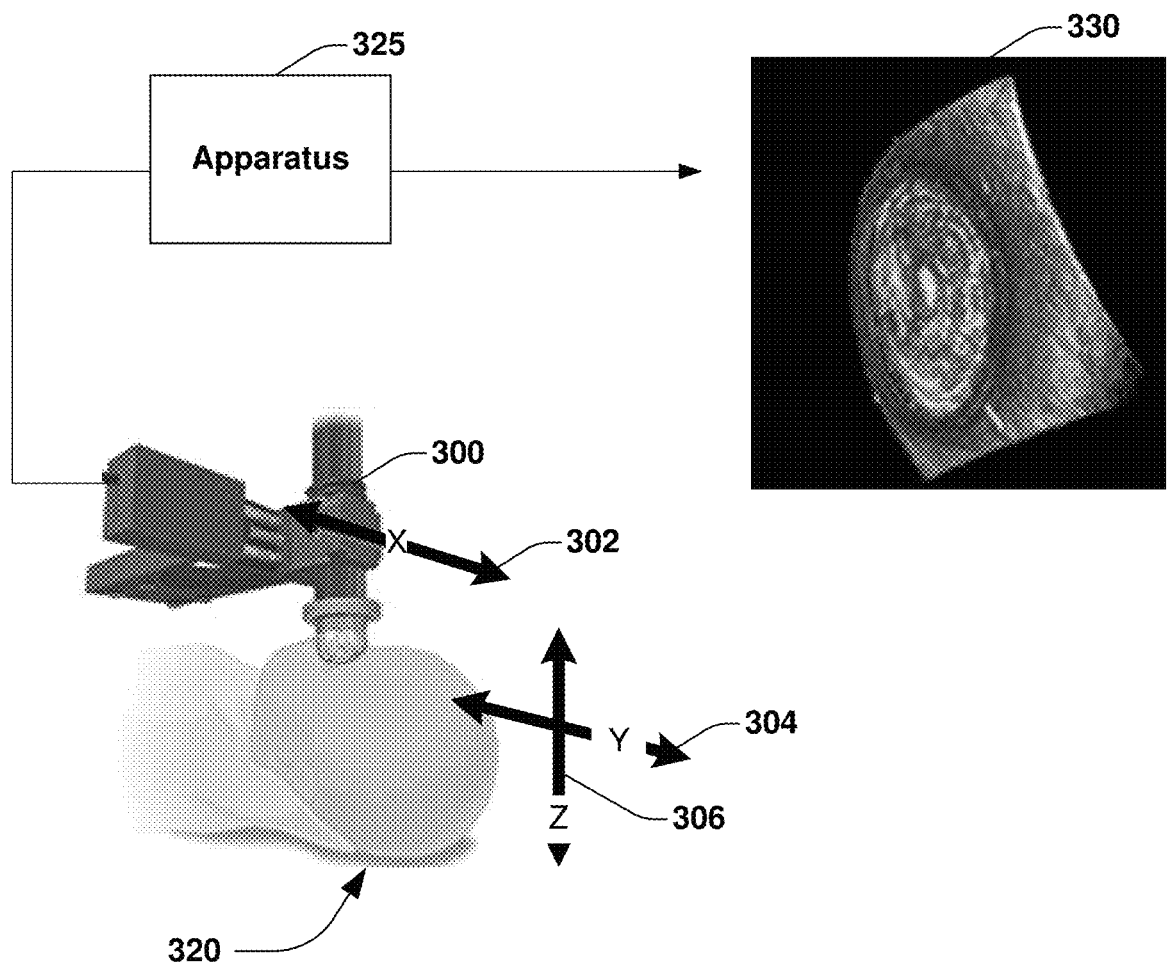
FIG. 3 illustrates an example ocular ultrasound scanner according to various embodiments described herein.

Apparatus 3700 can optionally further comprise personalized medicine device 3760. Apparatus 3700 can be configured to provide the at least one clinical metric, or other data to personalized medicine device 3760. Personalized medicine device 3760 may be, for example, a computer assisted diagnosis (CADx) system or other type of personalized medicine device that can be used to facilitate monitoring and/or treatment of an associated medical condition, for example, glaucoma. In some embodiments, processor(s) 3610 and/or one or more circuits of the set of circuits 3750 can be further configured to control personalized medicine device 3760 to display the 3D volume rendering, the at least one segmented ocular structure, the at least one clinical metric, the 3D ultrasound imaging, or at least one portion of the 3D ultrasound imaging or other data on a computer monitor, a smartphone display, a tablet display, or other displays Acquisition of Ultrasound Imagery of the Eye Embodiments described herein may access ultrasound imagery of an eye according to various techniques described herein. FIG. 3 illustrates an example ocular ultrasound scanner 300 configured to acquire 3D ultrasound imaging of an eye. Ultrasound scanner 300 may comprise at least one of: a linear scan ultrasound scanner, a gimballed scan ultrasound scanner, a phased array 3D ultrasound scanner, a freehand 3D ultrasound scanner, or a 3D ultrasound biomicroscopy (UBM) scanner. Ultrasound scanner 300 may be operably connected with an apparatus 325, or may be configured to transmit data to or receive data from, apparatus 325. Apparatus 325 may comprise, for example, apparatus 100, apparatus 3700, computer 3800, or other systems or apparatus or embodiments described herein, or may be operably connected to or integrated with a computer or medical system in which apparatus 100, apparatus 3700, or other embodiments described herein is operably connected or practically integrated, or which is configured to execute instructions, operations, methods, techniques, or other embodiments described herein. Ultrasound scanner 300 may be operably connected with or integrated with a computer or other system or apparatus in which apparatus 100, or apparatus 3700 is practically integrated or operably connected. Ultrasound scanner 300 may be operably connected with a computer or other system or apparatus with which operations 200 or any other operations, methodologies, or techniques described herein may be implemented.

FIG. 3 further illustrates a head 320 of a patient being scanned by ultrasound scanner 300. Ultrasound scanner 300 may acquire 3D ultrasound imaging according to various techniques described herein. In one example, 3D ultrasound imaging may comprise 2D (y, z) ultrasound images of an eye associated with the patient acquired in the (y, z) directions, were z refers to depth in the eye, and where y refers to the vertical direction parallel to the nose of the patient 310. An example x-axis is indicated at 302, a y-axis at 304, and a z-axis at 306. In this example, to acquire Cartesian (x, y, z) data, embodiments may obtain 2D-ultrasound (y, z) images and mechanically scan ultrasound scanner 300 along the x-axis (e.g., along x). In this example, the imagery is acquired using a linear ultrasound transducer, for example, ultrasound scanner 300, mechanically scanned along x. In one example, embodiments may obtain 2D (y, z) ultrasound images and mechanically scan ultrasound scanner 300 along x, acquiring a volume comprising, for example, one thousand (1000) scans in vivo in a clinical situation. In embodiments described herein, a typical in vivo scan comprises, for example, one thousand (1000) 2D scans, or within a range of, for example, [900, 1100] scans. Embodiments may obtain 2D-ultrasound (y, z) images and mechanically scan ultrasound scanner 300 along x at a low speed with fine sampling, for example, acquiring a volume comprising from 5000 to 10000 scans, for example, from cadaver eyes in a water bath. Acquisition of volumes comprising larger numbers of scans, for example, from 5000 to 10000 scans, facilitates generating improved training data sets for training of deep learning models configured to reduce noise or segment ocular structures. In another example, to acquire Cartesian (x, y, z) data, embodiments may obtain 2D-ultrasound (x, z) images and mechanically scan ultrasound scanner 300 along y. In this example, the imagery is acquired using a linear ultrasound transducer, for example, ultrasound scanner 300, mechanically scanned along y. Thus, a portion of the 3D ultrasound imaging may comprise at least one 2D (y, z) ultrasound image, or at least one 2D (x, z) ultrasound image.

In various embodiments described herein, the orientation of the eye relative to the ultrasound scanner may be changed to facilitate simulated spatial compounding. For example, ultrasound scanner 300 may be rotated slightly off axis in x or y, while being mechanically scanned along x or y, respectively. Rotating ultrasound scanner 300 slightly off axis may comprise rotating ultrasound scanner from 0 to 5 degrees off the axis of mechanical scan.

In another embodiment, 3D ultrasound imagery may be acquired in three dimensions directly using a planar ultrasound transducer. In another embodiment, 3D ultrasound imagery may be acquired in (θ, r, z) space by mechanically rotating a 2D ultrasound transducer, including a 2D UBM transducer. Mechanically rotating a 2D ultrasound transducer, including a 2D UBM transducer, may comprise mechanically rotating a 2D ultrasound transducer about the z-axis, wherein the z-axis is aligned with the optic axis. Embodiments may access ultrasound imaging, including 3D ultrasound imaging or 2D ultrasound imaging of the eye acquired using other, different image acquisition techniques.

Embodiments may employ one or more of, or any combination of, the following techniques, approaches, methods, operations, systems, apparatus, or other techniques to facilitate acquiring 3D ultrasound imaging, pre-processing 3D ultrasound imaging including but not limited to aligning at least a portion of a 3D ultrasound imaging or noise reducing at least a portion of the 3D ultrasound imaging, processing 3D ultrasound imaging including but not limited to segmentation of ocular structures represented in 3D ultrasound imaging, computation of clinical metrics associated with ocular structures represented in 3D ultrasound imaging, or other analysis of ultrasound imagery of the human eye, or 3D volume rendering of 3D ultrasound imaging: (A) a graphical user interface (GUI), (B) image alignment to reduce effects of eye movement during acquisition, (C) transfer functions that give unique, 3D ultrasound views of ocular structures of interest, (D) extraction of radial images from 3D ultrasound, (E) advanced noise reduction for improved 3D ultrasound visualization, (F) deep learning segmentation of anterior chamber for assessment of clinical metrics, including volume or iridocorneal angle assessment, (G) robust, automated 360-degree iridocorneal angle measurements, (H) deep learning segmentation of tumors in 3D ultrasound, (I) processing including deep learning to provide 3D ultrasound views of Schlemm's canal and collecting channels, or (J) deep learning segmentation of Schlemm's canal and collecting channels for quantitative assessments.

A. Graphical User Interface

Figure 4:
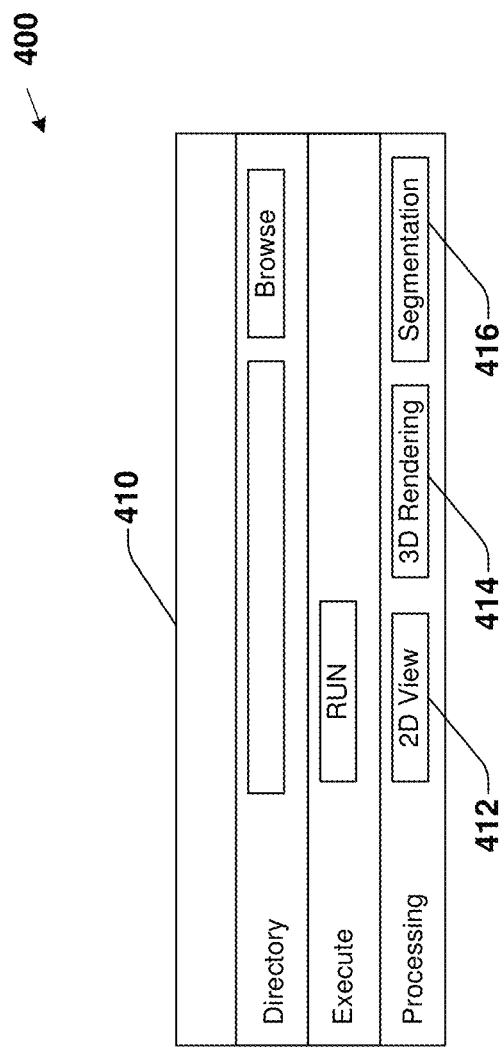
FIG. 4 illustrates an example graphical user interface (GUI) according to various embodiments described herein.

Processing or analysis of ultrasound imagery of the human eye, including 3D ultrasound imaging, may require multiple actions or involve a complex workflow, which may take time, cost resources, or lead to sub-optimal clinical outcomes. Embodiments may provide an intuitive, specific, structured graphical user interface (GUI) that facilitates improved workflow in, for example, pre-processing, processing, or analysis of 3D ultrasound imaging, including segmentation of an ocular structure represented in 3D ultrasound imaging, thereby practically integrating embodiments described herein with, and improving the performance of, a computer, an ultrasound apparatus or system, a medical imaging system, or other computer-related device to which embodiments described herein are operably connected, implemented within, executed by, or otherwise practically integrated. FIG. 4 illustrates an exemplary GUI 400 according to various embodiments described herein. In one embodiment, apparatus 100 may be configured to implement GUI 400, wherein the one or more processors 150 may be configured to receive input from GUI 400, or to display GUI 400. GUI 400 facilitates control of processors, circuits, operations, methods, apparatus, systems, or other embodiments described herein. GUI 400 comprises different panels through which different operations, circuits, processing functions, display or visualization, or analysis of 3D ultrasound imagery functions may be accessed, controlled, manipulated, or displayed. GUI 400 may be displayed on a computer monitor, a smartphone display, a tablet display, a heads up display, video goggles, or other displays. GUI 400 may be interacted with via a mouse, a keyboard, a foot pedal controller, a touch-screen display, or other input/output device or combination of input/output devices. GUI 400 comprises a main display 410. GUI 400 may also comprise a 2D viewing panel 410 illustrated in FIG. 5, 3D rendering panel 610 illustrated in FIG. 6, or segmentation panel 710 illustrated in FIG. 7. Main display 410 provides access via links 412, 414, and 416, to 2D viewing panel 510, 3D rendering panel 610, or segmentation panel 710, respectively. GUI 400 may be configured to facilitate control of any combination of apparatus 100, operations 200, apparatus 3600, computer 3700, or any other circuit, processor, apparatus, system, operations, or other embodiment described herein.

Figure 5:
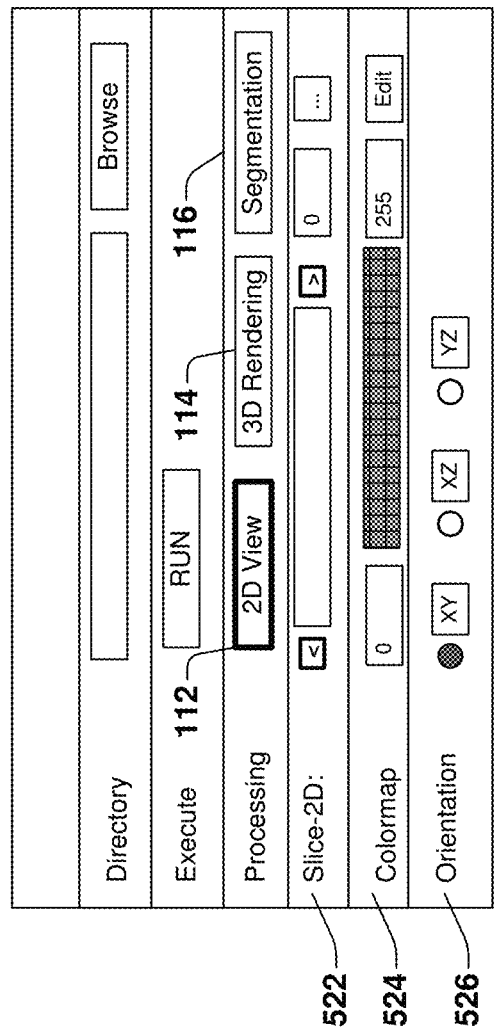
FIG. 5 illustrates an example GUI according to various embodiments described herein.

In this example, the '2D View' link 412 may be selected from main display 410, which causes the display of 2D viewing panel 510. FIG. 5 illustrates 2D viewing panel 510 which is similar to main display 410 but includes additional features and elements. 2D viewing panel 510 provides access to three 2D viewing sub-features. In this example, 2D viewing panel 510 provides links 'Slice-2D' 522, 'Colormap' 524, and 'Orientation' 524, for visualizing 2D ultrasound images. In another embodiment, 2D viewing panel 510 may include access or links to other, different sub-features.

Figure 6:
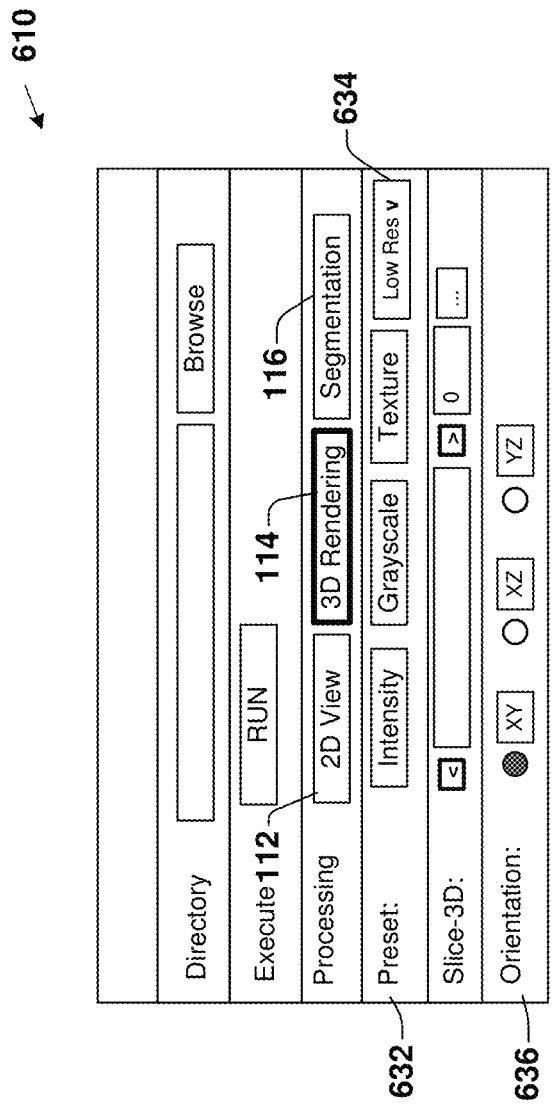
FIG. 6 illustrates an example GUI according to various embodiments described herein.
Figure 7:
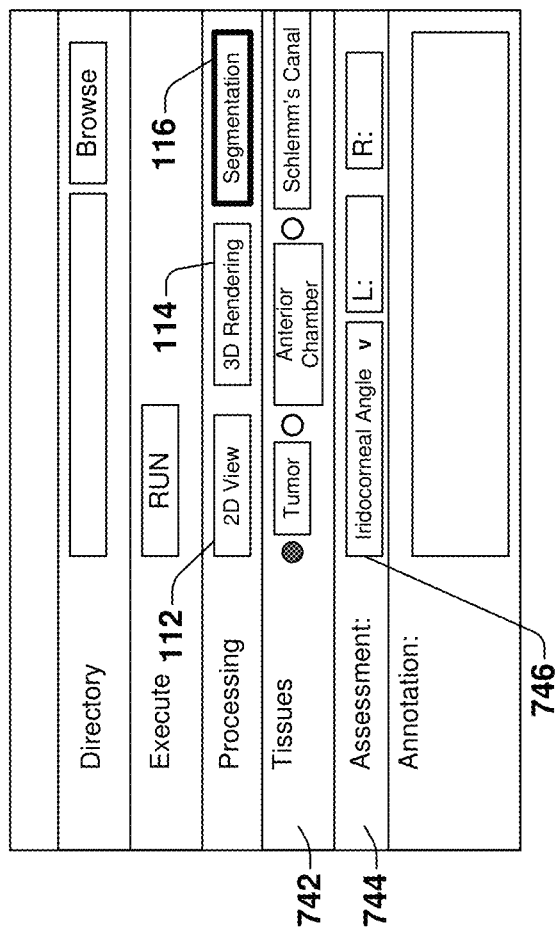
FIG. 7 illustrates an example GUI according to various embodiments described herein.

In this example, '3D Rendering' link 414 may be selected from main display 410, which causes the display of 3D rendering panel 610. FIG. 6 illustrates 3D rendering panel 610 which is similar to main display 410 but includes additional features and elements. 3D rendering panel 610 provides, in one embodiment, access to three available presets 632, including, in this example, an "Intensity" preset, a "Grayscale" preset, or a "Texture" preset, which facilitate the identification of primary tissues, such as ciliary process or Schlemm's canal, or other ocular structures, represented in the 3D imagery. 3D rendering panel 610 provides that the resolution is switchable from low to high, via resolution menu 634. When the images are first loaded, the resolution is set to low as a default. However, a user can change the resolution to mid or high resolutions at any time during operation of GUI 400, including, for example, during a 3D ultrasound procedure, via resolution menu 634. In addition, 3D rendering panel 610 may provide a clinically useful cross-sectional view of 3D volumes in terms of x-y, x-z, and y-z axis, through orientation control 636.

In this example, "Segmentation" link 416 may be selected from main display 410, which causes the display of Segmentation panel 700. Segmentation panel 700 is similar to main display 410, but includes additional features and elements. Segmentation panel 700 comprises tissue selection control 742, which facilitates selection of visualization of specific tissues, such as, in this example, tumor, anterior chamber, ciliary process, or Schlemm's canal. Segmentation panel 700 also comprises assessment control 744. Assessment control 744 facilitates selection of clinical metrics to assess by, for example, apparatus 100, operations 200, apparatus 3600, computer 3700, or any other embodiments described herein. For example, in this example, assessment control 744 comprises metric selection menu 746 configured to facilitate selection of at least one of: anterior chamber volume, tumor volume, or iridocorneal angle metrics. In another example, other metrics may be selectable using metric selection menu 746. For example, metric selection menu 746 may be configured to facilitate selection of at least one of: anterior chamber area, Schlemm's canal metrics, or other tumor metrics, according to embodiments described herein.

GUI 400 facilitates receiving input via a user interface for changing an operating parameter of an apparatus, system, processor, circuit, or computer described herein, for example, apparatus 100, operations 200, apparatus 3700, or, computer 3800, and in response to the receipt of the input, changing the operating parameter of the apparatus, system, processor, circuit, or computer. For example, in one embodiment, GUI 400 facilitates receiving input via a user interface for changing an operating parameter of the one or more processors 150, and in response to the receipt of the input, changing the operating parameter of the one or more processors 150, wherein the operating parameter is associated with at least one of: accessing 3D ultrasound imaging of the eye, aligning the at least one portion of the 3D ultrasound imaging, noise-reducing the 3D ultrasound imaging, generating the 3D volume rendering based on the 3D ultrasound imaging, generating the at least one segmented ocular structure, or displaying the at least one of: the 3D volume rendering, the at least one segmented ocular structure, or the at least one clinical metric.

B. Image Alignment to Reduce Effects of Eye Movement During the Acquisition

During data acquisition scanning along x or y, eye movement can introduce misalignment of the acquired ultrasound images, for example, (y, z) images or (x, z) images. Ultrasound images, including 3D ultrasound imaging, may be acquired of supine patients with or without anesthesia, children and adults, respectively, presenting different amounts of clinical motion. Under anesthesia there may be small head movements, mostly in the y-z plane, due to breathing. Without anesthesia, but with fixation and some damping, there may be additional eye movements. Existing approaches to image alignment may be prone to errors, including, for example, drift due to propagation of alignment error, or frame gaps or repeats due to left-right eye motion. Embodiments provide various techniques for improved image alignment including, for example, a pairwise alignment technique, a pairwise model alignment technique, a pairwise orthogonal alignment technique, a full orthogonal alignment technique, or 3D grayscale alignment with a normalized cross correlation objective function, that provide improved alignment of at least one portion of 3D ultrasound imaging compared to existing approaches. Embodiments may employ one or more of the following techniques, alone or in combination, or other techniques to facilitate image alignment of ultrasound imagery of the human eye: a pairwise alignment technique, a pairwise model alignment technique, a pairwise orthogonal alignment technique, a full orthogonal alignment technique, or 3D grayscale alignment with a normalized cross correlation objective function.

Pairwise Alignment

Figure 8:
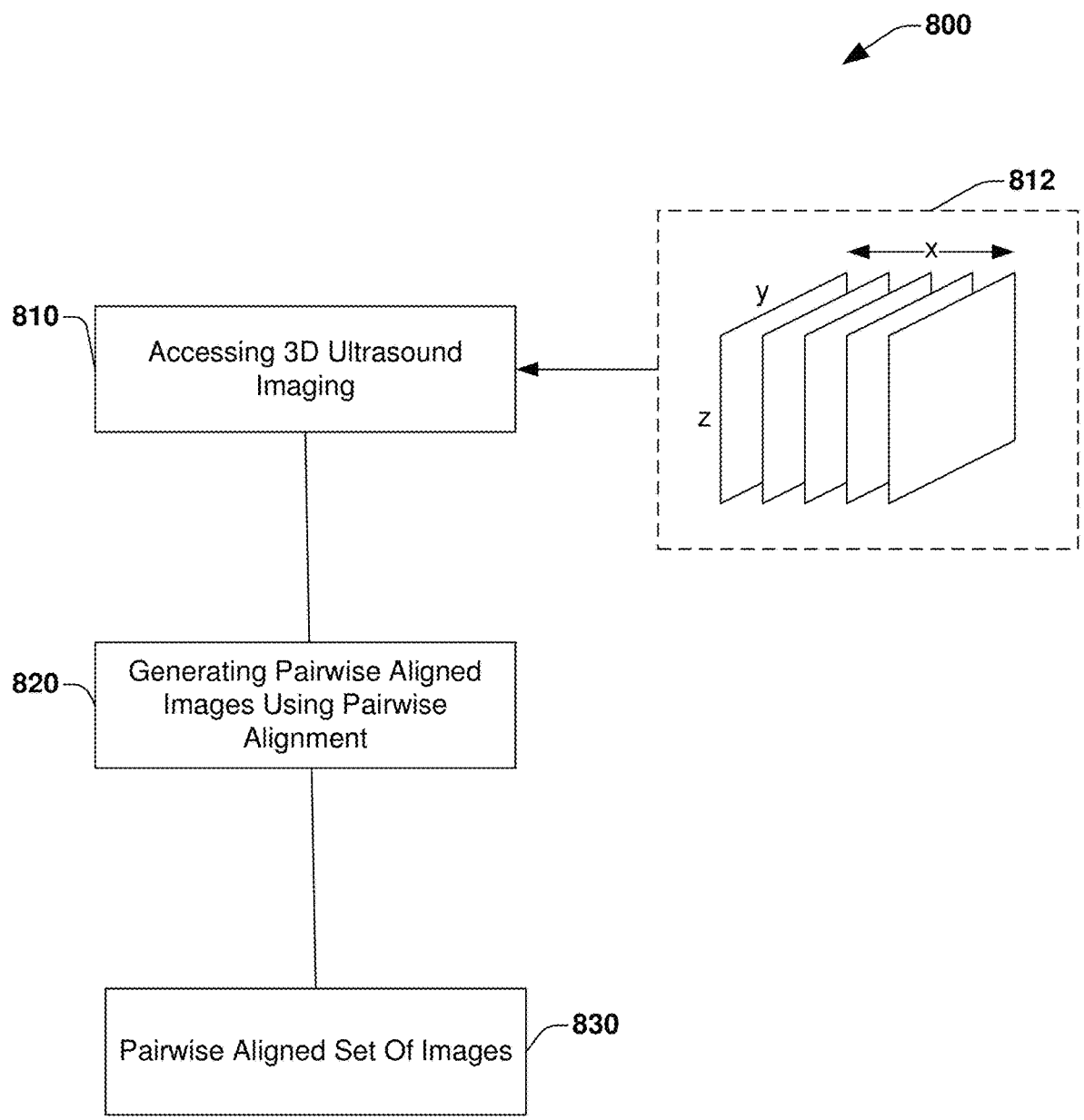
FIG. 8 illustrates a flow diagram of an example methodology or operations for aligning ultrasound imaging using pairwise alignment according to various embodiments described herein.

FIG. 8 illustrates an example workflow diagram of operations 800 that when executed, control a processor to perform operations that facilitate aligning at least one portion of 3D ultrasound imaging using a pairwise alignment technique. Operations 800 may be implemented as part of operations 200, or may be executed by the one or more processors 150 of apparatus 100, apparatus 3700, or by computer 3800, or any other systems, apparatus, or embodiments described herein. Operations 800 comprises, at 810, accessing 3D ultrasound imaging of an eye. In one embodiment, the 3D ultrasound imaging may comprise a plurality of 2D (y, z) images or scans acquired in x, as illustrated at 812. For example, at least one portion of the 3D ultrasound imaging may comprise a 2D (y, z) image or scan. Operations 800 also comprises, at 820, generating a pairwise aligned set of images 830 by aligning, on a 2D (y, z) image by 2D (y, z) image basis, (e.g., an image-by-image, or scan-by-scan basis), the plurality of 2D (y, z) images or scans using gray-scale rigid body image registration with normalized cross correlation. In one example, beginning with a member of the 2D (y, z) images or scans selected from the middle of the stack or plurality of 2D (y, z) images or scans, to the two oppositely disposed outer ends of the stack or plurality of 2D (y, z) images or scans, image data is aligned on a slice-by-slice basis using gray-scale rigid body image registration using normalized cross correlation. In each direction, the more middle 2D (y, z) image or slice will be the reference image to align the next, floating 2D (y, z) image or slice. Iteratively, for each of the plurality of 2D (y, z) images or slices, the aligned 2D (y, z) image or slice will be the reference image to align the next 2D (y, z) image or slice, and so on. Embodiments may be configured to record distances between 2D (y, z) images or slices and normalized cross-correlation as a diagnostic of a motion event. In one example, transformation is rigid body, following 3 parameters (x, y, and rotation). In one embodiment, the cost function iteratively optimized is a normalized cross correlation function. In another embodiment, another, different function may be iteratively optimized. In another embodiment, the 3D ultrasound imaging may comprise a plurality of 2D (x, z) images or scans acquired in y. One of ordinary skill will recognize that, wherein the 3D ultrasound imaging comprises a plurality of 2D (x, z) images or scans acquired in y, similar techniques may be employed to align the plurality of 2D (x, z) images or scans acquired in y using pairwise alignment.

Pairwise-Model Alignment

Figure 9:
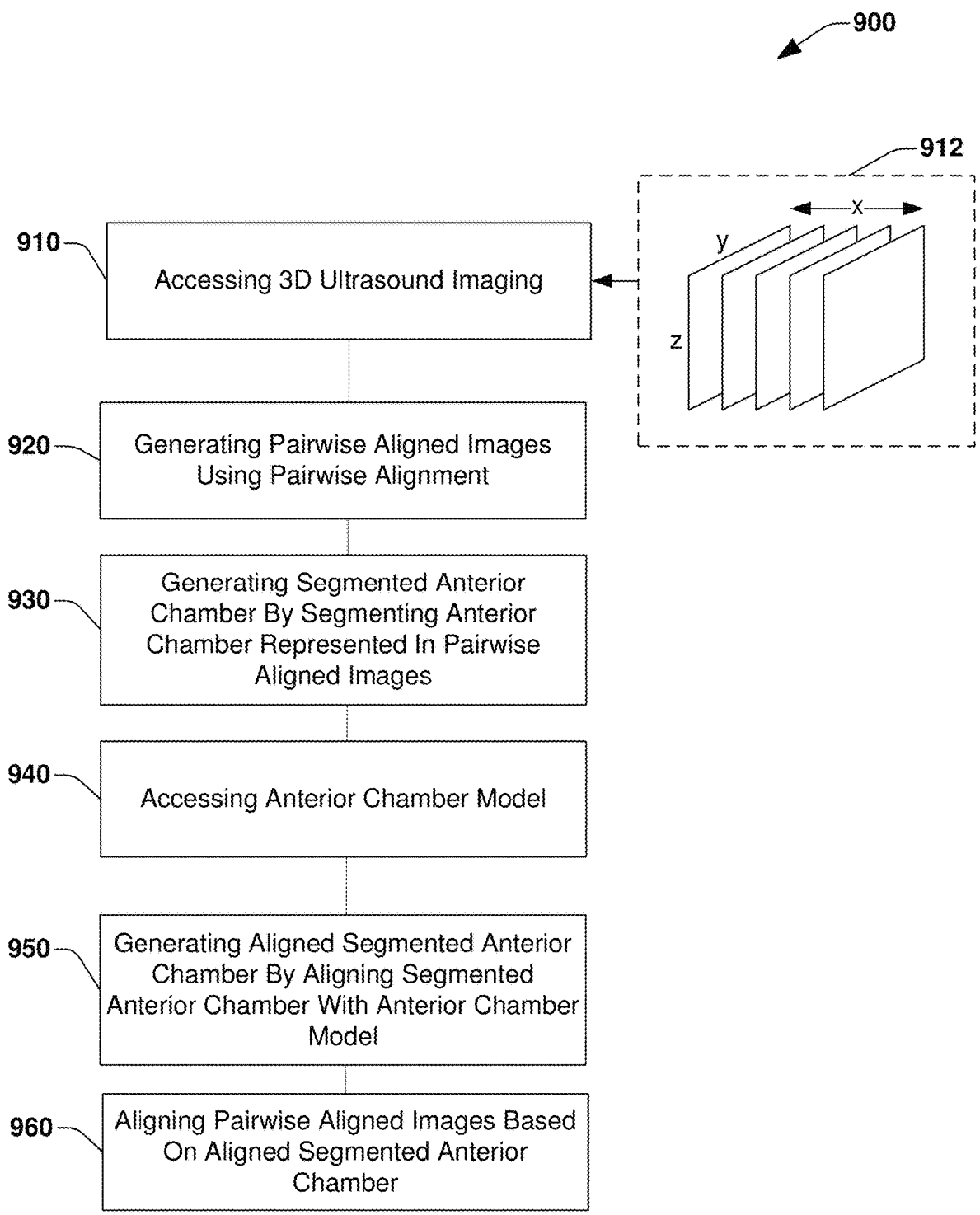
FIG. 9 illustrates a flow diagram of an example methodology or operations for aligning ultrasound imaging using pairwise-model alignment according to various embodiments described herein.

Embodiments may employ a pairwise-model technique to align at least a portion of a 3D ultrasound imaging. A pairwise-model alignment technique may comprise aligning at least a portion of a 3D ultrasound imaging using a pairwise alignment technique as described herein, for example, operations 800, segmenting an anterior chamber represented in the aligned at least a portion of the 3D ultrasound imaging according to various techniques described herein, accessing a geometric model of an anterior chamber, registering the segmented anterior chamber with the geometric model, and further aligning the aligned at least a portion of the 3D ultrasound imaging with the registered segmented anterior chamber. FIG. 9 illustrates a workflow diagram of example operations 900 that when executed, control a processor to perform operations that facilitate aligning at least one portion of the 3D ultrasound imaging using a pairwise-model alignment technique. Operations 900 may be implemented as part of operations 200, or may be executed by the one or more processors 150 of apparatus 100, apparatus 3700, or by computer 3800, or any other systems, apparatus, or embodiments described herein. Operations 900 is similar to operations 800 but includes additional details and elements. In one embodiment, operations 900 comprises, at 910, accessing 3D ultrasound imaging of an eye. In one embodiment, the 3D ultrasound imaging may comprise a plurality of 2D (y, z) images or scans acquired in x, as illustrated at 912. In another embodiment, the 3D ultrasound imaging may comprise a plurality of 2D (x, z) images or scans acquired in y. Operations 900 also comprises, at 920, generating a pairwise aligned set by aligning, on a scan-by-scan basis, the plurality of 2D (y, z) images or scans using a pairwise alignment technique according to various techniques described herein, including, for example, operations 800, or via gray-scale rigid body image registration with normalized cross correlation. Operations 900 also comprises, at 930, generating a segmented anterior chamber by segmenting an anterior chamber represented in the pairwise aligned set, wherein the segmented anterior chamber includes a bottom border. Embodiments may generate the segmented anterior chamber according to various techniques described herein. For example, embodiments may generate the segmented anterior chamber using at least one deep learning anterior chamber segmentation model according to various techniques described herein, for example, operations 2200. Operations 900 also comprises, at 940, accessing a model of an anterior chamber, where the model of an anterior chamber models a representation of a bottom border of the anterior chamber, a representation of an iris, and a representation of a lens. In one embodiment, the model of an anterior chamber comprises a symmetric low order polynomial, an asymmetric low order polynomial, or a high order polynomial, where the high order polynomial has a higher order than the symmetric low order polynomial or the asymmetric low order polynomial. Accessing the model of the anterior chamber includes acquiring electronic data, reading from a computer file, receiving a computer file, reading from a computer memory, or other computerized activity not practically performed in a human mind. Operations 900 also comprises, at 950, generating an aligned segmented anterior chamber bottom border by aligning the segmented anterior chamber bottom border with the model representation of the bottom border. In one embodiment, aligning the segmented anterior chamber bottom border with the model representation of the bottom border comprises aligning the segmented anterior chamber bottom border with the model representation of the bottom border using least squares alignment. Operations 900 also comprises, at 960, further aligning the pairwise aligned set of images based on the aligned segmented anterior chamber bottom border.

Pairwise-Orthogonal Alignment

Figure 10:
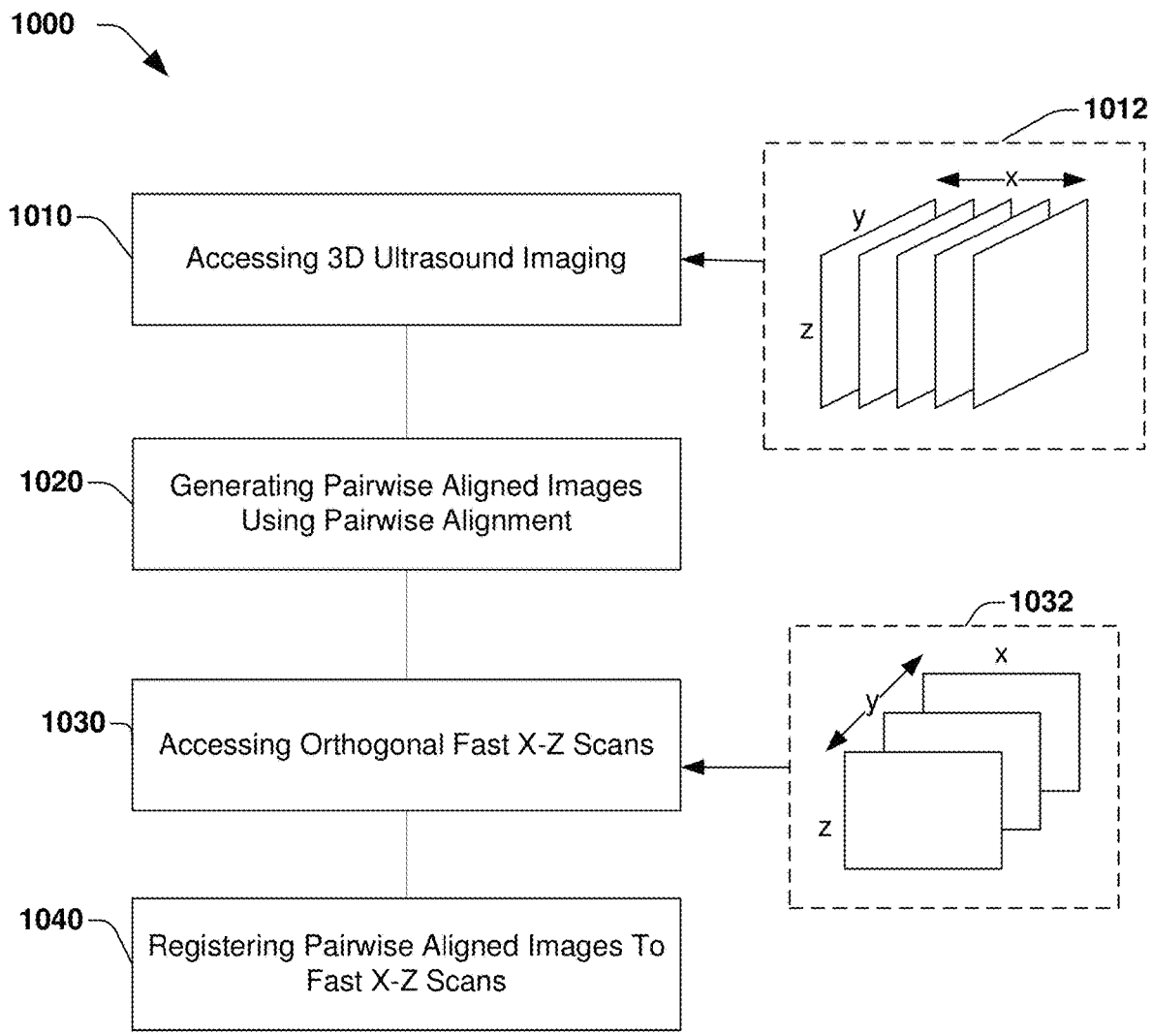
FIG. 10 illustrates a flow diagram of an example methodology or operations for aligning ultrasound imaging using pairwise-orthogonal alignment according to various embodiments described herein.

FIG. 10 illustrates a workflow diagram of example operations 1000 that when executed, control a processor to perform operations that facilitate aligning at least one portion of the 3D ultrasound imaging using a pairwise-orthogonal alignment technique. Operations 1000 may be implemented as part of operations 200, or may be executed by the one or more processors 150 of apparatus 100, apparatus 3700, or by computer 3800, or any other systems, apparatus, or embodiments described herein. In one embodiment, operations 1000 comprises, at 1010, accessing 3D ultrasound imaging of an eye. In one embodiment, the 3D ultrasound imaging may comprise a plurality of 2D (y, z) images or scans acquired in x, as illustrated at 1012. Operations 1000 also comprises, at 1020, generating a pairwise aligned set by aligning, on a scan-by-scan basis, the plurality of 2D (y, z) images or scans using a pairwise alignment technique according to various techniques described herein, including, for example, operations 800, or via gray-scale rigid body image registration with normalized cross correlation. In one example, embodiments may be configured to generate the pairwise aligned set according various techniques described herein, including, for example, according to operations 800. Operations 1000 also comprises, at 1030, accessing a set of orthogonal (x, z) ultrasound images of the eye acquired orthogonally in y, or nearly orthogonally, in y, to the plurality of the plurality of 2D (y, z) images, where the set of orthogonal (x, z) ultrasound images has fewer members than the plurality of 2D (y, z) images or scans acquired in x, where the set of orthogonal (x, z) ultrasound images is acquired at a faster rate than the plurality of 2D (y, z) images. In various embodiments, the set of orthogonal (x, z) ultrasound images of the eye may be acquired via rotating the ultrasound scanner on a rotating stage in relation to the original scan axis. Operations 1000 also includes, at 1040, registering the pairwise aligned set to the set of orthogonal (x, z) images. In one embodiment, registering the pairwise aligned set to the set of orthogonal (x, z) images comprises registering the pairwise aligned set to the set of orthogonal (x, z) images using rigid body registration with 3 free parameters, where the 3 free parameters comprise ($\Delta x$, $\Delta y$, $\Delta z$). For example, in one embodiment, we will proceed from the start to the end of the y-z scan volume (e.g., the plurality of 2D (y, z) images), registering a strip of scans (current plus 5) to the orthogonal image data using rigid body registration with 3 free parameters ($\Delta x$, $\Delta y$, $\Delta z$) constrained within a range to allow for gaps and repeats of image slices. In one embodiment, the range is, for example, on the order of a hundred microns. That is, the image, plus the 5 images ahead of it in the volume will be registered, thus forming a strip.

In another embodiment, the 3D ultrasound imaging may comprise a plurality of 2D (x, z) images or scans acquired in y, and operations 1000 may comprise, at 1030, accessing a set of orthogonal (y, z) ultrasound images of the eye acquired orthogonally in x to the plurality of 2D (x, z) images or scans acquired in y, where the set of orthogonal (y, z) ultrasound images has fewer members than the plurality of 2D (x, z) images or scans acquired in y, where the set of orthogonal (y, z) ultrasound images is acquired at a faster rate than the plurality of 2D (x, z) images or scans acquired in y. In this embodiment, operations 1000 also includes, at 1040, registering the pairwise aligned set to the set of orthogonal (y, z) images. In one embodiment, registering the pairwise aligned set to the set of orthogonal (y, z) images comprises registering the pairwise aligned set to the set of orthogonal (y, z) images using rigid body registration with 3 free parameters, where the 3 free parameters comprise ($\Delta x$, $\Delta y$, $\Delta z$).

Full-Orthogonal Alignment

Figure 11:
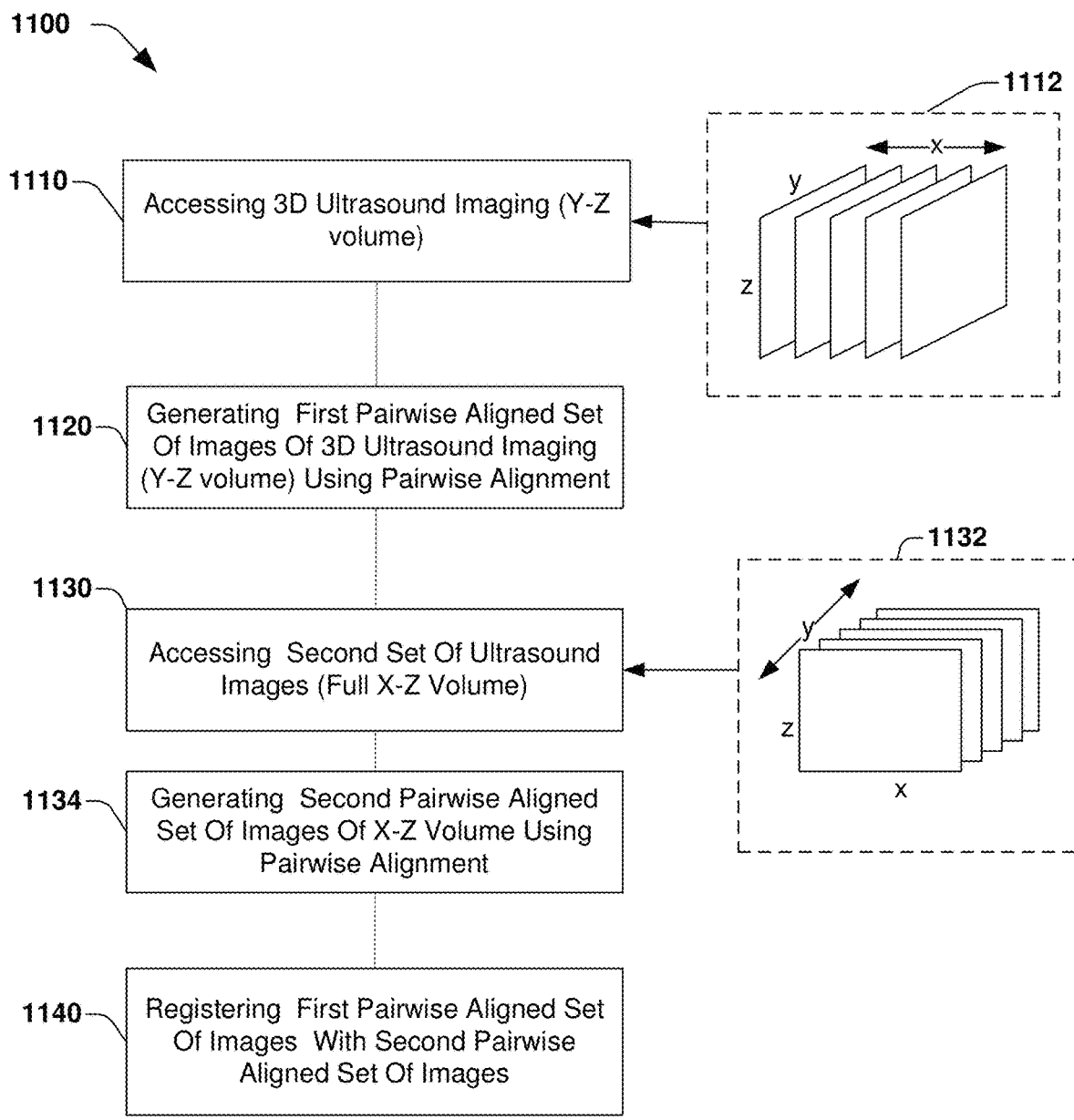
FIG. 11 illustrates a flow diagram of an example methodology or operations for aligning ultrasound imaging using full-orthogonal alignment according to various embodiments described herein.

Embodiments may align at least one portion of the 3D ultrasound imaging using a full-orthogonal alignment technique. A full-orthogonal alignment technique may comprise creating smooth A-line motion trajectories within two full orthogonal volumes, for example, a 3D ultrasound imaging of an eye, comprising a (y, z) volume acquired in x, and a second, different 3D ultrasound imaging of the eye, comprising a (x, z) volume acquired in y, so as to optimize the match between the two full orthogonal volumes and then generate a single volume having improved sampling and decreased noise. FIG. 11 illustrates a workflow diagram of example operations 1100 that when executed, control a processor to perform operations for aligning at least one portion of the 3D ultrasound imaging using a full-orthogonal alignment technique. Operations 1100 may be implemented as part of operations 200, or may be executed by the one or more processors 150 of apparatus 100, apparatus 3700, or by computer 3800, or any other systems, apparatus, or embodiments described herein. Operations 1100 comprises, at 1110, accessing a first 3D ultrasound imaging of an eye. In one embodiment, the first 3D ultrasound imaging may comprise a plurality of 2D (y, z) images or scans acquired in x, as illustrated at 1112. In one embodiment, operations 1100 comprises at 1120 generating a first pairwise aligned set of ultrasound images based, at least in part, on the first 3D ultrasound imaging using pairwise alignment according to various techniques described herein including, for example, operations 800. Embodiments may generate the first pairwise aligned set by aligning, on an image-by-image or scan-by-scan basis, the plurality of 2D (y, z) images or scans acquired in x using gray-scale rigid body image registration with normalized cross correlation. Operations 1100 also comprises, at 1130, accessing a second 3D ultrasound imaging of an eye. An example second 3D ultrasound imaging is illustrated at 1132. In one embodiment, the second 3D ultrasound imaging may comprise a plurality of 2D (x, z) images or scans acquired in y, as illustrated at 1132. Operations 1100 also comprises, at 1134, generating a second pairwise aligned set of ultrasound images based, at least in part, on the second 3D ultrasound imaging using pairwise alignment according to various techniques described herein including, for example, operations 800. Embodiments may generate the second pairwise aligned set by aligning, on an image-by-image or scan-by-scan basis, the plurality of 2D (x, z) images or scans acquired in y using gray-scale rigid body image registration with normalized cross correlation. Operations 1100 also comprises, at 1140, registering the first pairwise aligned set of ultrasound images with the second pairwise aligned set of ultrasound images. In one embodiment, registering the first pairwise aligned set of ultrasound images with the second pairwise aligned set of ultrasound images comprises: computing a first smooth A-line motion trajectory based on the first pairwise aligned set of ultrasound images; computing a second smooth A-line motion trajectory based on the second pairwise aligned set of ultrasound images; and registering the first pairwise aligned set of ultrasound images to the second pairwise aligned set of ultrasound images based on the first smooth A-line motion trajectory and the second smooth A-line motion trajectory.

[/end section B]

C. Transfer Functions that Give Unique 3D Ultrasound Views of Ciliary Body and Other Structures of Interest.

Figure 15:
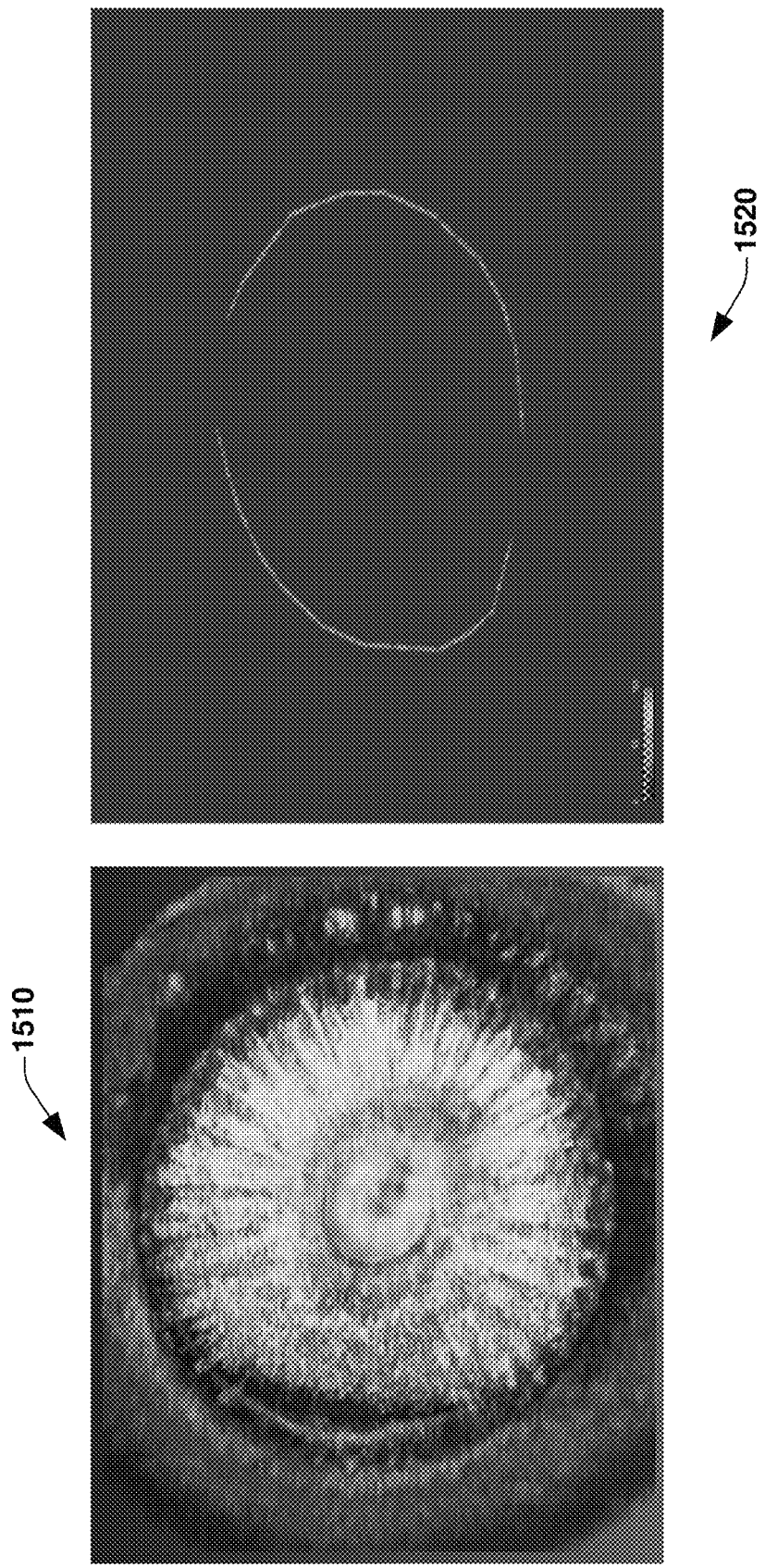
FIG. 15 illustrates an example 3D volume rendering of an eye, and an associated segmented Schlemm's canal according to various embodiments described herein.

Embodiments may facilitate selective visualization of 3D ultrasound imaging. Selective visualization of local anatomical structures, including, for example, ciliary body, ciliary process, iris, cornea, sclera, anterior chamber, or Schlemm's canal, is desirable in diagnosing, analyzing, or treating glaucoma. Selective visualization facilitates the visual enhancement of specific tissues of interest, for example, ciliary body, ciliary process, iris, cornea, sclera, anterior chamber, or Schlemm's canal, such that an ophthalmologist or other medical practitioner may better determine treatment strategy. Embodiments facilitate the development of lesion-specific treatment strategy or provision of lesion-specific treatment by providing improved visualization of clinically important information during operation via improved generation of a 3D volume rendering of the eye based on the 3D ultrasound imaging. Embodiments may further automatically segment local anatomical structures, including, for example, ciliary body, ciliary process, iris, cornea, sclera, anterior chamber, or Schlemm's canal, using a deep learning ocular structure segmentation model provided with 3D ultrasound imaging according to various techniques described herein, and display the segmented ocular structure on a display alongside or overlaid on the displayed 3D volume rendering. For example, FIG. 15 illustrates a 3D volume rendering 1510 of an eye displayed alongside a segmented Schlemm's canal at 1520 associated with the eye represented in the 3D volume rendering 1510. While a segmented Schlemm's canal is illustrated in FIG. 15, embodiments may display any segmented ocular structure (e.g., Schlemm's canal and collecting channels, anterior chamber, or ocular abnormality, or other ocular structure) segmented according to various techniques described herein (e.g., operations 200, 2200, 3000, or 3500) alongside or overlaid on a displayed 3D volume rendering.

Figure 12:
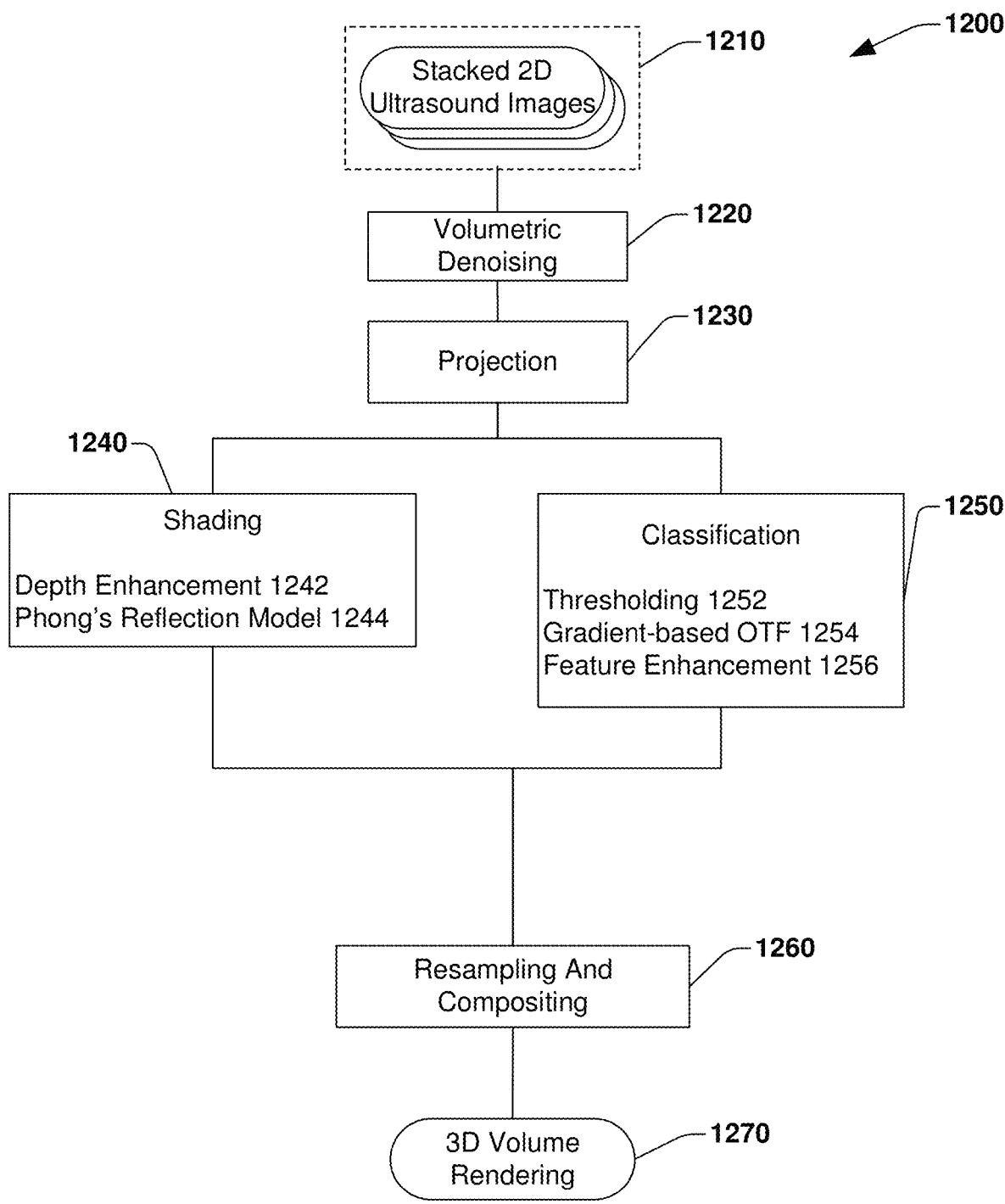
FIG. 12 illustrates a flow diagram of an example 3D volume rendering pipeline for ultrasound imaging according to various embodiments described herein.

Embodiments may employ ray casting to generate a 3D volume rendering based on 3D ultrasound imaging, for example, a 3D ultrasound volume acquired according to various techniques described herein. Ray casting is a computationally fast and convenient 3D rendering method that can describe the absorption, reflection, and refraction of a light source through a volume. Embodiments that employ ray casting may execute operations comprising at least one of: projection, shading, surface classification, or compositing, or may comprise processors, circuits, computers, apparatus, systems or other embodiments configured to store instructions or execute operations comprising at least one of: projection, shading, surface classification, or compositing. FIG. 12 illustrates a workflow diagram of an example set of operations 1200 that when executed, control a processor to perform operations for generating a 3D volume rendering according to embodiments described herein. Operations 1200 may be implemented by any of the at least one processors 150, or as part of operations 200, apparatus 3700, or by computer 3800, or any other systems, apparatus, or embodiments described herein. Operations 1200 includes, at 1210, accessing 3D ultrasound imaging, wherein the 3D ultrasound imaging may comprise a stacked set of 2D ultrasound images. The stacked set of 2D ultrasound images may include, for example a plurality of 2D (y, z) images or scans acquired in x, a plurality of 2D (x, z) images or scans acquired in y, or a plurality of 2D radial images.

Figure 13:
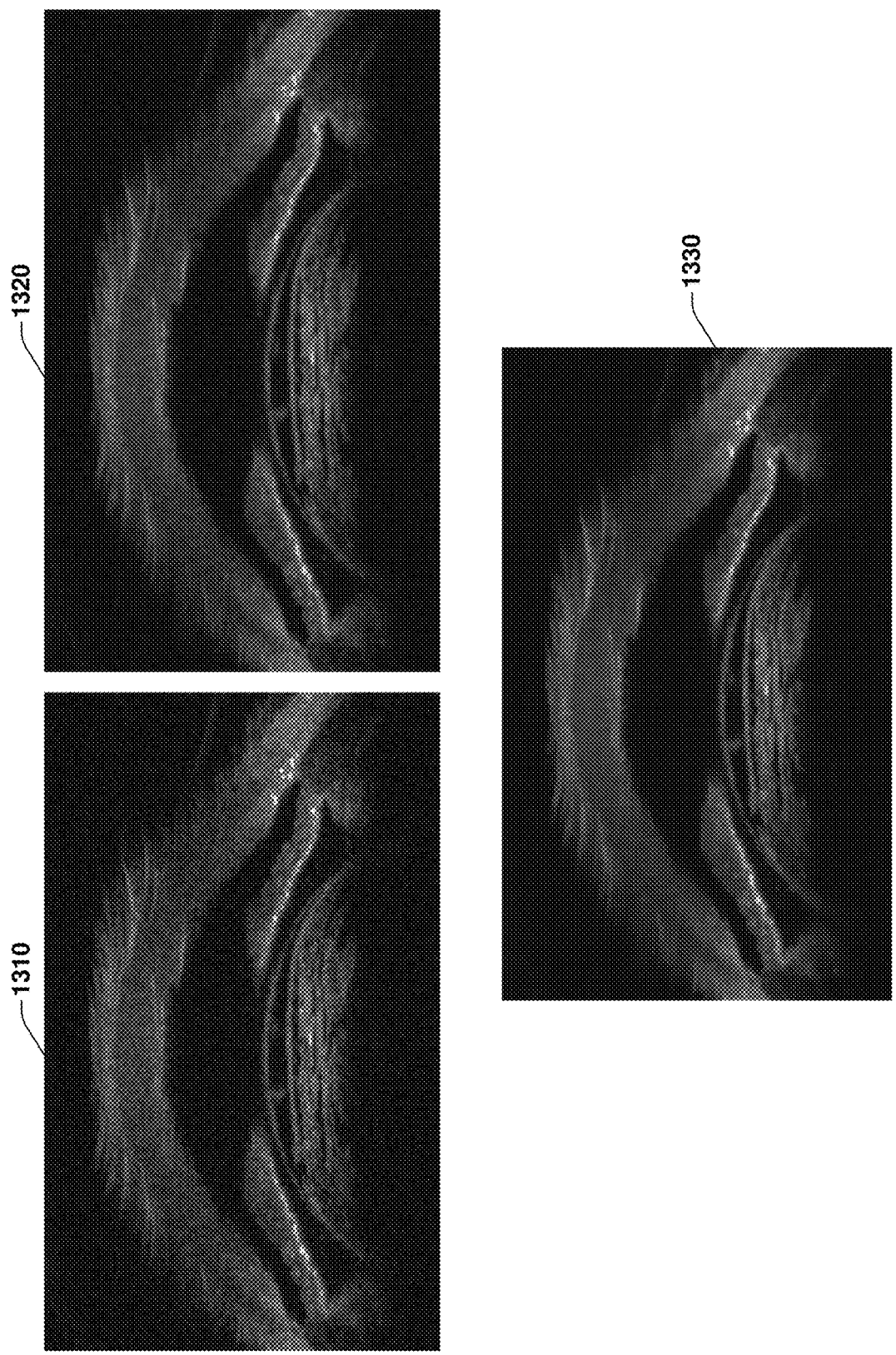
FIG. 13 illustrates example ultrasound images of an eye.

Operations 1200 also includes, at 1220, volumetrically denoising the stacked set of 2D ultrasound images accessed at 1210. In one embodiment, as a pre-processing operation, the stacked set of 2D ultrasound images accessed at 1210 is pre-processed at 1220 by volumetric denoising to remove speckle noises and preserve details of the edge. In one embodiment, volumetric denoising includes applying Gaussian filtering and non-linear diffusion filtering to the stacked set of 2D ultrasound images accessed at 1210. Gaussian filtering reduces the contrast and softens the edges of tissues represented in the stacked set of 2D ultrasound images accessed at 1210. A low-pass filter lets low frequencies go through but attenuates high frequencies and noise. FIG. 13 illustrates an example original 3D ultrasound image 1310, prior to volumetric denoising. In one embodiment, a 3×3×3 3D Gaussian mask is employed to reduce the speckle noises in the original ultrasound image 1310, illustrated at 1320. In this example, non-linear diffusion filtering is subsequently applied, resulting in non-linear diffusion filtered image 1330. The non-linear diffusion filter smooths out the difference between gray levels of neighboring voxels using a diffusion process in which energy between voxels of high and low energy is leveled. In contrast with the Gaussian filter, the edges are not smeared out, since the diffusion is reduced or prevented in the vicinity of edges. Therefore, embodiments preserve the details of edges.

Operations 1200 also includes projection 1230. At 1230, a light source emits a ray of light that travels to a surface that interrupts its progress. At this point, any combination of the abovementioned absorption, reflection, and refraction may happen. The surface may reflect all or part of the light ray, in one or more directions. The surface might also absorb part of the light, resulting in a loss of intensity of the projected light. If the surface has any color or opacity properties, it refracts a portion of the light in a different direction while absorbing some of the color.

Operations 1200 includes shading 1240, and classification 1250. While shading 1240 and classification 1250 are illustrated in parallel in FIG. 12, one of ordinary skill will understand that shading 1240 and classification 1250 may occur in series in embodiments described herein. For shading 1240, and classification 1250, an array of the input value $f_s(x)$ at the sample voxel location $v_i=(x_i,y_j,z_k)$ is used as an input for shading 1240, and classification 1250, separately. In one embodiment, shading 1240 may comprise employing a Phong's reflection model 1244. Phong's reflection model 1244 facilitates the production of an illusion of smooth surfaces at reasonable computational cost based on a weighted contribution of ambient background lighting, Lambertian reflectance, and specular reflection according to the equation 1 below:

$$c_p(r) = c(r)(k_a + k_d(N(r) \cdot L) + k_s(N(r) \cdot H)^{k_r}) \quad \text{(eq. 1)}$$

where $c_p(r)$ is the output color at voxel location r and $c(r)$ is color of the parallel light source. $k_a$, $k_d$, and $k_s$ indicate an ambient reflection coefficient, a diffuse reflection coefficient, and a specular reflection coefficient, respectively. $k_r$ is an exponent used for non-linear tuning of specular reflection. N is the normalized gradient, L is the normalized vector in direction of light source, and H is the normalized vector in direction of maximum highlight. In one embodiment, $k_a$, $k_d$, and $k_s$ are set to 0.3, 0.6, and 0.7, respectively.

In one embodiment, shading 1240 may optionally include depth enhancement 1242, implemented prior to Phong's model 1244. Depth enhancement techniques employed herein may be based on the property that the voxels that are farther from the viewer can create an illusion of depth.

Embodiments may enhance depth information by applying the intensity depth-cueing with a subtle color modulation. Depth-cueing comprises, in at least one embodiment, a dimming of color of a far away object in a scene to enhance the depth perception of the image. The distance color blending process is described as below in equation 2:

$$c_d = c_p(r)(1 - k_{d1}d_v^{k_{d2}}) + k_{d3}d_v^{d2}c_b \qquad \text{(eq. 2)}$$

where $c_d$ is the blended color, $k_{d1}$ and $k_{d3}$ control the size of the color blending effect, and $k_a t$ allows for nonlinear depth-based shading. $d_v$ is the fractional distance through the volume, and $c_b$ is a background color.

Figure 14:
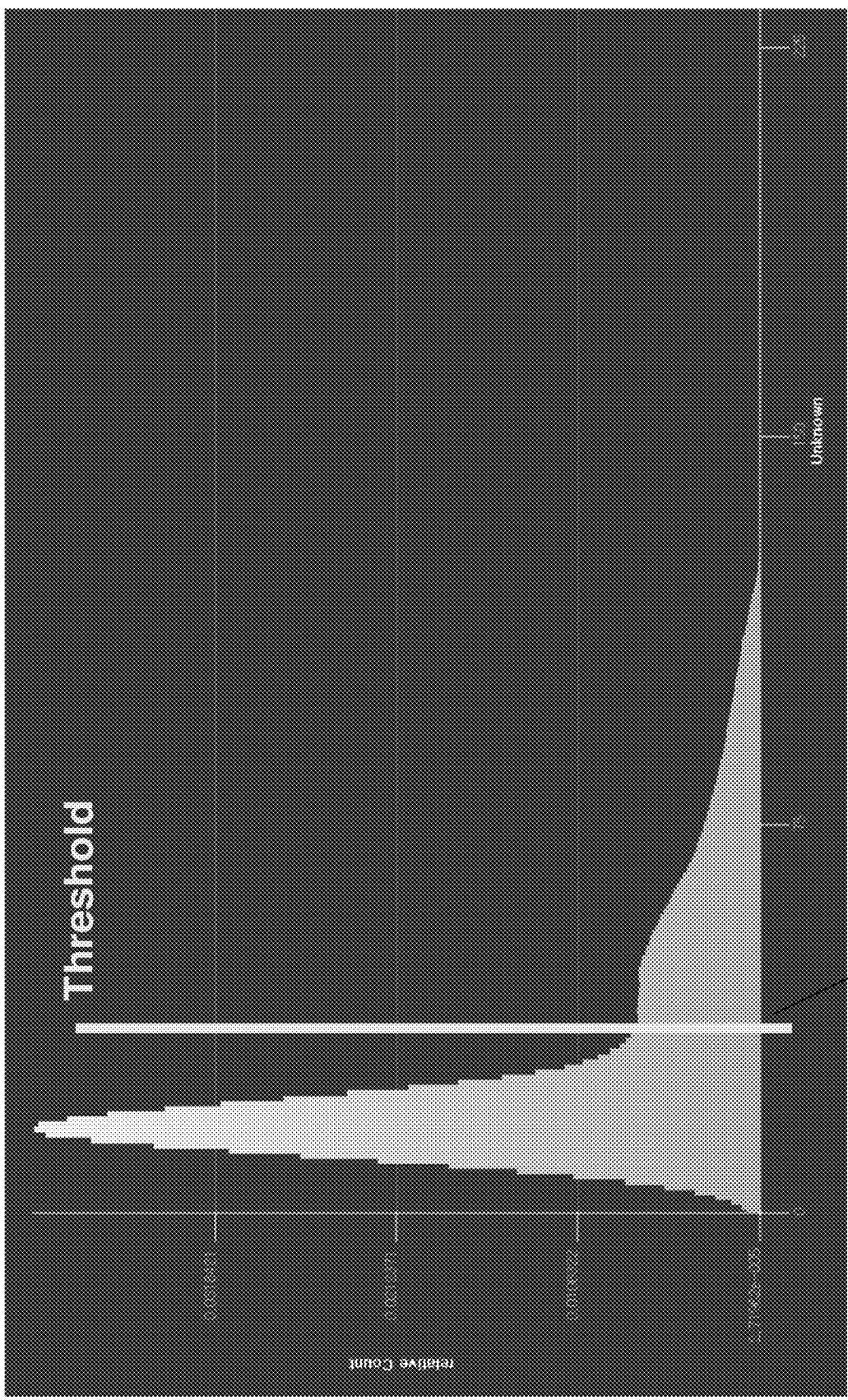
FIG. 14 illustrates a histogram of a denoised ultrasound image.

The appropriate mapping from input value to opacity plays an important role in surface classification in ray casting techniques. In one embodiment of operations 1200, classification 1250 comprises thresholding 1252. Thresholding 1252 comprises first applying a single threshold to get rid of the background region, as illustrated in FIG. 14. A threshold 1410 is automatically selected by means of an intensity profile of the denoised images. An ultrasound image may comprise a relatively darker region, which may include a large number of background and speckle noise profiles in the relatively darker region. Embodiments automatically estimate these unnecessary patterns (e.g., the large number of background and speckle noise profiles) and directly cut them from the image. Embodiments automatically estimate these unnecessary patterns and directly cut them from the image by first detecting the gray value occupying the largest number of pixels in the input data (e.g., the stacked 2D images). In one embodiment, the slope between ±3 gray levels is subsequently calculated until the slope converges close to zero. Embodiments may designate the minimum value as the threshold. Embodiments thus not only remove the background, but also eliminate residual speckle noises from the image, thereby improving on existing approaches. In one embodiment, the threshold may be user adjustable, or selected from a plurality of preset threshold values. For example, a first threshold value may be associated with a first ocular structure, while a second, different threshold value may be associated with a second, different ocular structure.

Classification 1250 may further comprise mapping the voxel values through a standard opacity transfer function (OTF) as below in equation 3:

$$\alpha_i = (k_{o1}v_i)^{k_{o2}} \qquad \text{(eq. 3)}$$

where $v_i$ is the volume sample value, $k_{o1}$ controls the maximum opacity, and exponent $k_{o2}$ controls contrast within the volume. In this example, an OTF is used to determine which voxels are visible from 3D rendering. If no transfer function is used, these values are set to constants for the whole volume.

Further improving on existing approaches, operations 1200 may employ gradient-based OTF opacity enhancement 1254 for 3D volume rendering, which scales the opacity of each voxel by the voxel's gradient magnitude to enhance the boundaries and make areas of constant density transparent. Embodiments employ gradient-based OTF opacity enhancement 1254 for 3D volume rendering to selectively emphasize the density of each volume or voxel. In one embodiment, a pixel gradient or voxel gradient is automatically calculated using a discrete gradient operator in the x, y, and z directions and the opacity of the input image is scaled by the scaled gradient magnitude as below in equation 4:

$$\alpha_g = \alpha_i(k_{g1} + k_{g2}(\|\nabla_{fs}\|)^{k_{gs}}) \qquad \text{(eq. 4)}$$

where $\alpha_i$ is the input opacity, $\nabla_{fs}$ is the gradient of the volume at the sample voxel location, and $\alpha_g$ indicates the output opacity. The use of the power of exponent $k_{g3}$ allows the non-linear tuning to best highlight the dataset.

After edge enhancement by gradient-based OTF opacity enhancement 1254, operations 1200 may optionally comprise feature enhancement 1256 based on visual cues provided by the edges of an object. In a 3D scene comprising multiple objects, the relative depth information can be conveyed by drawing edges of the multiple objects. In one embodiment, object edges are emphasized by increasing the opacity of voxels where the gradient nears perpendicular to the view direction (V) as described below in equation 5:

$$\alpha_f = \alpha_g(k_{f1} + k_{f2}(1 - |\nabla_{fs} \cdot V|)^{k_{fs}}) \qquad \text{(eq. 5)}$$

where $k_{f1}$ and $k_{f2}$ control the scaling and amount of non-linear tuning, respectively, and $k_{f3}$ determines the sharpness of the curve. When the opacity of edge voxels are increased, the edge voxels tend to be made darker, since the emission is accumulated at compositing 1260.

Operations 1200 also includes, at 1260, resampling and compositing. The compositing of a color and an opacity associated with each voxel from piecewise transfer functions are calculated by linear interpolations. In one embodiment, the emission from the voxel is defined as its color multiplied by its opacity and is attenuated by the opacities of surrounding voxels. Consequently, the resampled colors and opacities are merged with the background by compositing in back-to-front order the stack of 2D images to produce a specific color for each voxel as below in equation 6:

$$I = \Sigma_{i=0}^{M-1} c(r_i)\alpha(r_i)\Pi_{k=0}^{i}(1 - \alpha(r_k)) \qquad \text{(eq. 6)}$$

where $c(r)$ and $\alpha(r)$ indicate the color and opacity of the current location, M is discrete point on the ray, and I is the output image. To provide detailed tissue information, embodiments may determine the light source and light angle. In one embodiment, the color of the light source is designated in RGB channels (R: 0.667, G: 0.667, and B: 0.667) and the light source is propagated from the top left. Based on the resampled and composited imagery, embodiments generate the 3D volume rendering at 1270. Embodiments may further optionally display the 3D volume rendering on a computer monitor, a smartphone display, a tablet computer display, or other electronic display according to various techniques described herein. Embodiments may optionally extract 2D image slices from the 3D volume rendering, including, for example, x-y-, x-z, or y-z slices of the 3D volume rendering, and optionally display the extracted 2D image slices.

On the basis of operations 1200 or the generated 3D volume rendering, embodiments facilitate selectively visualizing various anatomical structures local to the eye, for example, the ciliary body, ciliary process, iris, cornea, sclera, anterior chamber, or Schlemm's canal and collecting channels, or ocular abnormalities. Selective visualization according to embodiments described herein facilitates the enhancement of specific tissues of interest so that a medical practitioner may more easily determine treatment strategy. For example, an ophthalmologist may provide improved lesion-specific treatment via embodiments, at least because selective visualization according to embodiments facilitates revealing clinically important information during implementation of embodiments described herein, for example, during a clinical ocular procedure, or in preparation for a clinical ocular procedure. FIG. 15 illustrates one example of selective visualization of 3D ultrasound imaging facilitated by embodiments described herein. FIG. 15 illustrates an image 1510 of an anterior chamber generated according to various techniques described herein, and an image 1520 of a segmented Schlemm's canal according to various techniques described herein. Compared to existing approaches, embodiments facilitate improved specification or segmentation of the local structure (e.g., Schlemm's canal) from the surrounding tissues. In another embodiment, other 3D volume rendering techniques may be employed.

Figure 16:
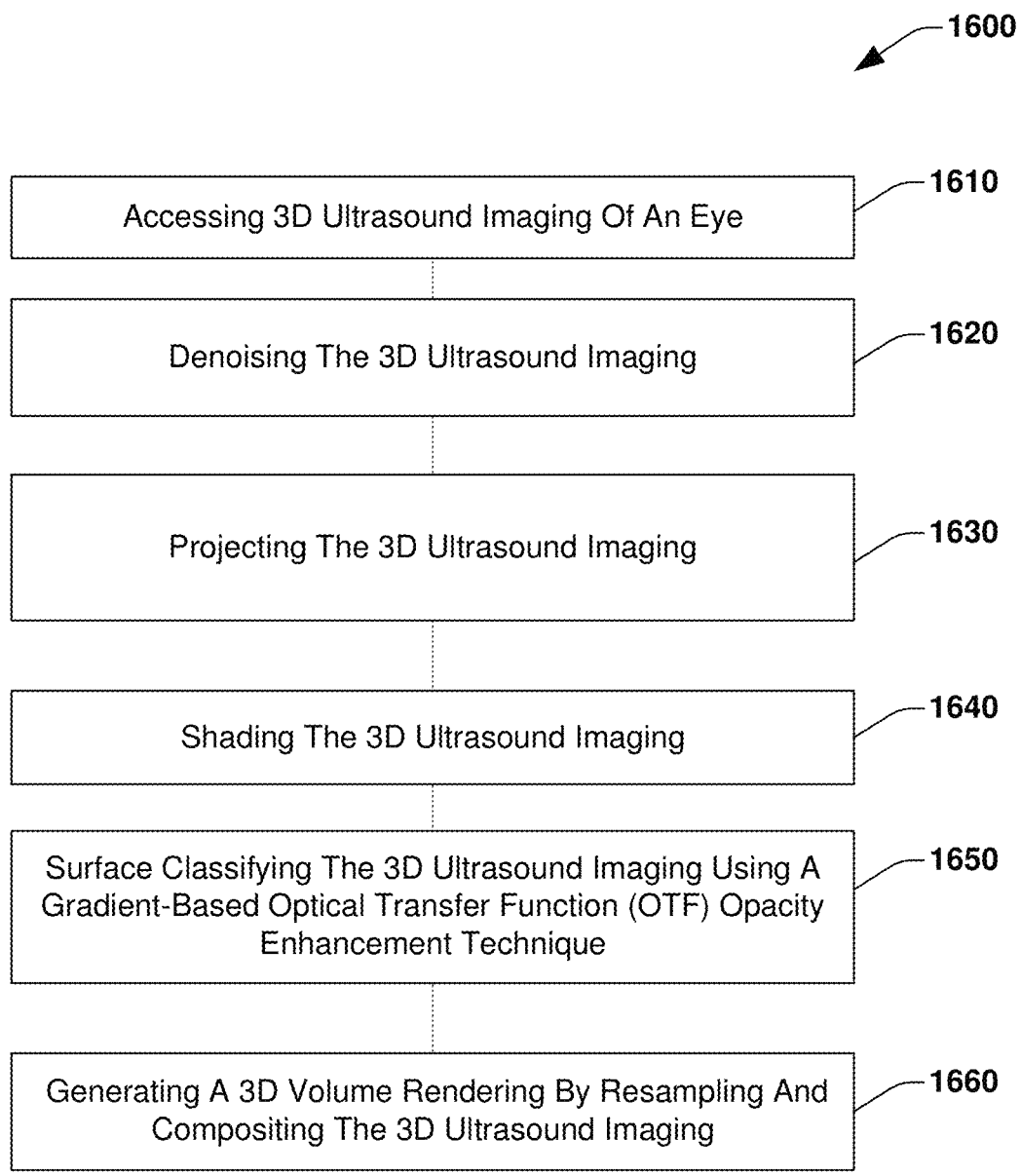
FIG. 16 illustrates a flow diagram of an example methodology or operations for generating a 3D volume rendering according to various embodiments described herein.

FIG. 16 illustrates an example set of operations 1600, that when executed, control a processor to perform operations that facilitate generating a 3D volume rendering of 3D imaging of an eye. Operations 1600 may be implemented as part of operations 200, or may be executed by the one or more processors 150 of apparatus 100, apparatus 3700, or by computer 3800, or any other systems, apparatus, or embodiments described herein. Operations 1600 comprise, at 1610, accessing 3D ultrasound imaging of an eye, wherein the 3D ultrasound imaging comprises a stacked set of two-dimensional (2D) ultrasound images, wherein the set of 2D ultrasound images defines a three-dimensional (3D) volume, wherein each member of the set of 2D ultrasound images comprises a plurality of pixels, a pixel having an associated intensity value, wherein the 3D volume comprises a plurality of voxels, a voxel having at least one of: an associated color value, an associated opacity value, or an associated intensity.

Operations 1600 also comprise, at 1620, denoising the 3D ultrasound imaging according to various techniques described herein. In one embodiment, denoising the 3D ultrasound imaging comprises denoising the 3D ultrasound imaging using at least one of: a Gaussian filter noise reduction technique, a non-linear diffusion filtering noise reduction technique, a rotational frames averaging noise reduction technique, an edge preserving filters noise reduction technique, a median kernel and center-weighted linear filter noise reduction technique, or at least one deep learning noise reduction model, wherein the at least one deep learning noise reduction model is trained on a deep learning noise reduction model training set.

Operations 1600 also comprise, at 1630, projecting the 3D ultrasound imaging according to various techniques described herein. For example, embodiments may project the 3D ultrasound imaging as in operations 1200.

Operations 1600 also comprise, at 1640, shading the 3D ultrasound imaging according to various techniques described herein. In one embodiment, shading the 3D ultrasound imaging comprises shading the 3D ultrasound imaging using at least one of a Phong's reflection model or a depth enhancement shading technique. For example, embodiments may shade the 3D ultrasound imaging as in operations 1200.

Operations 1600 also comprise, at 1650, surface classifying the 3D ultrasound imaging using a gradient-based optical transfer function (OTF) opacity enhancement technique according to various techniques described herein. In one embodiment, surface classifying the 3D ultrasound imaging using a gradient-based optical transfer function (OTF) opacity enhancement technique comprises selectively emphasizing a density of at least one of the plurality of voxels.

In one embodiment, surface classifying the 3D ultrasound imaging comprises thresholding the 3D ultrasound imaging based on an intensity profile of the 3D ultrasound imaging. In one embodiment, thresholding the 3D ultrasound imaging comprises applying a single threshold to get rid of a background region represented in the 3D ultrasound imaging. A threshold may be automatically selected by means of an intensity profile of the denoised 3D ultrasound imaging. 3D ultrasound imaging may comprise a relatively darker region, which may include a large number of background and speckle noise profiles in the relatively darker region. Embodiments automatically estimate these unnecessary patterns (e.g., the large number of background and speckle noise profiles) and directly cut them from the 3D ultrasound imaging. Embodiments automatically estimate these unnecessary patterns and directly cut them from the 3D ultrasound imaging by first detecting the gray value occupying the largest number of pixels in the input data (e.g., the stacked 2D images). In one embodiment, the slope between ±3 gray levels is subsequently calculated until the slope converges close to zero. Embodiments may designate the minimum value as the threshold. In one embodiment, the threshold may be user adjustable, or selected from a plurality of preset threshold values. For example, a first threshold value may be associated with a first ocular structure, while a second, different threshold value may be associated with a second, different ocular structure.

In one embodiment, surface classifying the 3D ultrasound imaging further comprises surface classifying the 3D ultrasound imaging using a feature enhancement technique. In one embodiment, surface classifying the 3D ultrasound imaging using a feature enhancement technique comprises increasing an opacity associated with a voxel where a gradient of the volume at the location of the voxel approaches perpendicular to a view direction (V). For example, embodiments may surface classify the 3D ultrasound imaging as in operations 1200.

Operations 1600 further comprises, at 1660, generating a 3D volume rendering by resampling and compositing the 3D ultrasound imaging according to various techniques described herein. In one embodiment, resampling and compositing the 3D ultrasound imaging comprises compositing a color and an opacity associated with each voxel using linear interpolation. In one embodiment, resampling and compositing the 3D ultrasound imaging comprises compositing a color and an opacity associated with each voxel using linear interpolation in a back-to-front order.

D. Extraction of Radial Images from 3D Ultrasound

Embodiments may facilitate extracting radial images from 3D ultrasound imaging. 3D ultrasound imaging is most commonly acquired in an (x, y, z) manner. However, several post-processing steps, including for example, deep learning segmentation of some ocular structures represented in 3D ultrasound imaging that demonstrate radial symmetry (e.g., Schlemm's canal, anterior chamber), are better performed with ultrasound data sampled in a ($\theta$, r, z) image stack. Embodiments may extract radial image planes from (x, y, z) 3D ultrasound imaging and construct a ($\theta$, r, z) image stack according to various techniques described herein. In one embodiment, 2D ultrasound (y, z) images are acquired and scanned along x to generate a 3D ultrasound volume (e.g., 3D ultrasound imaging). In this embodiment, the 3D ultrasound volume is converted to an isotropic volume using x, y, z spacing information associated with the 3D ultrasound volume. An x-y plane, perpendicular to the z-axis, is set at the center of the isotropic volume. The x-y plane is rotated anti-clockwise by a specific angle interval, and coordinates of the new slice may be extracted using the formula $x_1 = r \cos \theta$, $y_1 = r \sin \theta$. In this example, bicubic trilinear sampling in $\theta$ may be employed. In one embodiment, bicubic trilinear sampling in $\theta$ at an interval of 0.5° is employed. In another embodiment, other intervals or sampling techniques may be employed. Embodiments may extract new radial slices using interpolation from the isotropic volume. One of ordinary skill will appreciate that a similar approach may be applied to extract radial images from a stack of 2D ultrasound (x, z) images acquired via scanning along the y-axis.

Figure 17:
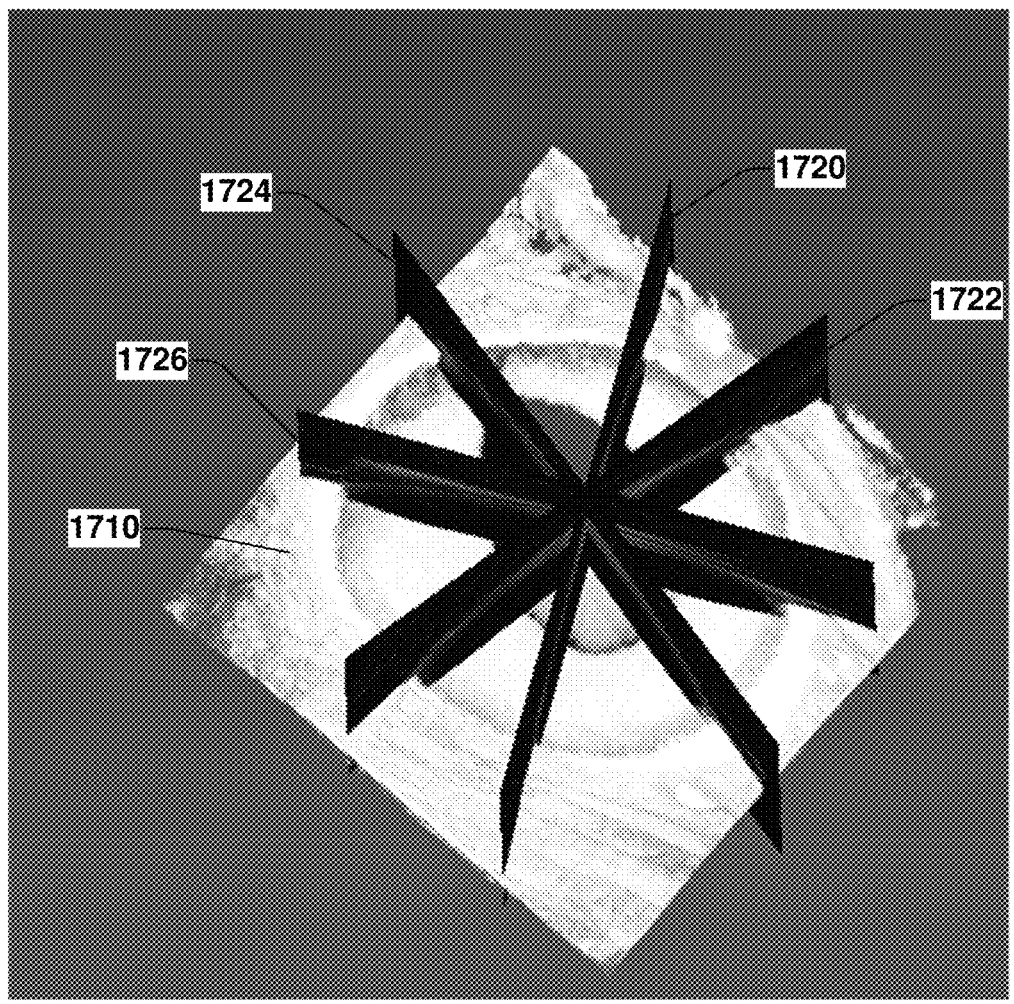
FIG. 17 illustrates an example 3D volume rendering of an eye, and associated radial image slices extracted according to various embodiments described herein.

FIG. 17 illustrates rotational frames extracted from a 3D ultrasound acquired stack of 2D images 1710 according to techniques described herein. Rotational frames or radial slices 1720-1726 are extracted from the 3D ultrasound acquired 2D stack of images 1710 according to various techniques described herein. By reformatting the 3D ultrasound acquired 2D stack of images 1710, embodiments may obtain rotational frames or radial slices 1720-1726 for further processing according to various techniques described herein.

Figure 18:
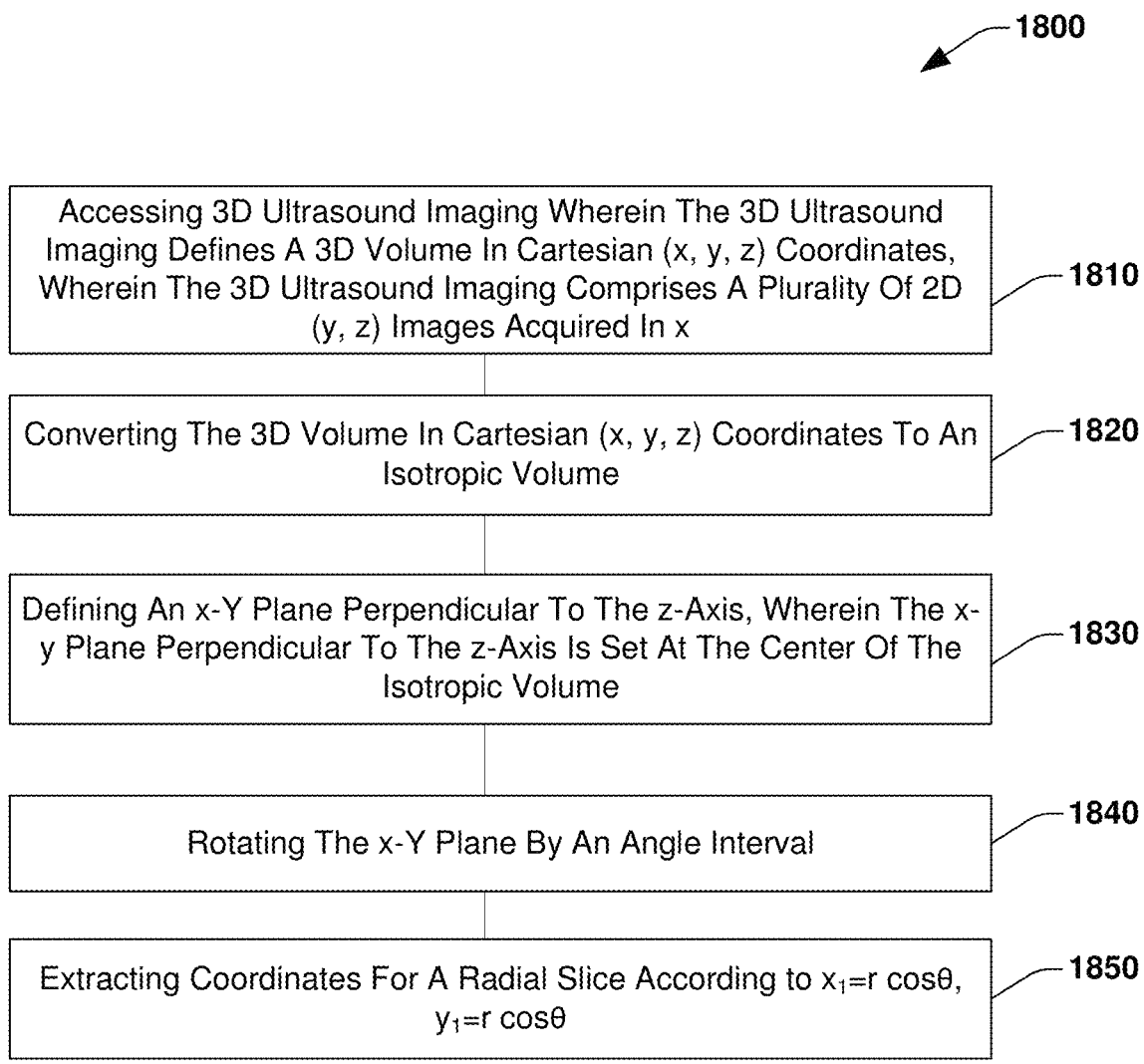
FIG. 18 illustrates a flow diagram of an example methodology or operations for extracting radial images from 3D ultrasound imaging according to various embodiments described herein.

FIG. 18 is a flowchart of an example set of operations 1800 that when executed, control a processor to perform operations that facilitate extraction of radial images from 3D ultrasound imaging. Operations 1800 may be implemented as part of operations 200, or may be executed by the one or more processors 150 of apparatus 100, apparatus 3700, or by computer 3800, or any other systems, apparatus, or embodiments described herein. In one embodiment, operations 1800 comprises, at 1810, accessing a set of (x, y, z) images. In one example, the set of (x, y, z) images may comprise 3D ultrasound imaging as described herein acquired according to various techniques described herein. Operations 1800 also comprises, at 1820, converting the set of (x, y, z) images to an isotropic volume. Converting the set of (x, y, z) images to an isotropic volume may comprise converting the set of (x, y, z) images to an isotropic volume based on spacing information associated with the set of (x, y, z) images. Operations 1800 also comprises, at 1830, defining an x-y plane perpendicular to the z-axis, wherein the x-y plane perpendicular to the z-axis is set at the center of the isotropic volume. Operations 1800 also comprises, at 1840, defining a radial slice by rotating the x-y plane by an angle interval. In one embodiment, the angle interval may be 0.5 degrees. In another embodiment, another angle interval may be employed, for example, 1 degree, 2 degrees, or 3 degrees. Operations 1800 also comprises, at 1850, extracting coordinates for the radial slice. In one embodiment, extracting coordinates for the radial slice comprises extracting coordinates for the radial slice according to $x_1 = r \cos \theta$, $y_1 = r \sin \theta$. A slice may be extracted using interpolation from the isotropic volume.

E. Advanced Noise Reduction for Improved 3D Ultrasound Visualization

Ultrasound imagery of the eye may be subject to speckle noise. To reduce speckle noise, embodiments described herein may reduce noise using various techniques described herein. Embodiments may reduce noise using noise reduction filtration techniques, or may reduce noise by providing 3D ultrasound imaging or a portion of a 3D ultrasound imaging to a deep learning noise reduction model configured to generate a low-noise image. Embodiments may train a deep learning noise reduction model, or generate a deep learning noise reduction model training set for use in training a deep learning noise reduction model.

Embodiments may reduce noise in 3D ultrasound imaging using rotational frames averaging. Existing ultrasound noise reduction approaches may average data slice-by-slice along a direction to reduce speckle noise, which may blur small circular structures of interest, for example, Schlemm's canal, and are thus sub-optimal. Embodiments may obtain rotational or radial frames according to various techniques described herein, for example, operations 1800, and average the rotational or radial frames to reduce speckle noise while still maintaining small circular structures, for example, Schlemm's canal. For example, embodiments may average 0 degree, 0.5 degree and 1 degree rotational or radial frames to create a new noise free rotational or radial frame at 0.5 degrees. Smaller circular structures will be similar in all these rotational or radial images, so rotational frames averaging will not distort the smaller circular structures. Embodiments may employ edge preserving filters to noise reduce images. Embodiments may reduce noise in 3D ultrasound imaging using an anisotropic diffusion filter, or non-local mean filter.

Embodiments may reduce noise using a deep learning noise reduction model, including, for example, a convolutional neural network, or a generative adversarial network. In one embodiment, the deep learning noise reduction model comprises a generative adversarial network (GAN) optimized with Wasserstein Distance and perceptual loss. To train a deep learning noise reduction model, embodiments may employ pairs of images, for example, a low-noise ideal image and a noisy image according to various techniques described herein. Embodiments may facilitate generating a low-noise 3D ultrasound data set suitable for training a deep learning noise reduction model. In one embodiment, a deep learning noise reduction model training data set may be generated by scanning a plurality of cadaver eyes using a 3D ultrasound scanner, for example, ultrasound scanner 300. Embodiments may access a plurality of 3D ultrasound imaging of eyes, wherein each member of the plurality of 3D ultrasound imaging of eyes is acquired using dense sampling in x. For example, embodiments may scan a member of the plurality of cadaver eyes at very low speed (i.e., at a slower speed than a typical in vivo clinical ocular ultrasound exam) and acquire images with very fine sampling in x, generating a volume having, for example, 9000 scans. In this example, scanning is performed in a water bath to avoid motion artifacts that existing approaches may experience when using a flexible water chamber. In this example, a center weighted image frame averaging filter is then applied to the acquired images to generate the low-noise 3D ultrasound image. While in this example, scanning along the x-axis is described, embodiments may generate a deep learning noise reduction model training data set via scanning along y using similar techniques.

In one embodiment, prior to the application of the center weighted image frame averaging filter, embodiments may generate a noisy image set by extracting a smaller number of noisy frames. For example, embodiments may extract nine (9), equally sampled one-thousand (1000) frame noisy volumes from a 9000 frame scan, by averaging 9 frames. In one example, averaging of multiple frames comprises summing together the "n" frames and then dividing the resulting sum by "n." Embodiments may then train a deep learning noise reduction model using the noisy image set and the low noise images. In another embodiment, embodiments may extract unequally sampled frame volumes. While in this example, nine (9) equally or unequally sampled one-thousand (1000) frame volumes are described, one of ordinary experience in the art will appreciate that other numbers of equally or unequally sampled frame volumes having another, different number of frame volumes, may be extracted. For example, embodiments may extract ten (10) equally sampled nine-hundred (900) frame volumes from a 9000 frame scan.

Embodiments may facilitate generating a deep learning noise reduction model training data set, wherein the deep learning noise reduction model training data set comprises a plurality of 3D ultrasound imaging of eyes (e.g., 3D volumes), wherein each of the plurality of 3D ultrasound imaging of eyes is acquired using simulated spatial compounding. Spatial compound imaging is a technique in which a number of ultrasound images of an object are obtained from different directions, then combined into a single compound image. For example, in one embodiment, generating a deep learning noise reduction model training data set may comprise scanning each of a plurality of cadaver eyes using a 3D ultrasound scanner along x, while slightly changing the orientation of the eye relative to the 3D ultrasound scanner. For example, while scanning along x, the 3D ultrasound scanner may be rotated a small amount, for example, from 0 to 5 degrees, off the axis of scan. In one example, a center weighted image frame averaging filter may then be applied to the images acquired using simulated spatial compounding to generate the low-noise 3D ultrasound image. Prior to application of the center weighted image frame averaging filter, embodiments may extract a subsampled set of noisy images as described herein. In this example, embodiments may train a deep learning noise reduction model using the low noise simulated spatial compounding imagery, and the subsampled set of noisy images. While in this example, scanning along the x-axis is described, embodiments may generate a deep learning noise reduction model training data set via scanning along y using similar techniques.

Figure 19:
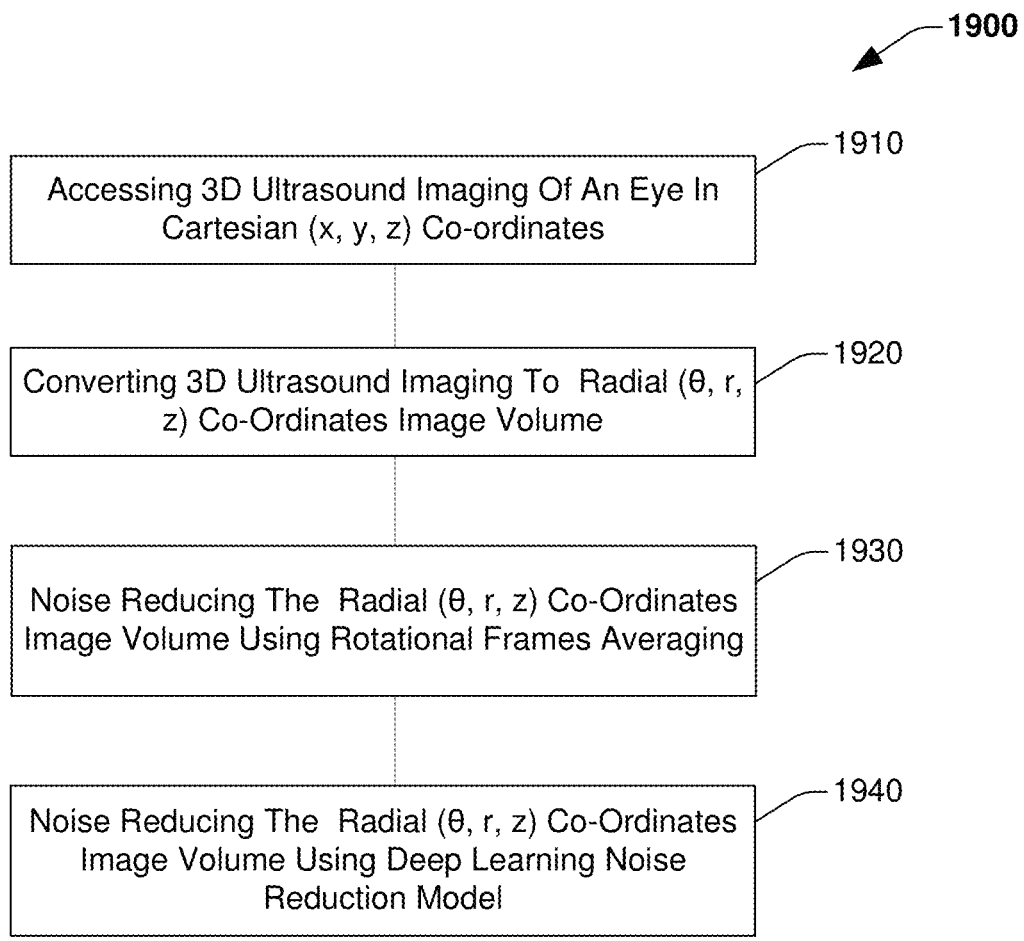
FIG. 19 illustrates a flow diagram of an example methodology or operations for noise reducing 3D ultrasound imaging according to various embodiments described herein.

FIG. 19 illustrates a workflow diagram of an example set of operations 1900 that when executed, control a processor to perform operations for noise reducing at least one portion of a 3D ultrasound imaging. Operations 1900 may be implemented as part of operations 200, or may be executed by the one or more processors 150 of apparatus 100, apparatus 3700, or by computer 3800, or any other systems, apparatus, or embodiments described herein. Operations 1900 comprises, at 1910, accessing a 3D ultrasound imaging of an eye. In this example, the 3D ultrasound imaging of an eye is represented in cartesian (x, y, z) co-ordinates. Operations 1900 comprises, at 1920, converting the 3D ultrasound cartesian (x, y, z) co-ordinates imaging to a 3D radial ($\theta$, r, z) coordinates volume. Operations 1900 comprises, at 1930, noise reducing the 3D radial ($\theta$, r, z) coordinates volume using at least one of: rotational frames averaging noise reduction, an anisotropic diffusion filter, or a non-local mean filter. In another embodiment, noise reducing the 3D radial ($\theta$, r, z) coordinates volume at 1930 may comprise noise reducing the 3D radial ($\theta$, r, z) coordinates volume using another, different noise reduction filtering technique. Operations 1900 comprises, at 1940, noise reducing the 3D radial ($\theta$, r, z) coordinates volume using a deep learning noise reduction model trained according to various techniques described herein. In one embodiment, operations 1900 may optionally skip noise reducing the 3D radial ($\theta$, r, z) coordinates volume using at least one of: rotational frames averaging noise reduction, an anisotropic diffusion filter, or a non-local mean filter at 1930, and optionally provide the 3D radial ($\theta$, r, z) coordinates volume directly to a deep learning noise reduction model.

Figure 20:
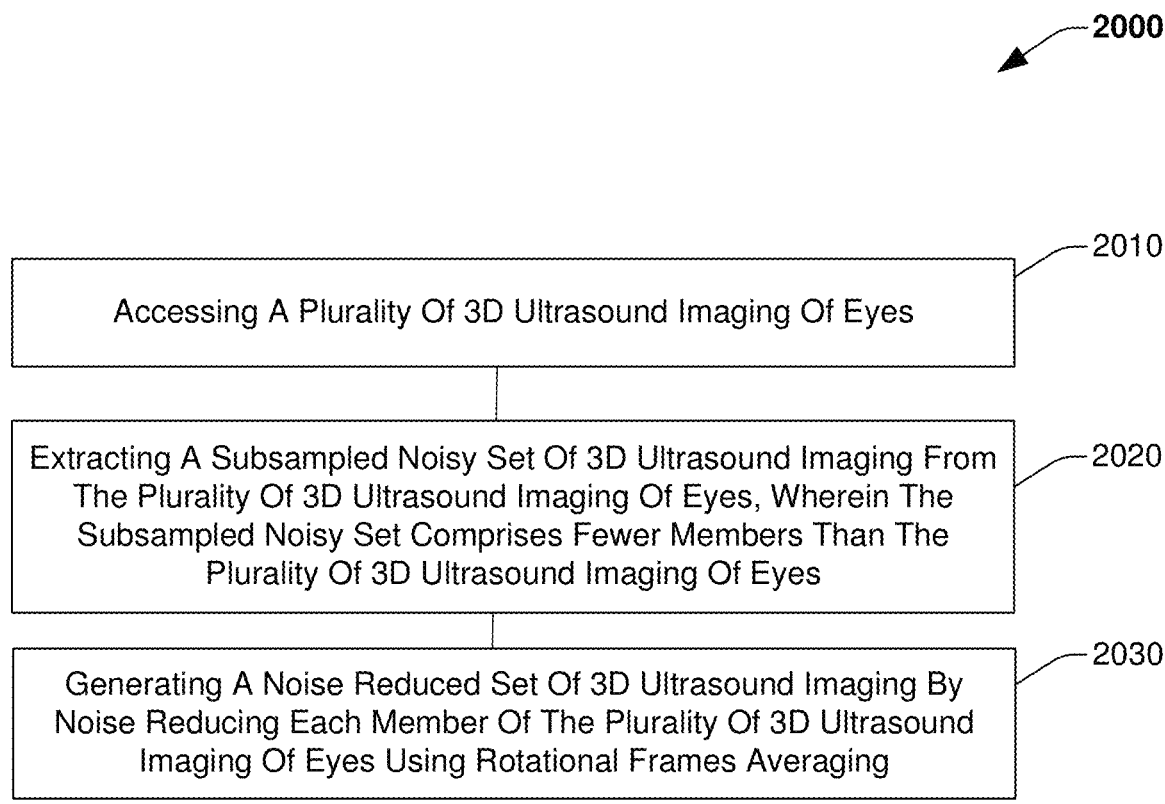
FIG. 20 illustrates a flow diagram of an example methodology or operations for generating a deep learning noise reduction model training set according to various embodiments described herein.

FIG. 20 illustrates an example set of operations 2000 that when executed, control a processor to perform operations for generating a deep learning noise reduction model training set. Operations 2000 may be implemented as part of operations 200, or may be executed by the one or more processors 150 of apparatus 100, apparatus 3700, or by computer 3800, or any other systems, apparatus, or embodiments described herein. Operations 2000 comprises, at 2010, accessing a plurality of 3D ultrasound imaging of eyes. In one example, each of the 3D ultrasound imaging of eyes is represented in cartesian (x, y, z) co-ordinates. Operations 2000 may comprise converting the 3D ultrasound cartesian (x, y, z) co-ordinates imaging to a 3D radial ($\theta$, r, z) coordinates volume. Operations 2000 comprises, at 2020, extracting a subsampled noisy set of 3D ultrasound imaging from the plurality of 3D ultrasound imaging of eyes, wherein the subsampled noisy set comprises fewer members than the plurality of 3D ultrasound imaging of eyes. Operations 2000 comprises, at 2030, generating a noise reduced set of 3D ultrasound imaging by noise reducing each member of the plurality of 3D ultrasound imaging of eyes using rotational frames averaging.

In one embodiment, extracting a subsampled noisy set of 3D ultrasound imaging from the plurality of 3D ultrasound imaging of eyes comprises extracting an equally sampled noisy set of 3D ultrasound imaging from the plurality of 3D ultrasound imaging of eyes, or an unequally sampled noisy set of 3D ultrasound imaging from the plurality of 3D ultrasound imaging of eyes.

In one embodiment, each member of the plurality of 3D ultrasound imaging of eyes is acquired using dense sampling in x. In one example, each member of the plurality of 3D ultrasound imaging of eyes may be acquired by scanning a member of a plurality of cadaver eyes at very low speed, for example, at a slower speed than a typical in vivo clinical ocular ultrasound exam, and with very fine sampling in x, generating a volume having, for example, 9000 scans. In this example, scanning is performed in a water bath to avoid motion artifacts that existing approaches may experience when using a flexible water chamber. In another example, each member of the plurality of 3D ultrasound imaging of eyes is acquired using dense sampling in y.

In one embodiment, each member of the plurality of 3D ultrasound imaging of eyes is acquired using simulated spatial compounding according to various techniques described herein.

F. Deep Learning Segmentation of the Anterior Chamber

Embodiments facilitate automated segmentation of at least one ocular structure represented in 3D ultrasound imagery, which facilitates improved evaluation of glaucoma or other ocular pathologies. Embodiments, via the segmentation of at least one ocular structure, further facilitate improved assessment of the at least one ocular structure, including via improved quantification of clinical metrics associated with the segmented ocular structure. For example, improved segmentation of an anterior chamber may facilitate more accurate computation of an iridocorneal angle, an area of the anterior chamber, or a volume of the anterior chamber, which may further facilitate improved tracking of changes in the volume of the anterior chamber over time, which may facilitate improved assessment of glaucoma, or facilitate improved treatment planning.

Embodiments may employ at least one deep learning ocular structure segmentation model to segment ocular structures represented in 3D ultrasound imagery. A deep learning ocular structure segmentation model as employed herein, may comprise, in one example, a convolutional neural network (CNN). A CNN may comprise a plurality of building blocks, for example, convolutional layers, pooling layers, activation layers, loss layers, and so on. Each convolutional layer comprises filters with shared parameters that learn to extract hierarchical features from an input image or volume. Activation layers introduce non-linearity that helps the CNN model complex relationships between the input (e.g., 3D ultrasound imaging) and output (e.g., predicted segmentation volume, noise-reduced imaging). Pooling layers provide dimensionality reduction, while preserving the most relevant features. Through stacks of convolutional, activation, and pooling layers, an estimate of the output is predicted. A loss layer in the end calculates a loss/deviation between a ground truth (e.g., a ground truth label of an ocular structure) and the predicted output (e.g., a predicted segmentation volume of the ocular structure). The loss is minimized using backpropagation, and a mapping network between the input and output is established. For medical image segmentation, fully convolutional networks may be employed. One example fully convolutional network is U-net. Embodiments may employ a fully convolutional network architecture for segmentation of ocular structures from a 3D volume, including, for example, an anterior chamber, a Schlemm's canal or collecting channel, an ocular abnormality (e.g., tumor, cyst, melanoma, or nevus), or other ocular structure. A deep learning ocular structure segmentation model as described herein may be configured to accept a 3D ultrasound image volume as an input, or may be configured to accept at least one 2D ultrasound image as an input, including, for example, a cartesian (y, z) image, or a radial (r, z) image. A deep learning ocular structure segmentation model as described herein may be configured to generate a predicted segmentation volume on a frame-by-frame basis, or may be configured to generate a predicted segmentation volume for a 3D volume.

Figure 21:
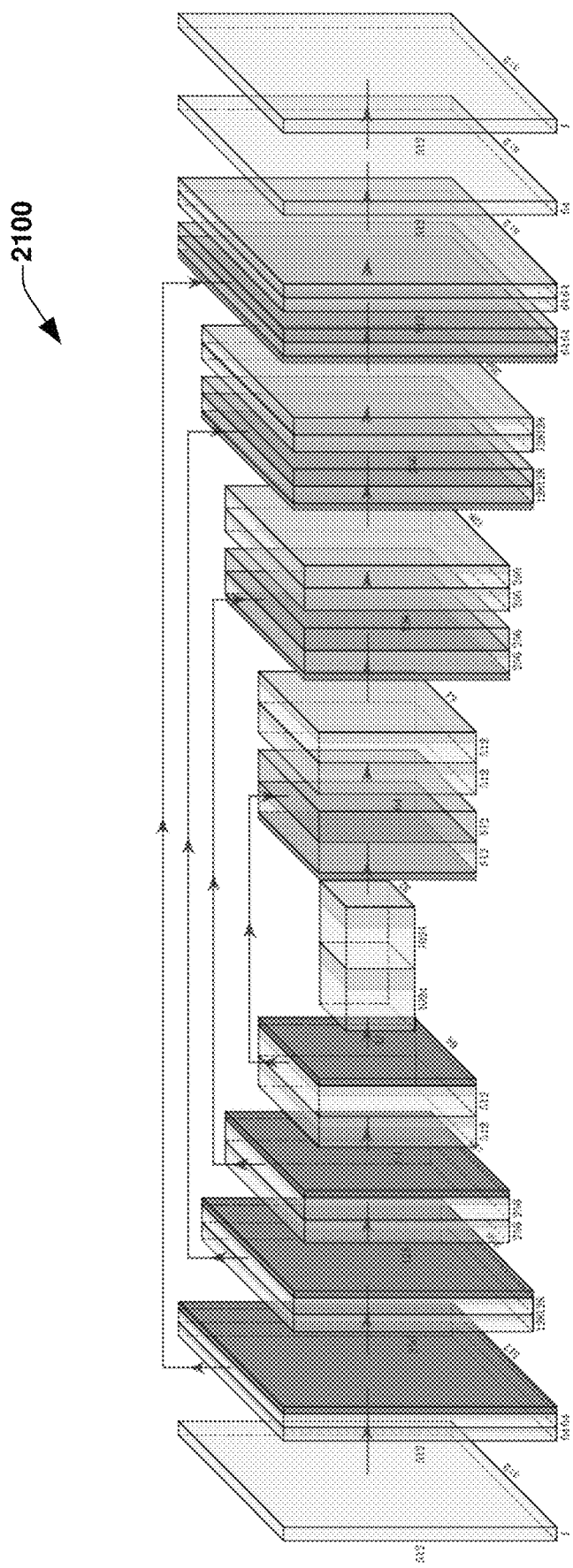
FIG. 21 illustrates an example convolutional neural network (CNN) architecture.

An example CNN architecture 2100 which may be employed by embodiments is illustrated in FIG. 21. Through a cascade of convolutional, activation, and pooling layers, a CNN, for example a deep learning ocular structure segmentation model as described herein, predict the segmentation of the ocular structure. In embodiments described herein, a deep learning ocular structure segmentation model is optimized to reduce a loss function associated with the deep learning ocular structure segmentation model using a stochastic gradient descent, RMSprop, Adagrad, Adadelta, or Adam loss function optimization technique. In one embodiment, the loss function L is defined as:

$$L = 1 - \frac{2 |\text{Predicted Label} \cap \text{Ground Truth}|}{|\text{Predicted Label} \cup \text{Ground Truth}|}.$$

In another embodiment, another, different loss function may be employed. A CNN, for example a deep learning ocular structure segmentation model as described herein, facilitates capturing local information and merging that with global spatial information to learn improved semantic segmentation of an ocular structure, compared to existing segmentation approaches.

Embodiments may train a deep learning ocular structure segmentation model, for example, a deep learning anterior chamber segmentation model, according to various techniques described herein. In one example, an anterior chamber training set may comprise twenty (20) anisotropic 3D ultrasound image volumes defined in Cartesian (x, y, z) co-ordinates, and anterior chamber ground truths associated with each of the anisotropic ultrasound image volumes, respectively. The associated anterior chamber ground truths may be defined concurrently with or prior to the implementation or execution of techniques described herein, for example, by an expert human ophthalmologist. In one embodiment, each of the twenty (20) anisotropic 3D ultrasound image volumes defined in Cartesian (x, y, z) co-ordinates has dimensions of 384 by 1,110 by 998. In another embodiment, each of the anisotropic 3D ultrasound image volumes defined in Cartesian (x, y, z) co-ordinates may have other, different dimensions. Embodiments may train at least one deep learning ocular structure segmentation model, for example, at least one deep learning anterior chamber segmentation model, using Cartesian (x, y, z) image data inputs, or radial (θ, r, z) image data inputs.

Embodiments of deep learning ocular structure segmentation models may segment an anterior chamber represented in 3D ultrasound imaging according to any of the following techniques: segmentation through Cartesian slices, or segmentation through radial slices.

Approach 1: Segmentation Through Cartesian Slices

Embodiments may facilitate segmenting an ocular structure, including for example, an anterior chamber represented in 3D ultrasound imaging via segmentation through Cartesian slices. In one embodiment, embodiments may extract 2D (y, z) images from an anisotropic 3D ultrasound volume, and provide the 2D (y, z) images to a deep learning anterior chamber segmentation model configured to accept Cartesian 2D (y, z) images as input. Embodiments may train a first deep learning anterior chamber segmentation model configured to accept Cartesian 2D (y, z) images as input, for example, a CNN as described herein, and may save the trained first deep learning anterior chamber segmentation model. For example, from a training set of twenty (20) eye volumes, embodiments may acquire approximately one-thousand (1000) 2D (y, z) images per eye volume, for a total of approximately twenty-thousand (20000) 2D (y, z) images. In one example, each member of the training set of twenty eye volumes has a ground truth label associated with each member of the training set, where the ground truth label may be known or accessed by various embodiments. In one embodiment, a ground truth label is annotated by an expert ophthalmologist.

Approach 2: Segmentation Through Radial Slices

Embodiments may facilitate segmenting an ocular structure, including, for example, an anterior chamber represented in 3D ultrasound images via segmentation through radial slices. Embodiments may segment an ocular structure via a second deep learning anterior chamber segmentation model configured to accept radial (θ, r, z) image data as an input. Embodiments may train the second deep learning anterior chamber segmentation model configured to accept radial (θ, r, z) image data as an input, and save the trained second deep learning anterior chamber segmentation model. In one example, embodiments resample each training eye volume of the training set of twenty (20) eye volumes described herein with respect to Approach 1, according to various techniques described herein, including techniques described in Section D: Extraction of radial images from 3D ultrasound, for example, operations 1800. Embodiments may resample each training eye volume of the training set of twenty (20) eye volumes to extract 2D radial (r, z) images which may be employed for training the second deep learning anterior chamber segmentation model configured to accept radial (θ, r, z) image data as an input. In one example, 360 radial images (e.g., 180/angle interval (0.5)) images are extracted from each of the training set of twenty (20) eye volumes, giving 7,200 images over 20 eye volumes.

Evaluation

Embodiments may evaluate deep learning models, including deep learning ocular structure segmentation models described herein for accuracy in segmenting an ocular structure represented in 3D ultrasound imaging. For example, embodiments may evaluate a first deep learning anterior chamber segmentation model configured to accept Cartesian 2D (y, z) images as input, and a second deep learning anterior chamber segmentation model configured to accept radial (θ, r, z) image data as an input, for accuracy in segmenting the anterior chamber, using an anterior chamber testing data set comprising 3D ultrasound imaging associated with five (5) eye volumes, and known ground truths associated with each of the five (5) eye volumes, where each of the five (5) eye volumes is associated with a different patient, respectively. In one embodiment, a ground truth label is annotated by an expert ophthalmologist prior to the execution of embodiments described herein. While a testing set of five (5) eye volumes is described in this example, in various embodiments, the testing set may have another, different number of eye volumes, for example, four, or ten eye volumes. Evaluating a deep learning ocular structure segmentation model described herein for accuracy may comprise comparing the output of the deep learning ocular structure segmentation model, for example, the predicted segmentation volume, with a known ground truth associated with the input. Embodiments may evaluate a first deep learning ocular abnormality segmentation model, or a second deep learning ocular abnormality segmentation model, with an ocular abnormality testing data set using similar techniques as described with respect to evaluating a deep learning anterior chamber segmentation model. Embodiments may evaluate a first deep learning Schlemm's canal segmentation model, or a second deep learning Schlemm's canal segmentation model, with a Schlemm's canal testing data set using similar techniques as described with respect to evaluating a deep learning anterior chamber segmentation model.

Embodiments described herein may comprise operations that when executed control a processor to perform operations for training a deep learning model, including for example, a deep learning noise reduction model or a deep learning ocular structure segmentation model. In various embodiments, the deep learning model is trained and tested using a training set of images and a testing set of images. A ground truth label associated with each member of a training set and testing set may be known or accessed by various embodiments. Training the deep learning model may include training the deep learning model until a loss function stops minimizing, until a threshold level of accuracy is achieved, until a threshold time has been spent training the deep learning model, until a threshold amount of computational resources have been expended training the deep learning model, or until a user terminates training. Other training termination conditions may be employed. Training a deep learning model may also include determining which deep learning model operating parameters are most discriminative in distinguishing a first class from a second class (e.g., ocular structure, background, or noise, not-noise). Training the deep learning model may also include determining settings outside the deep learning model architecture but relevant to its learning behavior.

Figure 22:
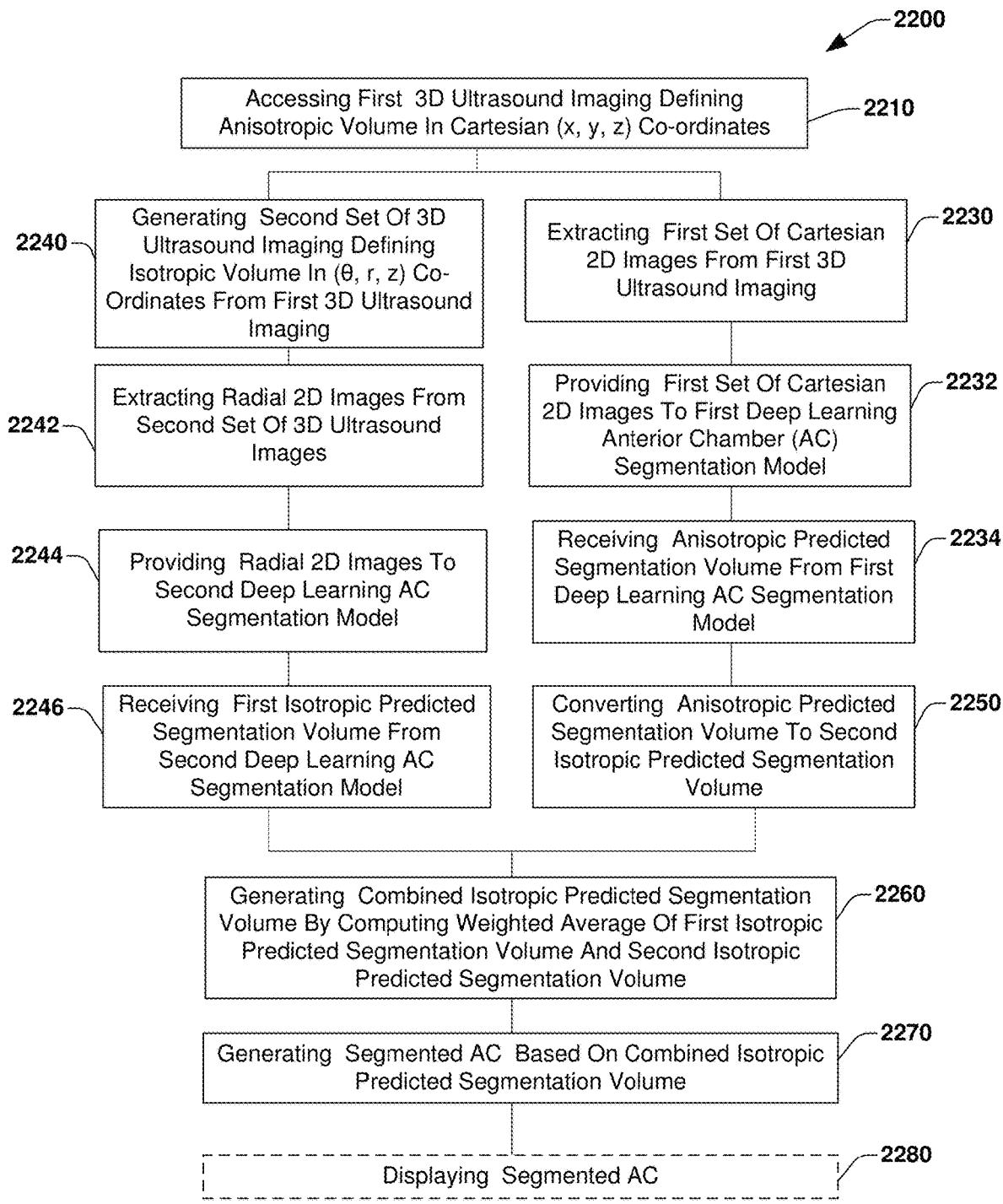
FIG. 22 illustrates a flow diagram of an example methodology or operations for segmenting an anterior chamber represented in 3D ultrasound imaging according to various embodiments described herein.

FIG. 22 illustrates a workflow diagram of an example set of operations 2200 that when executed, control a processor to perform operations for generating a segmented ocular structure via at least one deep learning ocular structure segmentation model. In this example, the ocular structure is an anterior chamber. Operations 2200 may be implemented as part of operations 200, or may be executed by the one or more processors 150 of apparatus 100, apparatus 3700, or by computer 3800, or any other systems, apparatus, or embodiments described herein. Operations 2200 comprises, at 2210, accessing a first three-dimensional (3D) ultrasound imaging of an eye, where the eye comprises an anterior chamber (AC), where the first 3D ultrasound imaging defines an anisotropic 3D volume in Cartesian (x, y, z) co-ordinates.

Operations 2200 also comprises, at 2230, extracting a first set of Cartesian two-dimensional (2D) ultrasound images from the first 3D ultrasound imaging, where a member of the first set of Cartesian 2D ultrasound images is represented in (y, z) co-ordinates.

Operations 2200 also comprises, at 2232, providing the first set of Cartesian 2D ultrasound images to a first deep learning AC segmentation model configured to generate an anisotropic predicted segmentation volume of an anterior chamber. In one embodiment, the first deep learning AC segmentation model is trained on a set of 2D (y, z) images extracted from a plurality of anisotropic Cartesian 3D ultrasound imaging eye volumes represented in (x, y, z) co-ordinates, where each member of the plurality of anisotropic Cartesian 3D ultrasound eye volumes has an associated AC ground truth. In one embodiment, a member of the plurality of anisotropic Cartesian 3D ultrasound imaging eye volumes has dimensions of 384 pixels in the x axis, 1100 pixels in the y axis, and 998 pixels in the z axis.

In one embodiment, the first deep learning AC segmentation model comprises a convolutional neural network (CNN) having a fully convolutional network architecture. In one embodiment, the first deep learning AC segmentation model is optimized to reduce a loss function associated with the first deep learning AC segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Operations 2200 also comprises, at 2234, receiving, from the first deep learning AC segmentation model, an anisotropic predicted segmentation volume of the AC, where the anisotropic predicted segmentation volume is represented in (x, y, z) co-ordinates.

Operations 2200 also comprises, at 2240, generating a second, different 3D ultrasound imaging by converting the first 3D ultrasound imaging to radial (θ, r, z) co-ordinates, where the second 3D ultrasound imaging defines an isotropic 3D volume in radial (θ, r, z) co-ordinates. Operations 2200 also comprises, at 2242, extracting a set of radial 2D ultrasound images from the second, different 3D ultrasound imaging, where a member of the set of radial 2D ultrasound images is represented in (r, z) co-ordinates. In one embodiment, extracting the set of radial 2D ultrasound images from the second, different 3D ultrasound imaging comprises extracting 360 (r, z) images at an angle interval of 0.5, from the second, different set of 3D ultrasound images, according to various techniques described herein. Embodiments may extract the set of radial 2D ultrasound images from the second, different 3D ultrasound imaging according to various techniques described herein, for example, operations 1800.

Operations 2200 also comprises, at 2244, providing the set of radial 2D ultrasound images to a second, different deep learning AC segmentation model configured to generate an isotropic predicted segmentation volume of an AC. In one embodiment, the second deep learning AC segmentation model is trained on a set of radial 2D (r, z) images extracted from a plurality of isotropic radial 3D ultrasound imaging eye volumes generated by converting the plurality of anisotropic Cartesian 3D ultrasound imaging eye volumes to radial (θ, r, z) co-ordinates.

In one embodiment, the second deep learning AC segmentation model comprises a convolutional neural network (CNN) having a fully convolutional network architecture. In one embodiment, the second deep learning AC segmentation model is optimized to reduce a loss function associated with the second deep learning AC segmentation model using at least one of: a stochastic gradient descent loss function optimization technique, an RMSprop loss function optimization technique, an Adagrad loss function optimization technique, an Adadelta loss function optimization technique, or Adam loss function optimization technique Operations 1800 also comprises, at 1846, receiving, from the second deep learning AC segmentation model, a first isotropic predicted segmentation volume of the AC, where the first isotropic predicted segmentation volume is represented in ($\theta$, r, z) co-ordinates.

Operations 2200 also comprises, at 2250, converting the anisotropic predicted segmentation volume to a second, different isotropic predicted segmentation volume represented in ($\theta$, r, z) co-ordinates. Operations 2200 also comprises, at 2260, generating a combined isotropic predicted segmentation volume by computing a weighted average of the first isotropic predicted segmentation volume and the second isotropic predicted segmentation volume. Operations 2200 also comprises, at 2270, generating a segmented AC based on the combined isotropic predicted segmentation volume. Operations 2200 may optionally comprise, at 2290, displaying the segmented AC.

Figure 23:
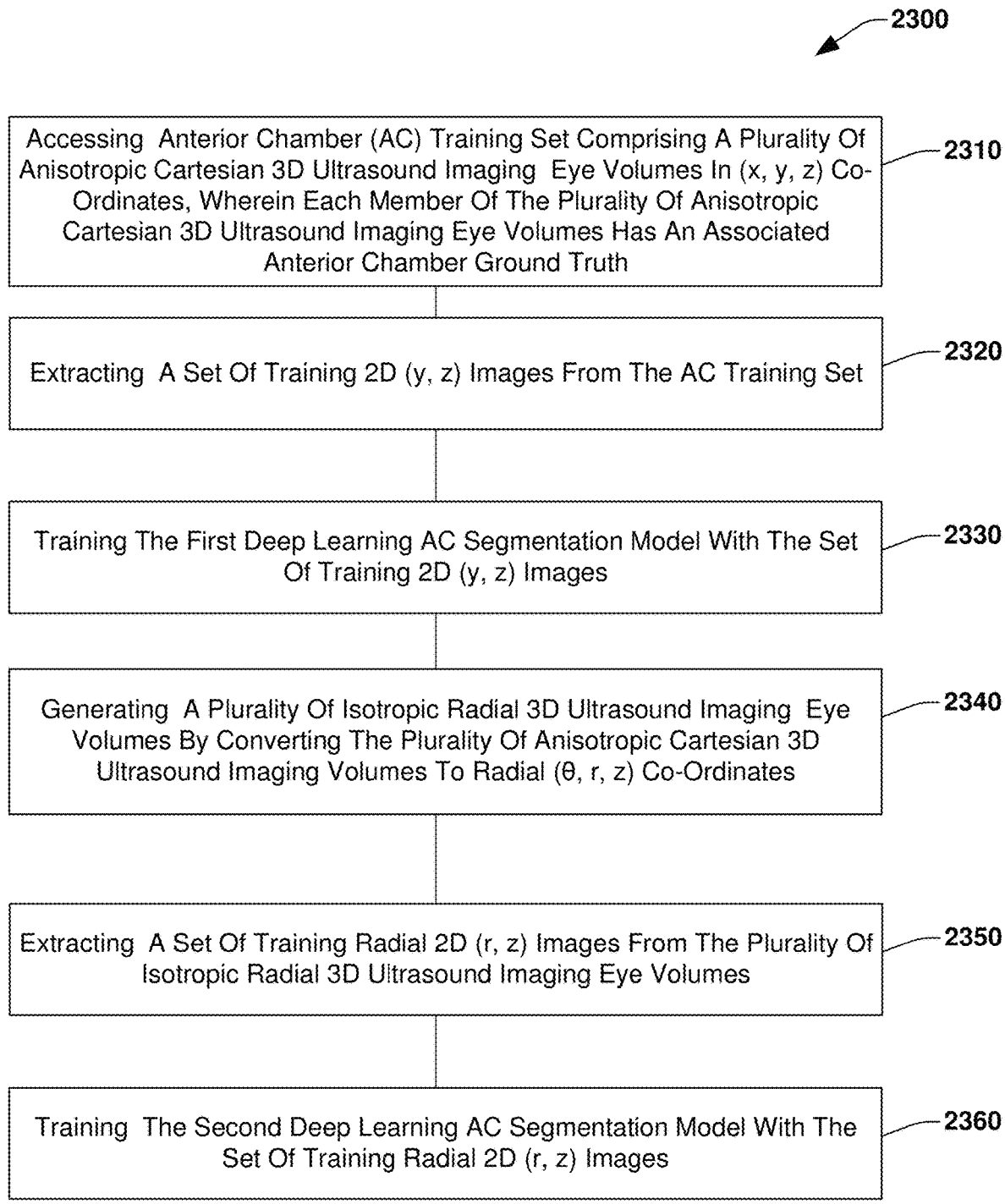
FIG. 23 illustrates a flow diagram of an example methodology or operations for training a deep learning anterior chamber segmentation model according to various embodiments described herein.

FIG. 23 illustrates a workflow diagram of an example set of operations 2300 that when executed, control a processor to perform operations for training at least one deep learning ocular structure segmentation model. Operations 2300 may be implemented as part of operations 200, or may be executed by the one or more processors 150 of apparatus 100, apparatus 3700, or by computer 3800, or any other systems, apparatus, or embodiments described herein. In this example, the ocular structure is an anterior chamber (AC). Operations 2300 comprises, at 2310, accessing an anterior chamber training set, wherein the anterior chamber training set comprises a plurality of anisotropic Cartesian 3D ultrasound imaging eye volumes represented in (x, y, z) co-ordinates, wherein each member of the plurality of anisotropic Cartesian 3D ultrasound imaging eye volumes has an associated anterior chamber ground truth.

Operations 2300 also comprises, at 2320, extracting a set of training 2D (y, z) images from the anterior chamber training set.

Operations 2300 also comprises, at 2330, training a first deep learning AC segmentation model with the set of training 2D (y, z) images. In one embodiment, training the first deep learning AC segmentation model with the set of training 2D (y, z) images comprises at least optimizing the first deep learning AC segmentation model to reduce a loss function associated with the first deep learning AC segmentation model using at least one of: a stochastic gradient descent loss function optimization technique, an RMSprop loss function optimization technique, an Adagrad loss function optimization technique, an Adadelta loss function optimization technique, or an Adam loss function optimization technique. Embodiments may further test the first deep learning AC segmentation model according to various testing or evaluation techniques described herein.

Operations 2300 also comprises, at 2340, generating a plurality of isotropic radial 3D ultrasound eye volumes by converting the plurality of anisotropic Cartesian 3D ultrasound volumes to radial ($\theta$, r, z) co-ordinates. Embodiments may convert the plurality of anisotropic Cartesian 3D ultrasound volumes to radial ($\theta$, r, z) co-ordinates according to various techniques described herein, including, for example, operations 1800.

Operations 2300 also comprises, at 2350, extracting a set of training 2D (r, z) images from the plurality of isotropic radial 3D ultrasound eye volumes. Embodiments may extract the set of training 2D (r, z) images according to various techniques described herein, including, for example, operations 1800.

Operations 2300 also comprises, at 2360, training a second deep learning AC segmentation model with the set of training 2D (r, z) images. In one embodiment, training the second deep learning AC segmentation model with the set of training 2D (r, z) images comprises at least optimizing the second deep learning AC segmentation model to reduce a loss function associated with the second deep learning AC segmentation model using at least one of: a stochastic gradient descent loss function optimization technique, an RMSprop loss function optimization technique, an Adagrad loss function optimization technique, an Adadelta loss function optimization technique, or an Adam loss function optimization technique. Embodiments may further test the second deep learning AC segmentation model according to various testing or evaluation techniques described herein.

G. Robust, Automated 360 Degree Iridocorneal Angle Measurements

Figure 24:
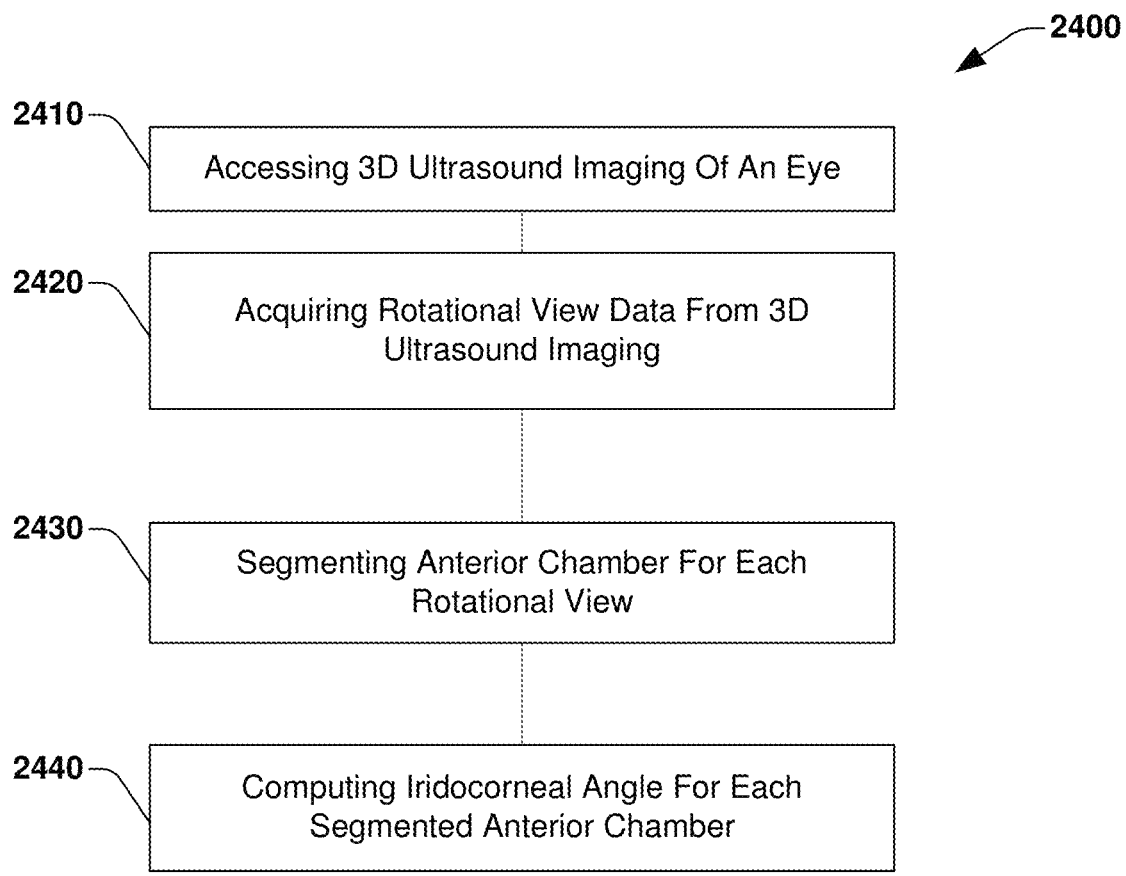
FIG. 24 illustrates a flow diagram of an example methodology or operations for computing an iridocorneal angle according to various embodiments described herein.

Embodiments may facilitate generating robust, automated 360 degree iridocorneal angle measurements according to various techniques described herein. FIG. 24 illustrates an example set of operations 2400 that when executed, control a processor to perform operations for computing an iridocorneal angle. Operations 2400 may be implemented as part of operations 200, or may be executed by the one or more processors 150 of apparatus 100, apparatus 3700, or by computer 3800, or any other systems, apparatus, or embodiments described herein. Operations 2400 comprise, at 2410, accessing 3D ultrasound imaging of an eye. Operations 2400 also comprise, at 2420, acquiring rotational or radial view data from the 3D ultrasound imaging according to various techniques described herein, for example, extracting radial ($\theta$, r, z) images from the 3D ultrasound imaging according operations 1800. In some situations, the z-axis may be misaligned with the optic axis of the eye represented in the 3D ultrasound imaging. Embodiments may correct for misalignment of the z-axis with respect to the optic axis. Thus, in various embodiments, acquiring rotational view data from the 3D ultrasound imaging may comprise correcting tilt in the 3D ultrasound imaging. For example, acquiring rotational view data from the 3D ultrasound imaging may comprise multi-planar reformatting the 3D ultrasound imaging along the optic axis, with the pupil as the center. The volume of raw data (e.g., the 3D ultrasound imaging) may be tilted due, for example, to misalignment of the eye, or of the ultrasound scanner used to acquire the 3D ultrasound imaging, as illustrated at 2510 in FIG. 25, which may result in tilted rotational views if such tilt is uncorrected. FIG. 25 illustrates, at 2510, a tilted rotational view. In this example, the optic axis 2512 is misaligned with the z axis 2514. Embodiments facilitate finding the geometric plane which is perpendicular to the optic axis of the eye, and then resample (e.g., extract radial ($\theta$, r, z) images from) the volume based on the plane geometry of the plane which is perpendicular to the optic axis, thus bringing the z-axis 2514 of the resampled volume in line with the optic axis 2512, illustrated at 2520. Returning to FIG. 24, operations 2400 also comprises, at 2430, for each re-sampled rotational view data, generating a segmented anterior chamber by segmenting the anterior chamber represented in the 3D ultrasound imaging according to various techniques described herein, for example, using at least one deep learning ocular structure segmentation model, for example, at least one deep learning anterior chamber segmentation model, as described herein. For example, embodiments may provide a tilt-corrected, re-sampled rotational view (e.g., radial (θ, r, z) image) to the second, different deep learning AC segmentation model configured to generate an isotropic predicted segmentation volume of an AC, and receive, from the second, different deep learning AC segmentation model, an isotropic predicted segmentation volume of the AC. Segmenting the anterior chamber for each re-sampled rotational view facilitates generating a binary mask of the anterior chamber for each re-sampled rotational view. Embodiments may, at 2430, generate a binary mask based on the segmented anterior chamber. Operations 2400 also comprises, at 2440, computing, for each re-sampled rotational view, an iridocorneal angle based, at least in part, on the binary mask, according to various techniques described herein including, for example, the techniques illustrated in FIG. 26, or via operations 2700. By correcting tilt, embodiments facilitate generating a more accurate segmented anterior chamber or other ocular structure, which may facilitate improved computation of clinical metrics, or improved visualization of the segmented ocular structure.

FIG. 26 illustrates one exemplary technique for computing an iridocorneal angle according to embodiments described herein. FIG. 26 illustrates a 2D radial view ultrasound image 2610 of an eye, for example, a portion of 3D ultrasound imaging of the eye, wherein the portion comprises a 2D radial image extracted from 3D ultrasound imaging according to various techniques described herein. 2D radial view ultrasound image 2610 comprises a plurality of pixels, each member of the plurality of pixels having an associated grayscale intensity value. A region of interest (ROI) 2614 is indicated. Embodiments define an inner corneal fitting curve 2612. The inner corneal fitting curve 2612 may be fitted by a polynomial with four degrees. The inner corneal fitting curve 2612 may comprise a plurality of pixels, wherein each member of the plurality of pixels has an associated grayscale intensity value corresponding to the grayscale intensity value of a corresponding pixel of 2D radial view ultrasound image 2610. Embodiments may be configured to compute the inner corneal fitting curve 2612, or embodiments may access an inner corneal fitting curve defined by ophthalmologist. Magnified views 2620-2650 with enhanced contrast of ROI 2614 are further illustrated.

At 2620, a blue line 2624 and an orange line 2622 are illustrated. Blue line 2624 and orange line 2622 are normal of a tangent 0.1 mm [it is unclear what this means—does this mean blue line 2624 and orange line 2622 are each 0.1 mm long?] from two points on the fitting curve 2612 to the outer corneal. These two points are selected from the inner boundary. Perpendicular lines are drawn on them that face towards the outer boundary. The sum of the grayscale intensity value associated with pixels of 2D radial view ultrasound image 2610 on blue line 2624 is calculated as S(i), and the sum of the grayscale intensity value associated with pixels of 2D radial view ultrasound image 2610 on orange line 2622 is calculated as S(i+1), where i is the index point along the line of the inner corneal fitting curve 2612.

Embodiments may locate Schwalbe's line according to various techniques described herein. At 2630, the location of the Schwalbe's line is indicated at the point 2632 (green point). Embodiments determine the location of the Schwalbe's line by determining where S(i)−S(i+1) on the inner corneal fitting line is larger than a preset threshold. The preset threshold may be determined by a user based on an intensity level of the image being analyzed. The present threshold will depend on the volume. In one example, the exemplary present threshold is 2. In one example, embodiments may calculate S(i)−S(i+1) for the left side of the anterior chamber, as illustrated in FIG. 26. In another example, embodiments may determine the location of the Schwalbe's line for the right side of the anterior chamber by determining where S(i)−S(i−1). The scleral spur 2634 (black point) is located by determining a point 1 mm posterior to the Schwalbe's line point 2632 along the fitting curve 2612.

At 2640, the leftmost point of the anterior chamber mask is indicated as the left apex 2642 (yellow point). The brown point 2643 and blue point 2644 are points located 250 μm and 500 μm from the scleral spur 2634 on the fitting curve 2612, respectively. Embodiments determine a location of a purple point 2648 and an orange point 2646, which are perpendicularly opposite to the brown point 2643 and blue point 2644, on the iris 2647 respectively.

Embodiments may compute the AOD 250 by computing the distance between brown point 2643 and purple point 2648. Embodiments may compute the AOD 500 by computing the distance between blue point 2644 and orange point 2646. Embodiments may compute the trabecular-iris angle (TIA) 250 based on apex 2642, brown point 2643, and purple point 2648. Embodiments may compute TIA 500 based on apex 2642, blue point 2644, and orange point 2646. 2550 illustrates TIA 500 as the interior angle 2655 of black line 2651 and green line 2653. TIA 250 may be similarly computed based on apex 2642, brown point 2643, and purple point 2648.

FIG. 27 is a workflow diagram of example operations 2700 for computing an iridocorneal angle. Operations 2700 may be implemented as part of operations 200, or may be executed by the one or more processors 150 of apparatus 100, apparatus 3700, or by computer 3800, or any other systems, apparatus, or embodiments described herein. Operations 2700 comprise, at 2710, accessing a 2D radial view ultrasound image of an eye, and a segmented anterior chamber associated with the 2D radial view.

Operations 2700 also comprise, at 2720 detecting an apex of the segmented anterior chamber.

Operations 2700 also comprise, at 2730, fitting an inner corneal fitting curve to a corneal boundary represented in the at least one portion of the 3D ultrasound imaging based on the segmented anterior chamber.

Operations 2700 also comprise, at 2740, determining a location of Schwalbe's line represented in the at least one portion of the 3D ultrasound imaging based on the inner corneal fitting curve.

Operations 2700 also comprise, at 2750, locating a scleral spur represented in the at least one portion of the 3D ultrasound imaging based on the location of Schwalbe's line.

Operations 2700 also comprise, at 2760, computing at least one of: an angle-opening distance 250 μm (AOD 250), or an AOD 500 μm (AOD 500), based on the scleral spur, the inner corneal fitting curve, and an iris represented in the at least one portion of the 3D ultrasound imaging.

Operations 2700 also comprise, at 2770, computing a trabecular-iris-angle (TIA) based on the apex of the segmented anterior chamber and the AOD 250 or the AOD 500.

Operations 2700 further comprise, at 2780, computing an iridocorneal angle based on the TIA.

FIG. 28 is a workflow diagram of example operations 2800 for determining a location of a scleral spur represented in a 2D radial view ultrasound image of an eye, for example, a portion of 3D ultrasound imaging of the eye, wherein the portion comprises a 2D radial image extracted from 3D ultrasound imaging according to various techniques described herein. The 2D radial image comprises a plurality of pixels, a pixel having an associated greyscale intensity value. Operations 2800 may be implemented as part of operations 200, or may be executed by the one or more processors 150 of apparatus 100, apparatus 3700, or by computer 3800, or any other systems, apparatus, or embodiments described herein. Operations 2800 comprise, at 2810, accessing a 2D radial view ultrasound image of an eye, and a segmented anterior chamber associated with the 2D radial view. Operations 2800 comprise, at 2820, defining an inner corneal fitting curve based on the 2D radial view and the segmented anterior chamber. An example inner corneal fitting curve is illustrated in FIG. 26 at 2612. The inner corneal fitting curve may be, for example, a polynomial with four degrees (e.g., a fourth degree polynomial).

Operations 2800 also comprise, at 2830, selecting a first point on the inner corneal fitting curve. Operations 2800 comprise, at 2840 selecting a second, different point on the inner corneal fitting curve. An example first point is illustrated at 2624 in FIG. 26. An example second point is illustrated at 2622 in FIG. 26. In one example, one can start at the apex, and then iteratively go through the points along the inner cornal boundary to find Schwalbes line.

Operations 2800 also comprise, at 2850, computing a first sum S(i) of pixel grayscale intensity values along a first line normal to the tangent of the inner corneal fitting curve at the first point, where i is the index of the first point on the fitting curve. In one embodiment, the first line extends 0.1 mm toward the outer cornea from the first point.

Operations 2800 also comprise, at 2860, computing a second sum S(i+1) of pixel grayscale intensity values along a second line normal to the tangent of the inner corneal fitting curve at the second point, where i is the index of the first point on the fitting curve. In one embodiment, the second line extends 0.1 mm toward the outer cornea from the first point.

Operations 2800 also comprises, at 2870, determining a location of Schwalbe's line represented in the 2D radial view. In one embodiment, wherein determining the location of Schwalbe's line comprises finding where on the inner corneal fitting line S(i)–S(i+1) is greater than a preset threshold. In one embodiment, the preset threshold is a grayscale pixel intensity level threshold based on an intensity level of the 2D radial view ultrasound image. An example location of Schwalbe's line is indicated at 2632 in FIG. 26.

Operations 2800 also comprises, at 2880, determining a location of a scleral spur represented in the 2D radial view. In one embodiment, wherein determining the location of the scleral spur comprises locating a point on the inner corneal fitting curve 1 mm posterior to the location of Schwalbe's line. An example location of a scleral spur is indicated at 2634 in FIG. 26.

In other embodiments, other techniques, including, for example, an angle opening sequence iridocorneal angle computation technique, or angle opening minimum iridocorneal angle computation technique, may be employed to compute the iridocorneal angle.

Figure 29:
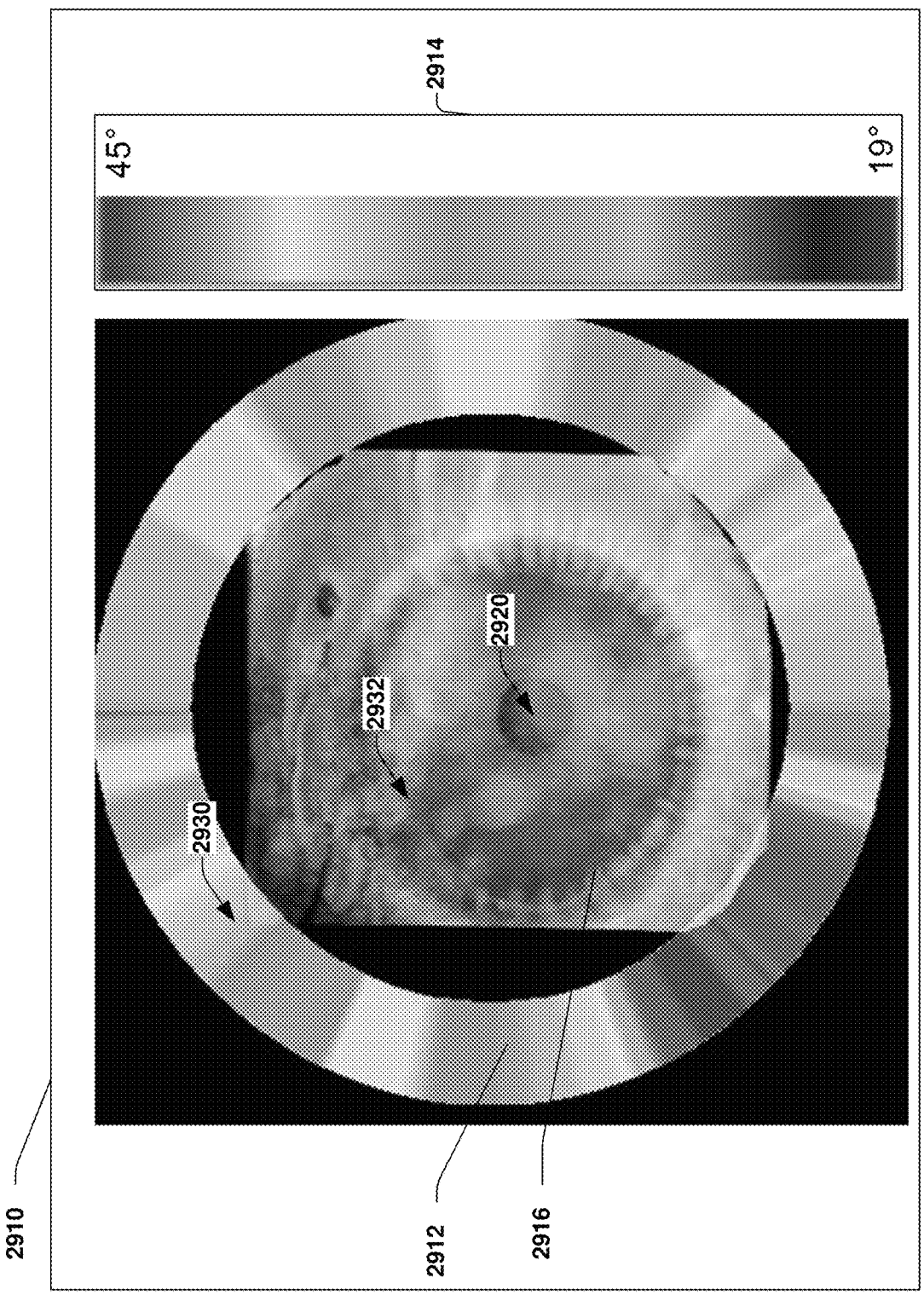
FIG. 29 illustrates an example 360 degree heatmap of iridocorneal angle measurements according to various embodiments described herein.

Embodiments may facilitate displaying clinical metrics associated with segmented ocular structures. For example, embodiments may comprise operations that when executed, control a processor to perform operations that facilitate displaying an iridocorneal angle associated with a segmented anterior chamber via a 360 degree heatmap. FIG. 29 illustrates a 360 degree iridocorneal angle map 2910 configured to display an iridocorneal angle associated with a segmented anterior chamber via a 360 degree heatmap. In one embodiment, 360 degree iridocorneal angle map 2910 comprises a 360 degree heatmap 2912 disposed circumferentially about a 3D volume rendering 2916 of an eye or portion of an eye which may comprise, for example, a segmented anterior chamber. The 360 degree heatmap 2912 may be centered about the optic axis at 2920. An iridocorneal angle value indicated at a first point 2930 on the 360 degree heatmap 2912 visually represents the iridocorneal angle at a corresponding point 2932 on the 3D volume rendering 2916. In one embodiment, 360 degree iridocorneal angle map 2910 also comprises a legend 2914 that facilitates an ophthalmologist or other practitioner quickly and intuitively viewing the iridocorneal angle associated with various points of the segmented anterior chamber. For example, legend 2914 may indicate that a portion of the heatmap displaying a first color or a first grayscale level, may be associated with a first iridocorneal angle value, while a second, different portion of the heatmap displaying a second, different color or a second, different grayscale level, may be associated with a second, different iridocorneal angle value. In various examples, an iridocorneal angle computed according to various techniques described herein (e.g., operations 200, 2400, 2700), may be displayed by apparatus 100, apparatus 3700, computer 3800, or via any other embodiment or technique described herein, via iridocorneal angle map 2910.

H. Deep Learning Segmentation of Tumors in 3D Ultrasound

Accurate segmentation of ocular tumors or other ocular abnormalities represented in ultrasound imagery is a problem in ophthalmology. The size, growth, or location of a tumor or other ocular abnormality in the eye may affect intervention procedures. Obtaining parameters associated with size, growth, or location of a tumor or other ocular abnormality requires proper visualization and robust segmentation of the tumor or other ocular abnormality region in the eye. Improved segmentation of the tumor or other ocular abnormality facilitates the monitoring of the growth of potentially dangerous lesions.

Embodiments employ a deep learning ocular abnormality segmentation model trained on a 3D ultrasound ocular abnormality dataset that includes a plurality of eye volumes associated with eyes demonstrating ocular abnormalities including, for example, tumor, nevus, melanoma, or cysts, of different eye tissues such as iris, ciliary body, iridociliary, conjunctiva, sclera and cilio-choroidal region, and that further includes, for each of member of the plurality of eye volumes, associated ocular abnormality ground truths. In one embodiment, the at least one deep learning ocular abnormality segmentation model is trained on a 3D-ultrasound ocular abnormality training dataset that includes sixty (60) eye volumes demonstrating at least one of: a tumor, nevus, melanoma, or cyst, of different eye tissues such as iris, ciliary body, iridociliary, conjunctiva, sclera and cilio-choroidal region. In embodiments described herein, a deep learning ocular abnormality segmentation model having similar architecture to that described in section F above is employed to segment an ocular abnormality represented in 3D ultrasound imagery.

The foreground-background class imbalance problem is a problem in the segmentation of tumors or other ocular abnormalities represented in 3D ultrasound imaging of the eye. For example, a tumor in the eye volume may occupy a very small region relative to the size of the anterior chamber. When segmenting an ocular tumor represented in the 3D ultrasound imaging, most of the volume represented in the 3D ultrasound imaging is background, while a relatively small amount of the volume is considered foreground. Therefore, the foreground-background class imbalance problem is more severe in tumor segmentation than in the case of anterior chamber segmentation. Embodiments employ a loss function based on a DICE coefficient which facilitates an improved control on the class imbalance problem, which further facilitates improved robustness and improved accuracy in prediction of an ocular abnormality region represented in the 3D ultrasound imaging, at least because the deep learning ocular structure segmentation model using the loss function based on a DICE coefficient is penalized when it does not accurately predict the small ocular abnormality region in training. Embodiments consider prediction in terms of overlap of tumor region, in contrast to existing approaches which may consider prediction overall. Therefore if a volume has a small tumor region, overall prediction can be misleading. In one embodiment, the model is penalized if it does not detect the small tumor.

Figure 30:
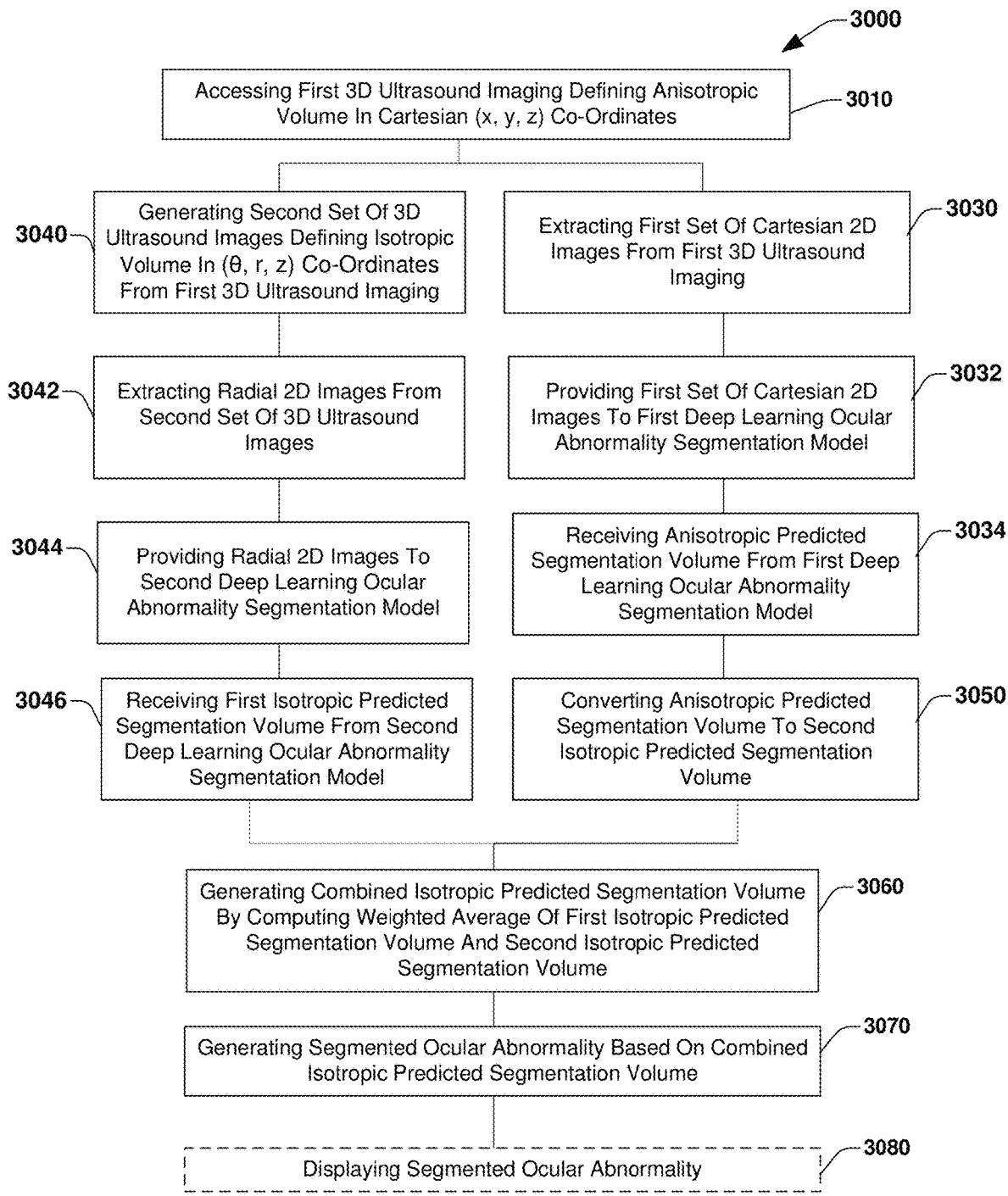
FIG. 30 illustrates a flow diagram of an example methodology or operations for segmenting an ocular abnormality represented in 3D ultrasound imaging according to various embodiments described herein.

FIG. 30 is a workflow diagram of an example set of operations 3000 that when executed, control a processor to perform operations for segmenting an ocular abnormality represented in a 3D ultrasound imaging using at least one deep learning ocular structure segmentation model, for example, at least one deep learning ocular abnormality segmentation model. Operations 3000 may be implemented as part of operations 200, or may be executed by the one or more processors 150 of apparatus 100, apparatus 3700, or by computer 3800, or any other systems, apparatus, or embodiments described herein. Operations 3000 comprises, at 3010, accessing a first three-dimensional (3D) ultrasound imaging of an eye, where the eye comprises an ocular abnormality, where the first 3D ultrasound imaging defines an anisotropic 3D volume in Cartesian (x, y, z) co-ordinates.

Operations 3000 also comprises, at 3030, extracting a first set of Cartesian two-dimensional (2D) ultrasound images from the first 3D ultrasound imaging, where a member of the first set of Cartesian 2D ultrasound images is represented in (y, z) co-ordinates.

Operations 3000 also comprises, at 3032, providing the first set of Cartesian 2D ultrasound images to a first deep learning ocular abnormality segmentation model configured to generate an anisotropic predicted segmentation volume of an ocular abnormality. In one embodiment, the first deep learning ocular abnormality segmentation model is trained on a set of 2D (y, z) images extracted from a plurality of anisotropic Cartesian 3D ultrasound imaging eye volumes represented in (x, y, z) co-ordinates, where each member of the plurality of anisotropic Cartesian 3D ultrasound imaging eye volumes demonstrates an ocular abnormality, where each member of the plurality of anisotropic Cartesian 3D ultrasound imaging eye volumes has an associated ocular abnormality ground truth. In one embodiment, the first deep learning ocular abnormality segmentation model comprises a convolutional neural network (CNN) having a fully convolutional network architecture.

Operations 3000 also comprises, at 3034, receiving, from the first deep learning ocular abnormality segmentation model, an anisotropic predicted segmentation volume of the ocular abnormality, where the anisotropic predicted segmentation volume is represented in (x, y, z) co-ordinates.

Operations 3000 also comprises, at 3040, generating a second, different 3D ultrasound imaging by converting the first 3D ultrasound imaging to radial (θ, r, z) co-ordinates, where the second 3D ultrasound imaging defines an isotropic 3D volume in radial (θ, r, z) co-ordinates.

Operations 3000 also comprises, at 3042, extracting a set of radial 2D ultrasound images from the second, different 3D ultrasound imaging, where a member of the set of radial 2D ultrasound images is represented in (r, z) co-ordinates. In one embodiment, extracting the set of radial 2D ultrasound images from the second, different 3D ultrasound imaging comprises extracting, from the second, different 3D ultrasound imaging, three-hundred and sixty (360) 2D (r, z) images at an angle interval of 0.5

Operations 3000 also comprises, at 3044, providing the set of radial 2D ultrasound images to a second, different deep learning ocular abnormality segmentation model configured to generate an isotropic predicted segmentation volume of an ocular abnormality. In one embodiment, the second deep learning ocular abnormality segmentation model is trained on a set of radial 2D (r, z) images extracted from a plurality of isotropic radial 3D-UBM eye volumes generated by converting the plurality of anisotropic Cartesian 3D-UBM volumes to radial (θ, r, z) co-ordinates. In one embodiment, the second deep learning ocular abnormality segmentation model comprises a convolutional neural network (CNN) having a fully convolutional network architecture. In one embodiment, the second deep learning ocular abnormality segmentation model is optimized to reduce a loss function associated with the second deep learning ocular abnormality segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Operations 3000 also comprises, at 3046, receiving, from the second deep learning segmentation model, a first isotropic predicted segmentation volume of the ocular abnormality, where the first isotropic predicted segmentation volume is represented in (θ, r, z) co-ordinates.

Operations 3000 also comprises, at 3050, converting the anisotropic predicted segmentation volume to a second, different isotropic predicted segmentation volume represented in (θ, r, z) co-ordinates.

Operations 3000 also comprises, at 3060, generating a combined isotropic predicted segmentation volume by computing a weighted average of the first isotropic predicted segmentation volume and the second isotropic predicted segmentation volume.

Operations 3000 also comprises, at 3070, generating a segmented ocular abnormality based on the combined isotropic predicted segmentation volume.

In one embodiment, operations 3000 may also comprise, at 3080, optionally displaying the segmented ocular abnormality.

Figure 31:
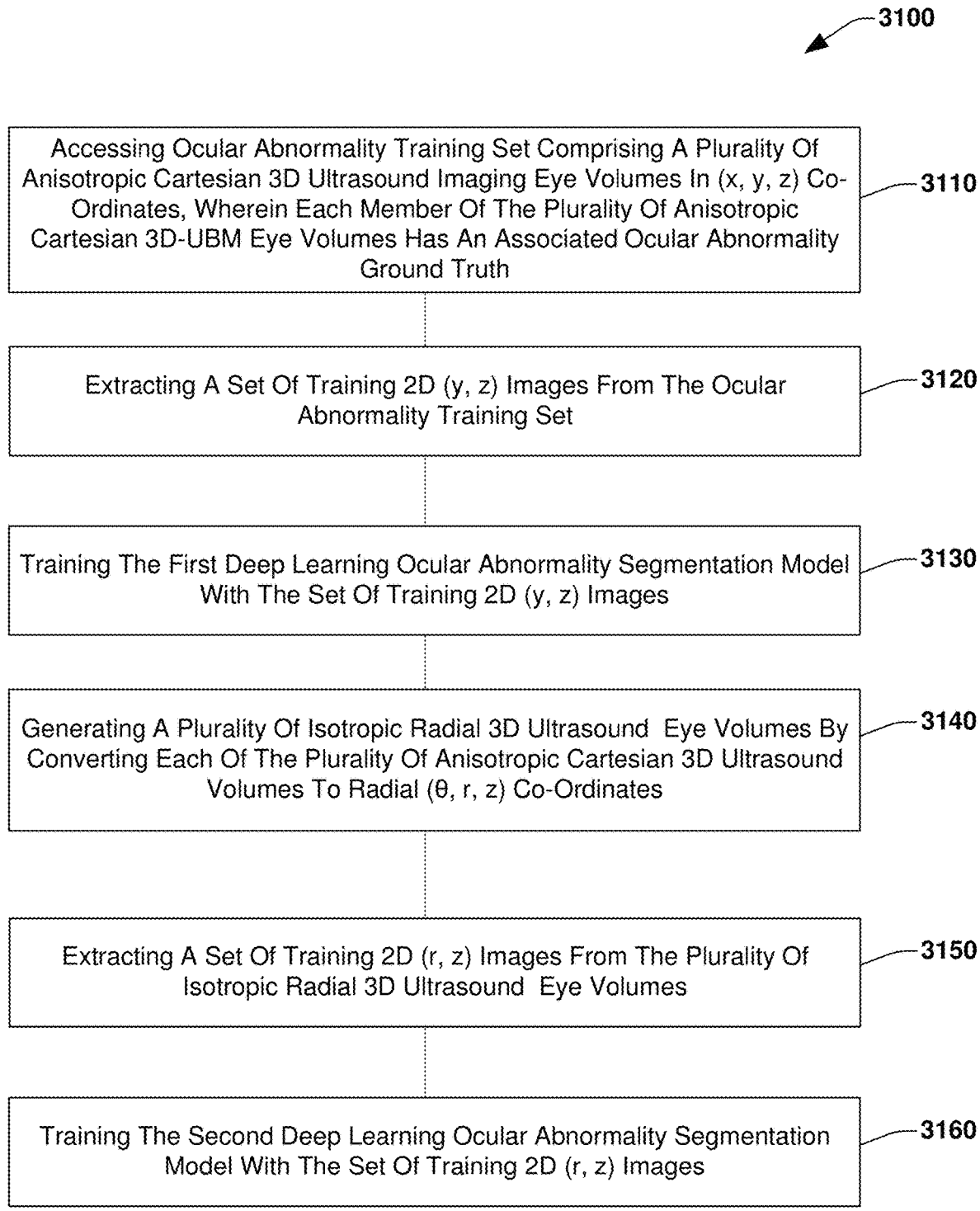
FIG. 31 illustrates a flow diagram of an example methodology or operations for training a deep learning ocular abnormality segmentation model according to various embodiments described herein.

Embodiments may train a deep learning ocular abnormality segmentation model according to various techniques described herein. FIG. 31 is a workflow diagram of an example set of operations 3100 that when executed, control a processor to perform operations that facilitate training at least one deep learning ocular structure segmentation model. Operations 3100 may be implemented as part of operations 200, or may be executed by the one or more processors 150 of apparatus 100, apparatus 3700, or by computer 3800, or any other systems, apparatus, or embodiments described herein. In this example, the ocular structure comprises an ocular abnormality. Operations 3100 comprises, at 3110, accessing an ocular abnormality training set, wherein the ocular abnormality training set comprises a plurality of anisotropic Cartesian 3D ultrasound eye volumes represented in (x, y, z) co-ordinates, wherein each member of the plurality of anisotropic Cartesian 3D ultrasound eye volumes has an associated ocular abnormality ground truth. In one example, the ocular abnormality training comprises sixty (60) anisotropic Cartesian 3D ultrasound eye volumes represented in (x, y, z) co-ordinates, wherein each of the sixty (60) anisotropic Cartesian 3D ultrasound eye volumes represented in (x, y, z) co-ordinates is associated with an eye that demonstrates at least one of: a tumor, nevus, melanoma, or cyst, of different eye tissues such as iris, ciliary body, iridociliary, conjunctiva, sclera and cilio-choroidal region. Embodiments may further access a known ground truth label associated with each of the sixty (60) anisotropic Cartesian 3D ultrasound eye volumes represented in (x, y, z) co-ordinates.

Operations 3100 also comprises, at 3120, extracting a set of training 2D (y, z) images from the ocular abnormality training set.

Operations 3100 also comprises, at 3130, training the first deep learning ocular abnormality segmentation model with the set of training 2D (y, z) images and the associated ground truth label. In one embodiment, training the first deep learning ocular abnormality segmentation model with the set of training 2D (y, z) images comprises at least optimizing the first deep learning ocular abnormality segmentation model to reduce a loss function associated with the first deep learning ocular abnormality segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Operations 3100 also comprises, at 3140, generating a plurality of isotropic radial 3D ultrasound eye volumes by converting the plurality of anisotropic Cartesian 3D ultrasound volumes to radial (θ, r, z) co-ordinates. Embodiments may convert the plurality of anisotropic according to various techniques described herein.

Operations 3100 also comprises, at 3150, extracting a set of training 2D (r, z) images from the plurality of isotropic radial 3D ultrasound eye volumes. Embodiments may extract the set of training 2D (r, z) images according to various techniques described herein.

Operations 3100 also comprises, at 3160, training the second deep learning ocular abnormality segmentation model with the set of training 2D (r, z) images and the associated ground truths. In one embodiment, training the second deep learning ocular abnormality segmentation model with the set of training 2D (r, z) images comprises at least optimizing the second deep learning ocular abnormality segmentation model to reduce a loss function associated with the second deep learning ocular abnormality segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

I. Processing Including Deep Learning to Provide 3D Ultrasound Views of Schlemm's Canal Visualization of Schlemm's canal and collecting channels is very important in glaucoma treatment. Oftentimes, Schlemm's canal and collecting channels are nearly collapsed, making it difficult to image them. This can arise if intraocular pressure is low or if the resistance of the trabecular mesh is large, leading to a pressure drop. Thus there is a need for enhanced 3D ultrasound image data of Schlemm's canal or collecting channels. Embodiments may access 3D ultrasound imaging of an eye injected with an exogenous fluid-like substance, wherein the exogenous fluid-like substance raises the intraocular pressure and distends the Schlemm's canal and collecting channels. Embodiments may also access 3D ultrasound imaging of an eye injected with a gel-like substance containing nano-bubbles to further enhance visualization. With distention to as much as 100-300 μm diameter and optionally the injection of a gel-like substance containing nano-bubbles, visualization with 3D-ultrasound according to embodiments described herein is much improved compared to existing approaches. Embodiments may access 3D ultrasound imaging of eyes that have been injected with intraocular agents, for example, an exogenous fluid-like substance to raise the intraocular pressure and distend the Schlemm's canal and collecting channels, or a gel-like substance containing nano-bubbles, as described herein.

Embodiments provide methods, operations, systems, apparatus, and other techniques to enhance visualization of Schlemm's canal and collecting channels. Embodiments facilitate reducing noise in ultrasound imagery while maintaining the appropriate 3D structures. Since Schlemm's canal circumscribes the anterior chamber in a roughly circumferential way, embodiments may extract 2D "radial" image planes from 3D ultrasound imaging, and create a (θ, r, z) image stack, as illustrated in FIG. 16 (FIG. 7), according to various techniques described herein. Bicubic trilinear sampling in θ is fine, typically 0.5 degree, giving a stack of 360 2D radial images. One of ordinary skill will understand that if data are acquired in (x, y, z) co-ordinates as described herein, fine sampling in x should be done to give nearly isotropic image volumes and accurate resampling throughout. In this 3D data set, Schlemm's canal is roughly a cylindrical tube oriented along θ at a nearly fixed location in r and z. This allows embodiments to process images across θ with reduced concern of image blurring.

Embodiments may apply at least one filter to reduce noise in the extracted 2D radial images, which advantageously utilize the enhanced correlation along θ. Embodiments may employ a median kernel of dimensions (5, 3, 3) in filter size, or a center-weighted linear filter of dimensions (7, 3, 3) in filter size. Other filters, or filters having other, different dimensions, may be employed.

Embodiments may employ deep learning noise reduction to the 3D region encompassing Schlemm's canal so as to aid visualization. Because we operate on a local region, neural network parameters may be optimized for Schlemm's canal. Embodiments may employ noise reduction techniques as described in Section E, including, for example, a deep learning noise reduction model as described herein. Because the radially extracted image frames are similar embodiments generate a sufficient number of training examples to fully train a deep learning noise reduction model, including a deep learning Schlemm's canal noise reduction model. Once noise reduction processing of a 3D ultrasound imaging is complete, embodiments may generate high quality 3D visualizations of Schlemm's canal or collecting channels using various techniques described herein, based on the Schlemm's canal enhanced set of imagery.

Figure 33:
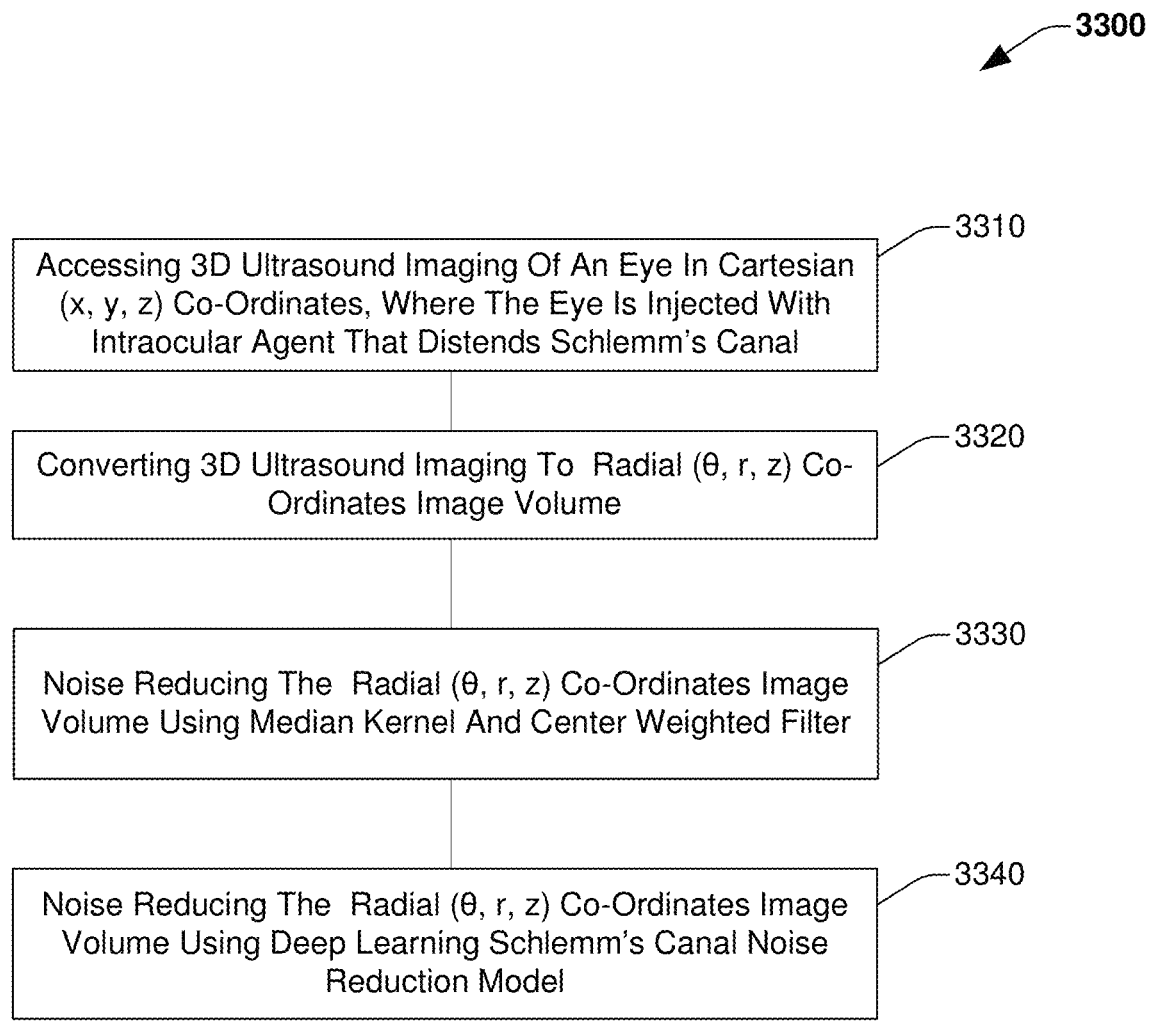
FIG. 33 illustrates a flow diagram of an example methodology or operations for noise reducing Schlemm's canal enhanced 3D ultrasound imaging according to various embodiments described herein.

FIG. 33 illustrates a workflow diagram of an example set of operations 3300 that when executed, control a processor to perform operations for noise reducing at least one portion of a 3D ultrasound imaging. Operations 3300 may be implemented as part of operations 200, or may be executed by the one or more processors 150 of apparatus 100, apparatus 3700, or by computer 3800, or any other systems, apparatus, or embodiments described herein. Operations 3300 comprise, at 3310, accessing 3D ultrasound imaging of an eye represented in cartesian (x, y, z) co-ordinates, wherein the eye has been injected with an intraocular contrast agent that distends Schlemm's canal and collecting channels.

Operations 3300 also comprise, at 3320, converting the 3D ultrasound imaging of an eye represented in cartesian (x, y, z) co-ordinates to a 3D radial (θ, r, z) coordinates volume.

Operations 3300 also comprise, at 3330, noise reducing the 3D radial (θ, r, z) coordinates volume using at least one of: a rotational frames averaging noise reduction technique, an anisotropic diffusion filter, a non-local mean filter, or a median kernel and center-weighted linear filter noise reduction technique. In one embodiment, wherein the median kernel has dimensions of (5, 3, 3), and the center-weighted linear filter has dimensions of (7, 3, 3).

In one embodiment, operations 3300 also comprises, at 3340, noise reducing the 3D radial (θ, r, z) coordinates volume using a deep learning noise reduction model trained on a Schlemm's canal deep learning noise reduction model training set. In one embodiment, the deep learning noise reduction model comprises a generative adversarial network optimized with Wasserstein distance and perceptual loss.

Figure 34:
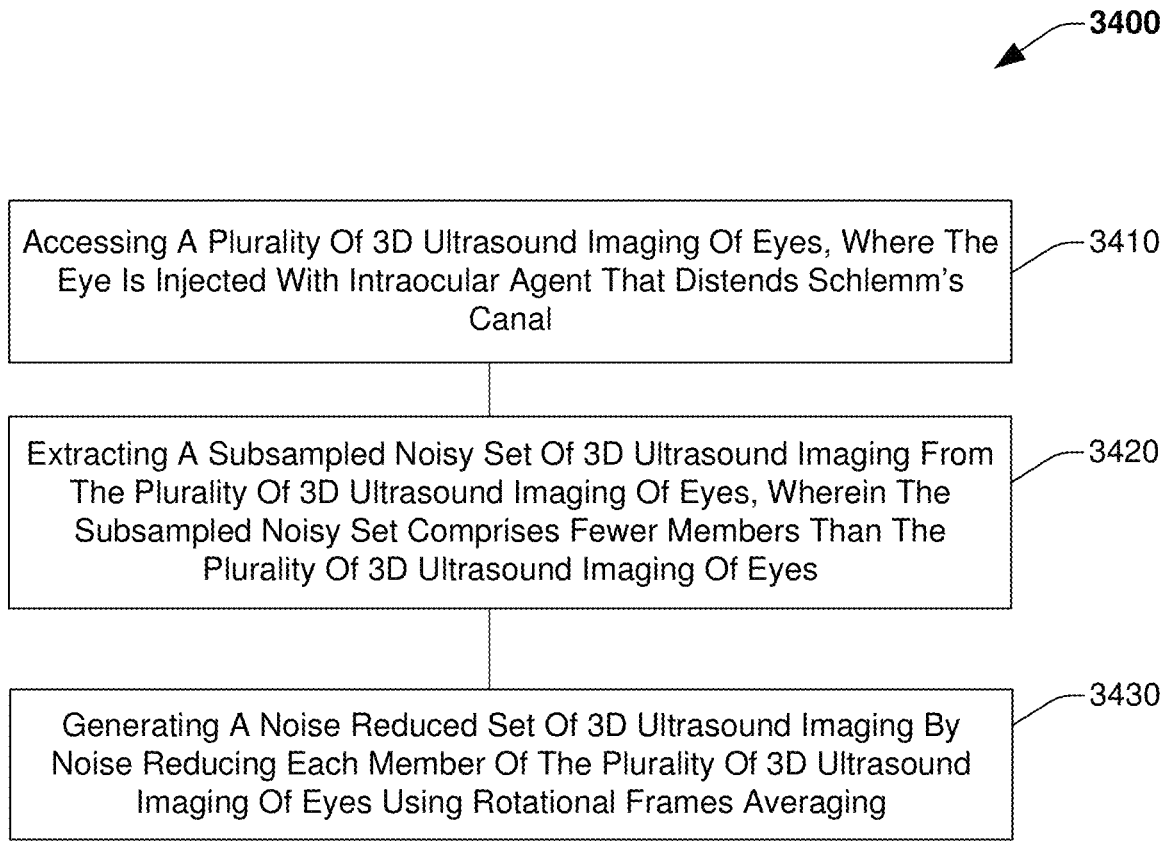
FIG. 34 illustrates a flow diagram of an example methodology or operations for generating a Schlemm's canal enhanced deep learning noise reduction model training set according to various embodiments described herein.

FIG. 34 illustrates a workflow diagram of an example set of operations 3400 that when executed, control a processor to perform operations for generating a Schlemm's canal deep learning noise reduction model training set. Operations 3400 may be implemented as part of operations 200, or may be executed by the one or more processors 150 of apparatus 100, apparatus 3700, or by computer 3800, or any other systems, apparatus, or embodiments described herein. Operations 3400 comprise, at 3410, accessing a plurality of 3D ultrasound imaging of eyes, wherein at least one of the eyes has been injected with an intraocular contrast agent that distends Schlemm's canal and collecting channels. In one embodiment, each member of the plurality of 3D ultrasound imaging of eyes is acquired using dense sampling in x. In one embodiment, each member of the plurality of 3D ultrasound imaging of eyes is acquired using simulated spatial compounding.

Operations 3400 comprise, at 3420, extracting a subsampled noisy set of 3D ultrasound imaging from the plurality of 3D ultrasound imaging of eyes, where the subsampled noisy set comprises fewer members than the plurality of 3D ultrasound imaging of eyes. In one embodiment, extracting a subsampled noisy set of 3D ultrasound imaging from the plurality of 3D ultrasound imaging of eyes comprises extracting an equally sampled noisy set of 3D ultrasound imaging from the plurality of 3D ultrasound imaging of eyes, or an unequally sampled noisy set of 3D ultrasound imaging from the plurality of 3D ultrasound imaging of eyes.

Operations 3400 also comprise, at 3430, generating a noise reduced set of 3D ultrasound imaging by noise reducing each member of the plurality of 3D ultrasound imaging of eyes using rotational frames averaging. In another embodiment, generating the noise reduced set of 3D ultrasound imaging by noise reducing each member of the plurality of 3D ultrasound imaging of eyes may comprise noise reducing each member of the plurality of 3D ultrasound imaging of eyes using another, different noise reduction technique.

J. Segmentation of Schlemm's Canal and Collecting Channels for Quantitative Assessments Embodiments employ 3D ultrasound imaging volumes enhanced for Schlemm's canal and collecting channels according to various techniques described herein. Embodiments generate segmentations of Schlemm's canal and connecting ducts using advanced machine learning approaches as described herein. Embodiments may train a deep learning ocular structure segmentation model, for example, a deep learning Schlemm's canal segmentation model, using Schlemm's canal training data, which may comprise, in one example, 25 Schlemm's canal enhanced image volumes of cadaver eyes. In one example, cadaver eyes are injected with intraocular agents or fluids to distend Schlemm's canal and collecting channels. Embodiments acquire ultrasound imagery of the cadaver eyes with dense sampling in x, according to various techniques described herein. Embodiments generate low noise image volumes from the scanned cadaver eyes, according to various techniques described herein, including for example, techniques as described in Section E. Low noise image volumes may be further enhanced for Schlemm's canal and connecting ducts according to various techniques as described herein, for example, as described in Section I. In one embodiment, to generate a Schlemm's canal training set, Schlemm's canal and connecting ducts represented in the low noise image volumes are interactively segmented to generate a label volume having 3 labels: background, Schlemm's canal, and collecting channels. Embodiments may then bring the label volume to the same space as a subset of image frames comprising a typical in vivo acquisition. Embodiments may train a 2D CNN or 3D CNN to segment Schlemm's canal and collecting channels from a subsampled volume following enhancement processing according to various techniques described herein, including, for example, techniques described in Section I.

Embodiments employ a deep learning Schlemm's canal segmentation model to generate a segmented Schlemm's canal or collecting channels based on a set of 3D ultrasound images according to various techniques described herein. The trained deep learning Schlemm's canal segmentation model is applied to in vivo 3D ultrasound imaging of eyes that were injected with intraocular agents to facilitate dilation of Schlemm's canal and connecting ducts. Segmentations may be visualized in 3D so as to demonstrate 360 degree connectivity of Schlemm's canal and connectivity to a sufficient number of connecting ducts. Quantification of clinical metrics associated with Schlemm's canal and collecting channels may include computation of cross-sectional areas of Schlemm's canal, numbers of main collecting channels, volume of collecting channels, or other clinical metrics associated with Schlemm's canal or collecting channels.

Schlemm's canal segmentation may be the same as discussed above, just with "Schlemm's canal and collecting channels", eyes injected with distension agent, and where the segmentation model is trained on Schlemm's canal training data.

Figure 35:
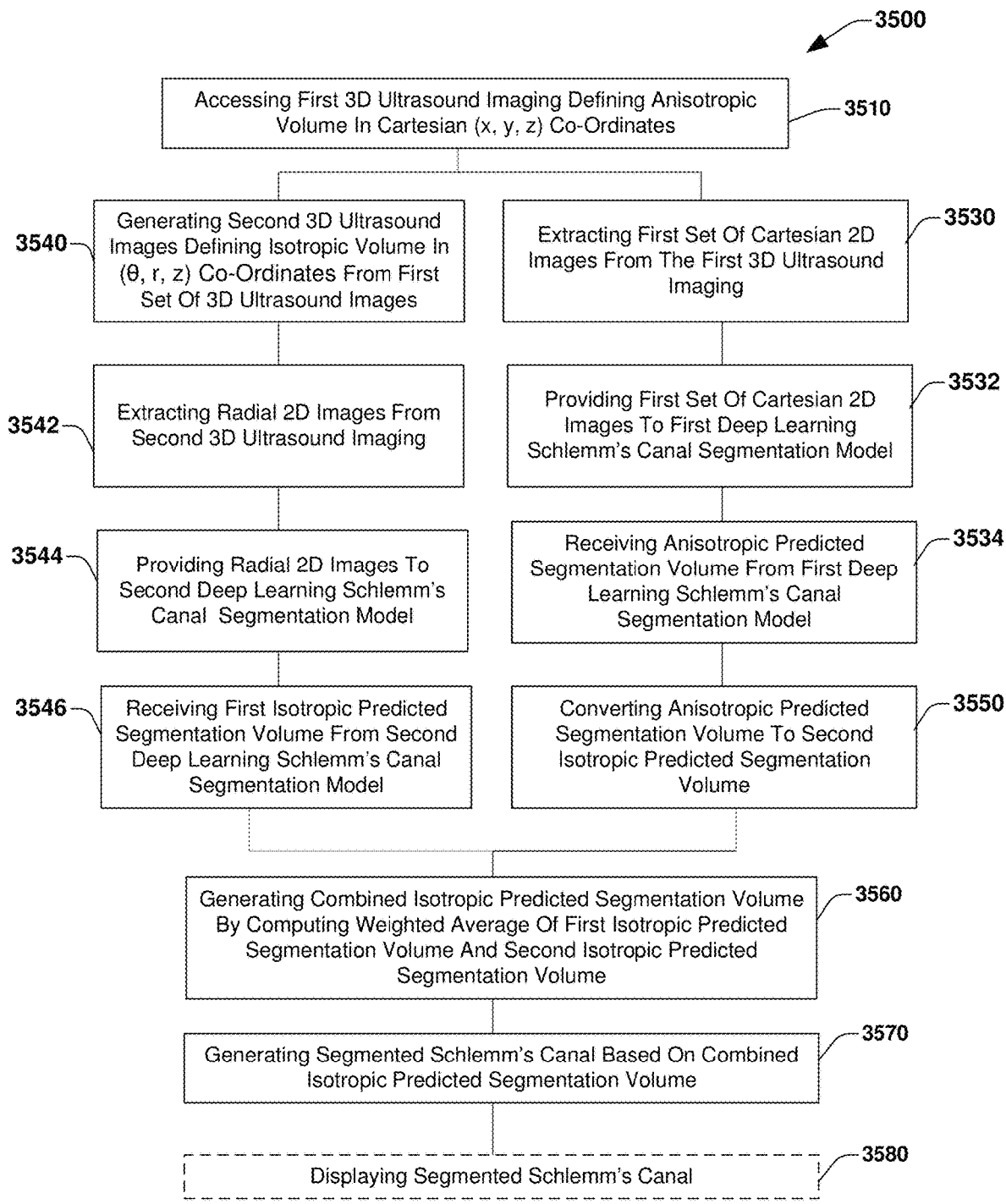
FIG. 35 illustrates a flow diagram of an example methodology or operations for segmenting a Schlemm's canal or collecting channels represented in 3D ultrasound imaging according to various embodiments described herein.

FIG. 35 is a workflow diagram of an example set of operations 3500 that when executed, control a processor to perform operations for generating a segmented ocular structure via at least one deep learning ocular structure segmentation model. In this example, the ocular structure comprises a Schlemm's canal. Operations 3500 may be implemented as part of operations 200, or may be executed by the one or more processors 150 of apparatus 100, apparatus 3700, or by computer 3800, or any other systems, apparatus, or embodiments described herein. In one embodiment, the ocular structure may comprise a Schlemm's canal and collecting channels. Operations 3500 comprises, at 3510, accessing a first three-dimensional (3D) ultrasound imaging of an eye, where the eye comprises a Schlemm's canal, where the first 3D ultrasound imaging defines an anisotropic 3D volume in Cartesian (x, y, z) co-ordinates. In one embodiment, the eye has been injected with an intraocular contrast agent that distends Schlemm's canal or collecting channels prior to or concurrently with the execution of operations 3500.

Operations 3500 also comprises, at 3530, extracting a first set of Cartesian two-dimensional (2D) ultrasound images from the first 3D ultrasound imaging, where a member of the first set of Cartesian 2D ultrasound images is represented in (y, z) co-ordinates.

Operations 3500 also comprises, at 3532, providing the first set of Cartesian 2D ultrasound images to a first deep learning Schlemm's canal segmentation model configured to generate an anisotropic predicted segmentation volume of a Schlemm's canal or collecting channels. In one embodiment, the first deep learning Schlemm's canal segmentation model is trained on a set of 2D (y, z) images extracted from a plurality of anisotropic Cartesian 3D ultrasound imaging eye volumes represented in (x, y, z) co-ordinates, where each member of the plurality of anisotropic Cartesian 3D ultrasound eye volumes has an associated Schlemm's canal ground truth, where each member of the plurality of anisotropic Cartesian 3D ultrasound eye volumes represents an eye that has been injected with an intraocular contrast agent that distends Schlemm's canal or collecting channels. In one embodiment, a member of the plurality of anisotropic Cartesian 3D ultrasound imaging eye volumes represented in (x, y, z) co-ordinates has dimensions of 384 pixels in the x axis, 1100 pixels in the y axis, and 998 pixels in the z axis.

In one embodiment, the first deep learning Schlemm's canal segmentation model comprises a convolutional neural network (CNN) having a fully convolutional network architecture. In one embodiment, the first deep learning Schlemm's canal segmentation model is optimized to reduce a loss function associated with the first deep learning Schlemm's canal segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Operations 3500 also comprises, at 3534, receiving, from the first deep learning Schlemm's canal segmentation model, an anisotropic predicted segmentation volume of the Schlemm's canal, where the anisotropic predicted segmentation volume is represented in (x, y, z) co-ordinates.

Operations 3500 also comprises, at 3540, generating a second, different 3D ultrasound imaging by converting the first 3D ultrasound imaging to radial (θ, r, z) co-ordinates, where the second 3D ultrasound imaging defines an isotropic 3D volume in radial (θ, r, z) co-ordinates. Operations 3500 also comprises, at 3542, extracting a set of radial 2D ultrasound images from the second, different 3D ultrasound imaging, where a member of the set of radial 2D ultrasound images is represented in (r, z) co-ordinates. In one embodiment, extracting the set of radial 2D ultrasound images from the second, different 3D ultrasound imaging comprises extracting 360 (r, z) images at an angle interval of 0.5, from the second, different set of 3D ultrasound images, according to various techniques described herein. Embodiments may extract the set of radial 2D ultrasound images from the second, different 3D ultrasound imaging according to various techniques described herein, for example, operations 1800.

Operations 3500 also comprises, at 3544, providing the set of radial 2D ultrasound images to a second, different deep learning Schlemm's canal segmentation model configured to generate an isotropic predicted segmentation volume of a Schlemm's canal. In one embodiment, the second deep learning Schlemm's canal segmentation model is trained on a set of 2D (r, z) images extracted from a plurality of isotropic radial 3D ultrasound imaging eye volumes generated by converting the plurality of anisotropic Cartesian 3D-UBM volumes to radial (θ, r, z) co-ordinates.

In one embodiment, the second deep learning Schlemm's canal segmentation model comprises a convolutional neural network (CNN) having a fully convolutional network architecture. In one embodiment, the second deep learning Schlemm's canal segmentation model is optimized to reduce a loss function associated with the second deep learning Schlemm's canal segmentation model using at least one of: a stochastic gradient descent loss function optimization technique, an RMSprop loss function optimization technique, an Adagrad loss function optimization technique, an Adadelta loss function optimization technique, or Adam loss function optimization technique Operations 3500 also comprises, at 3546, receiving, from the second deep learning Schlemm's canal segmentation model, a first isotropic predicted segmentation volume of the Schlemm's canal, where the first isotropic predicted segmentation volume is represented in (θ, r, z) co-ordinates.

Operations 3500 also comprises, at 3550, converting the anisotropic predicted segmentation volume to a second, different isotropic predicted segmentation volume represented in (θ, r, z) co-ordinates. Operations 3500 also comprises, at 3560, generating a combined isotropic predicted segmentation volume by computing a weighted average of the first isotropic predicted segmentation volume and the second isotropic predicted segmentation volume. Operations 3500 also comprises, at 3570, generating a segmented Schlemm's canal based on the combined isotropic predicted segmentation volume. Operations 3500 may optionally comprise, at 3590, displaying the segmented Schlemm's canal.

Figure 36:
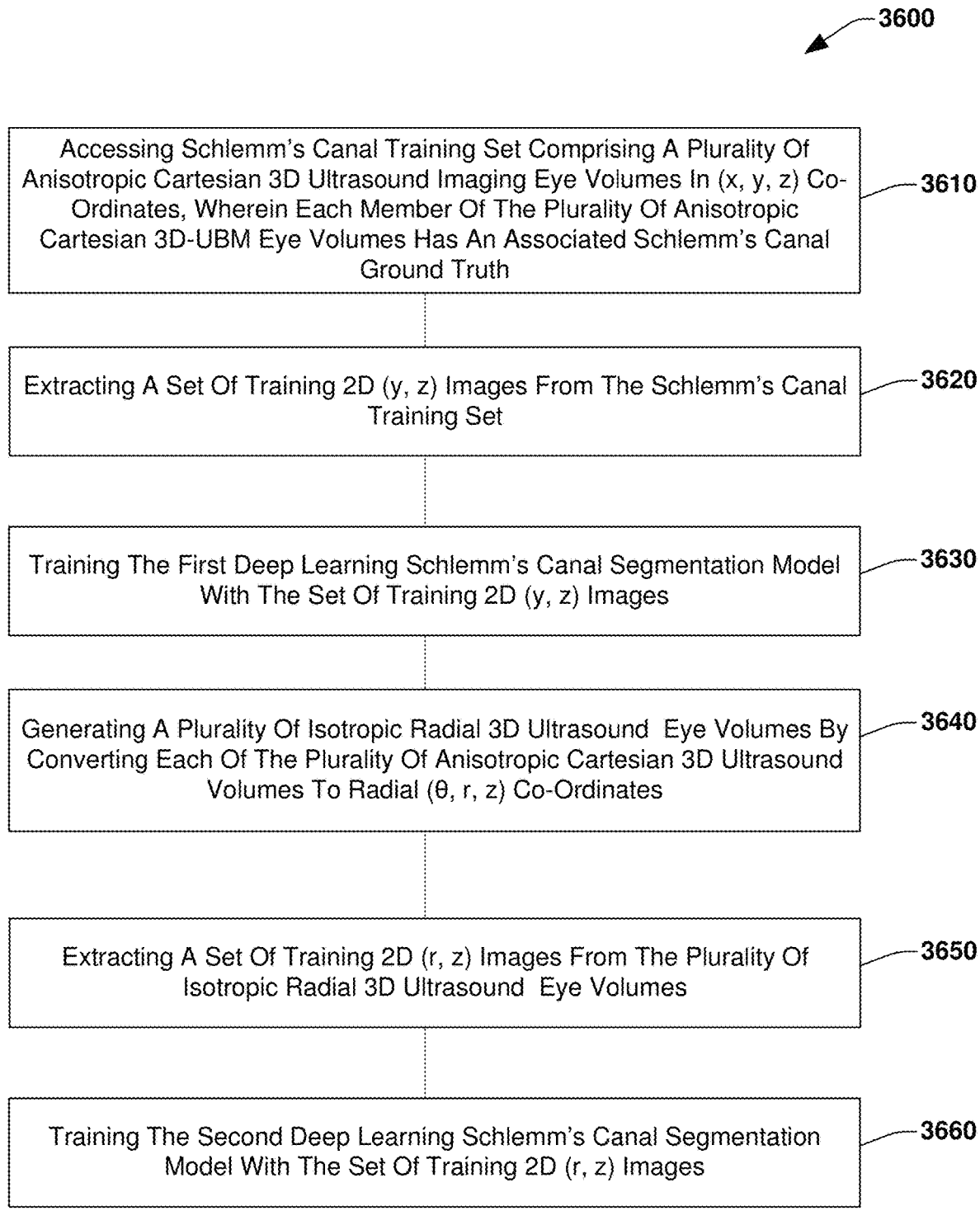
FIG. 36 illustrates a flow diagram of an example methodology or operations for training a deep learning Schlemm's canal segmentation model according to various embodiments described herein.

FIG. 36 is a workflow diagram of an example set of operations 3600 that when executed, control a processor to perform operations for training at least one deep learning ocular structure segmentation model. In this example, the ocular structure comprises a Schlemm's canal or collecting channels. Operations 3600 may be implemented as part of operations 200, or may be executed by the one or more processors 150 of apparatus 100, apparatus 3700, or by computer 3800, or any other systems, apparatus, or embodiments described herein. Operations 3600 comprises, at 3610 accessing a Schlemm's canal training set, wherein the Schlemm's canal training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes has an associated Schlemm's canal ground truth, wherein each member of the plurality of training anisotropic Cartesian 3D ultrasound eye volumes represents an eye that has been injected with an intraocular contrast agent that distends Schlemm's canal or collecting channels. In one embodiment, wherein each member of the plurality of training anisotropic Cartesian 3D ultrasound imaging eye volumes is acquired using 3D ultrasound biomicroscopy (3D-UBM) imaging.

Operations 3600 also comprises, at 3620, extracting a set of training 2D (y, z) images from the Schlemm's canal training set.

Operations 3600 also comprises, at 3630, training a first deep learning Schlemm's canal segmentation model configured to generate an anisotropic predicted segmentation volume of an anterior chamber with the set of training 2D (y, z) images and associated anterior chamber ground truth. In one embodiment, wherein training the first deep learning Schlemm's canal segmentation model with the set of training 2D (y, z) images comprises at least optimizing the first deep learning Schlemm's canal segmentation model to reduce a loss function associated with the first deep learning Schlemm's canal segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Operations 3600 also comprises, at 3640, generating a plurality of isotropic radial 3D ultrasound imaging eye volumes by converting the plurality of training anisotropic Cartesian 3D ultrasound imaging eye volumes to radial (θ, r, z) co-ordinates;

Operations 3600 also comprises, at 3650, extracting a set of training radial 2D (r, z) images from the plurality of isotropic radial 3D ultrasound imaging eye volumes.

Operations 3600 further comprises, at 3650, training a second deep learning Schlemm's canal segmentation model configured to generate an isotropic predicted segmentation volume of a Schlemm's canal with the set of training radial 2D (r, z) images and associated Schlemm's canal ground truth. In one embodiment, wherein training the second deep learning Schlemm's canal segmentation model with the set of training radial 2D (r, z) images comprises at least optimizing the second deep learning Schlemm's canal segmentation model to reduce a loss function associated with the second deep learning Schlemm's canal segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Figure 38:
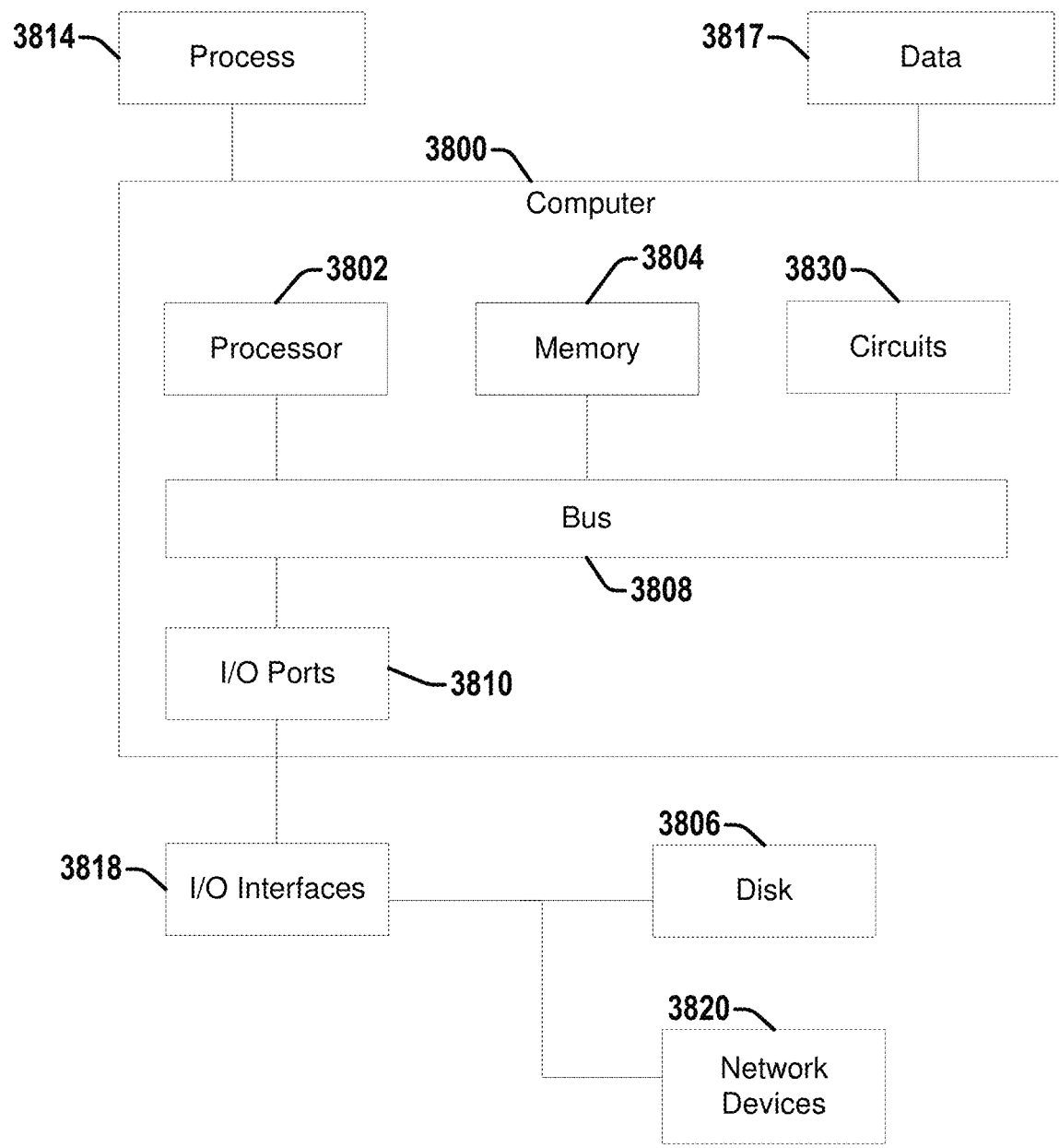
FIG. 38 illustrates an example computer with which various embodiments described herein may operate.

FIG. 38 illustrates an example computer 3800 in which example methods illustrated herein can operate and in which example methods, apparatus, circuits, operations, or logics may be implemented. In different examples, computer 900 may be part of an ocular ultrasound system or apparatus, or a personalized medicine system, or may be operably connectable to an ocular ultrasound system or apparatus, or a personalized medicine system.

Computer 3800 includes a processor 3802, a memory 3804, and input/output (I/O) ports 3810 operably connected by a bus 3808. In one example, computer 3800 may include a set of logics or circuits 3830 that perform operations for or a method of segmenting an ocular structure based, at least in part, on a 3D volume rendering generated according to various techniques described herein, noise reducing ultrasound imagery, image aligning ultrasound imagery, computing a clinical metric associated with the ocular structure, or generating a 3D volume rendering of an eye, according to various techniques described herein. Thus, the set of circuits 3830, whether implemented in computer 3800 as hardware, firmware, software, and/or a combination thereof may provide means (e.g., hardware, firmware, circuits) for segmenting an ocular structure based, at least in part, on a 3D volume rendering generated according to various techniques described herein, noise reducing ultrasound imagery, image aligning ultrasound imagery, computing a clinical metric associated with the ocular structure, or generating a 3D volume rendering of an eye, according to various techniques described herein. In different examples, the set of circuits 3830 may be permanently and/or removably attached to computer 3800.

Processor 3802 can be a variety of various processors including dual microprocessor and other multi-processor architectures. Processor 3802 may be configured to perform steps of methods claimed and described herein. Memory 3804 can include volatile memory and/or non-volatile memory. A disk 3806 may be operably connected to computer 3800 via, for example, an input/output interface (e.g., card, device) 3818 and an input/output port 3810. Disk 3806 may include, but is not limited to, devices like a magnetic disk drive, a tape drive, a Zip drive, a flash memory card, or a memory stick. Furthermore, disk 3806 may include optical drives like a CD-ROM or a digital video ROM drive (DVD ROM). Memory 3804 can store processes 3814 or data 3817, for example. Data 3817 may, in one embodiment, include ultrasound images, including 3D ultrasound images of tissue demonstrating glaucoma. Disk 3806 or memory 904 can store an operating system that controls and allocates resources of computer 3800.

Bus 3808 can be a single internal bus interconnect architecture or other bus or mesh architectures. While a single bus is illustrated, it is to be appreciated that computer 3800 may communicate with various devices, circuits, logics, and peripherals using other buses that are not illustrated (e.g., PCIE, SATA, Infiniband, 1394, USB, Ethernet).

Computer 3800 may interact with input/output devices via I/O interfaces 3818 and input/output ports 3810. Input/output devices can include, but are not limited to, an ultrasound system, digital whole slide scanners, CT systems, MRI systems, an optical microscope, a keyboard, a microphone, a pointing and selection device, cameras, video cards, displays, disk 3806, network devices 3820, or other devices. Input/output ports 3810 can include but are not limited to, serial ports, parallel ports, or USB ports.

Computer 3800 may operate in a network environment and thus may be connected to network devices 3820 via I/O interfaces 3818 or I/O ports 3810. Through the network devices 3820, computer 3800 may interact with a network. Through the network, computer 3800 may be logically connected to remote computers. The networks with which computer 3800 may interact include, but are not limited to, a local area network (LAN), a wide area network (WAN), or other networks, including the cloud.

Example 1 comprises an apparatus comprising: a memory configured to store instructions that when executed control a processor to perform operations; an input/output (I/O) interface; one or more processors; an interface that connects the memory, the I/O interface, and the one or more processors, the one or more processors configured to: access three-dimensional (3D) ultrasound imaging of an eye; generate at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging; compute at least one clinical metric associated with the at least one segmented ocular structure based on the at least one segmented ocular structure; and display at least one of: the at least one segmented ocular structure, the at least one clinical metric, the 3D ultrasound imaging, or at least one portion of the 3D ultrasound imaging.

Example 2 comprises the subject matter of any variation of any of example(s) 1, where wherein the one or more processors are configured to align at least one portion of the 3D ultrasound imaging to reduce misalignment among the 3D ultrasound imaging, wherein aligning at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique.

Example 3 comprises the subject matter of any variations of any of example(s) 1-2, wherein the one or more processors are configured to noise-reduce at least one portion of the 3D ultrasound imaging, wherein noise-reducing the 3D ultrasound imaging comprises noise-reducing the 3D ultrasound imaging using at least one of: a rotational frames averaging noise reduction technique, an edge preserving filters noise reduction technique, a median kernel and center-weighted linear filter noise reduction technique, or at least one deep learning noise reduction model, wherein the at least one deep learning noise reduction model is trained on a deep learning noise reduction model training set.

Example 4 comprises the subject matter of any variations of any of example(s) 1-3, wherein the one or more processors are configured to train the at least one deep learning noise reduction model.

Example 5 comprises the subject matter of any variations of any of example(s) 1-4, wherein the one or more processors are further configured to generate at least one deep learning noise reduction model training set, wherein training the deep learning noise reduction model comprises training the at least one deep learning noise reduction model with the at least one deep learning noise reduction model training set.

Example 6 comprises the subject matter of any variations of any of example(s) 1-5, wherein the at least one ocular structure comprises a Schlemm's canal and collecting channels, wherein generating the at least one deep learning noise reduction model training set comprises generating a Schlemm's canal enhanced noise reduction training set comprising at least one set of 3D ultrasound imaging of eyes, wherein at least one of the eyes has been injected with an intraocular contrast agent that distends Schlemm's canal or collecting channels.

Example 7 comprises the subject matter of any variations of any of example(s) 1-6, wherein the at least one deep learning ocular structure segmentation model comprises at least one of: a first deep learning ocular structure segmentation model configured to accept at least one portion of the 3D ultrasound imaging in Cartesian (x, y, z) coordinates as an input, and configured to generate a first predicted segmentation volume of the at least one ocular structure based on the at least one portion of the 3D ultrasound imaging in Cartesian (x, y, z) coordinates; or a second, different deep learning ocular structure segmentation model configured to accept at least one portion of the 3D ultrasound imaging in (θ, r, z) coordinates as an input, and configured to generate a second predicted segmentation volume of the at least one ocular structure based on the at least one portion of the 3D ultrasound imaging in (θ, r, z) coordinates.

Example 8 comprises the subject matter of any variations of any of example(s) 7, wherein the at least one deep learning ocular structure segmentation model comprises the first deep learning ocular structure segmentation model and the second deep learning ocular structure segmentation model, wherein generating the at least one segmented ocular structure further comprises computing a weighted average of the first predicted segmentation volume and the second predicted segmentation volume.

Example 9 comprises the subject matter of any variations of any of example(s) 1-8, wherein the at least one ocular structure comprises an anterior chamber, wherein the at least one deep learning ocular structure segmentation model comprises at least one deep learning anterior chamber segmentation model trained on an anterior chamber training set.

Example 10 comprises the subject matter of any variations of any of example(s) 1-9, wherein the at least one clinical metric comprises at least one of: an iridocorneal angle, a volume of the anterior chamber, or an area of the anterior chamber.

Example 11 comprises the subject matter of any variations of any of example(s) 1-10, wherein the at least one clinical metric comprises an iridocorneal angle, wherein the at least one segmented ocular structure comprises a segmented anterior chamber, wherein computing the at least one clinical metric associated with the at least one segmented ocular structure based on the at least one segmented ocular structure comprises: detecting an apex of the segmented anterior chamber; fitting an inner corneal fitting curve to a corneal boundary represented in the at least one portion of the 3D ultrasound imaging based on the segmented anterior chamber; determining a location of Schwalbe's line represented in the at least one portion of the 3D ultrasound imaging based on the inner corneal fitting curve; locating a scleral spur represented in the at least one portion of the 3D ultrasound imaging based on the location of Schwalbe's line; computing at least one of: an angle-opening distance 250 μm (AOD 250), or an AOD 500 μm (AOD 500), based on the scleral spur, the inner corneal fitting curve, and an iris represented in the at least one portion of the 3D ultrasound imaging; computing a trabecular-iris-angle (TIA) based on the apex of the segmented anterior chamber and the AOD 250 or the AOD 500; and computing an iridocorneal angle based on the TIA.

Example 12 comprises the subject matter of any variations of any of example(s) 1-11, wherein the at least one ocular structure comprises at least one ocular abnormality, and where the at least one deep learning ocular structure segmentation model comprises at least one deep learning ocular abnormality segmentation model trained on an ocular abnormality training set.

Example 13 comprises the subject matter of any variations of any of example(s) 1-12, wherein the at least one clinical metric comprises at least one of: a location of the ocular abnormality, a volume of the ocular abnormality, an area of the ocular abnormality, or a length of the ocular abnormality.

Example 14 comprises the subject matter of any variations of any of example(s) 1-13, wherein the at least one ocular abnormality comprises a tumor, a cyst, a melanoma, or a nevus.

Example 15 comprises the subject matter of any variations of any of example(s) 1-4, wherein the at least one ocular structure comprises a Schlemm's canal and collecting channels, and wherein the at least one deep learning ocular structure segmentation model comprises at least one deep learning Schlemm's canal segmentation model trained on a Schlemm's canal training set.

Example 16 comprises the subject matter of any variations of any of example(s) 1-15, wherein the at least one clinical metric comprises at least one of: a cross sectional area of the Schlemm's canal, a number of collecting channels, or a volume of collecting channels.

Example 17 comprises the subject matter of any variations of any of example(s) 1-16, wherein the 3D ultrasound imaging is acquired using at least one of: a linear scan ultrasound acquisition technique, a gimballed scan ultrasound acquisition technique, a phased array 3D ultrasound acquisition technique, a freehand 3D ultrasound acquisition technique, or a 3D ultrasound biomicroscopy (UBM) acquisition technique.

Example 18 comprises the subject matter of any variations of any of example(s) 1-17, wherein the 3D ultrasound imaging comprises 3D ultrasound imaging described in Cartesian (x, y, z) co-ordinates, wherein the 3D ultrasound imaging described in Cartesian (x, y, z) co-ordinates defines an anisotropic volume in Cartesian (x, y, z) co-ordinates, wherein the one or more processors are configured to convert the 3D ultrasound imaging described in Cartesian (x, y, z) co-ordinates to 3D ultrasound imaging described in (θ, r, z) co-ordinates, wherein the 3D ultrasound imaging described in (θ, r, z) co-ordinates defines an isotropic volume in (θ, r, z) coordinates.

Example 19 comprises the subject matter of any variations of any of example(s) 1-18, wherein converting the 3D ultrasound imaging from Cartesian (x, y, z) co-ordinates to (θ, r, z) co-ordinates further comprises correcting a tilt of an optic axis of the eye represented in the 3D ultrasound imaging described in (θ, r, z) relative to a z-axis of the 3D ultrasound imaging described in (θ, r, z).

Example 20 comprises the subject matter of any variations of any of example(s) 1-19, wherein the one or more processors are configured to generate a 3D volume rendering based on the 3D ultrasound imaging using a gradient-based optical transfer function (OTF) opacity enhancement ray casting approach, wherein the one or more processors are further configured to display the 3D volume rendering.

Example 21 comprises the subject matter of any variations of any of example(s) 1-20, wherein the one or more processors are configured to receive input via a user interface for changing an operating parameter of the one or more processors, and in response to receiving the input, change the operating parameter of the one or more processors, wherein the operating parameter is associated with at least one of: accessing 3D ultrasound imaging of the eye, aligning the at least one portion of the 3D ultrasound imaging, noise-reducing the at least one portion of the 3D ultrasound imaging, generating the at least one segmented ocular structure, correcting a tilt of an optic axis of the eye represented in the 3D ultrasound imaging, generating a 3D volume rendering, or displaying the at least one of: a 3D volume rendering, the at least one segmented ocular structure, the at least one clinical metric, the 3D ultrasound imaging, or a portion of the 3D ultrasound imaging.

Example 22 comprises the subject matter of any variations of any of example(s) 1-21, wherein the one or more processors is configured to train the at least one deep learning ocular segmentation model.

Example 23 comprises the subject matter of any variations of any of example(s) 1-22, wherein the one or more processors is configured to generate at least one deep learning ocular segmentation model training set, wherein the at least one deep learning ocular segmentation training set comprises an anterior chamber training set, an ocular abnormality training set, or a Schlemm's canal training set. Another example comprises a machine readable storage device that stores instructions for execution by a processor to perform any of the described operations of examples 1-23. Another example comprises an apparatus comprising: a memory; a processor, and one or more circuits configured to: perform any of the described operations of examples 1-23.

Example 24 comprises a non-transitory computer-readable storage device storing computer-executable instructions that when executed control a processor to perform operations, the operations comprising: accessing three-dimensional (3D) ultrasound imaging of an eye; generating at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging; computing at least one clinical metric associated with the at least one segmented ocular structure based on the at least one segmented ocular structure; and displaying at least one of: the at least one segmented ocular structure, the at least one clinical metric, the 3D ultrasound imaging, or the at least one portion of the 3D ultrasound imaging.

Example 25 comprises the subject matter of any variations of any of example(s) 24, the operations comprising aligning at least one portion of the 3D ultrasound imaging to reduce misalignment among the 3D ultrasound imaging; wherein aligning the at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique.

Example 26 comprises the subject matter of any variations of any of example(s) 24-25, the operations comprising noise-reducing at least one portion of the 3D ultrasound imaging, wherein noise-reducing the 3D ultrasound imaging comprises noise-reducing the 3D ultrasound imaging using at least one of: a rotational frames averaging noise reduction technique, an edge preserving filters noise reduction technique, a median kernel and center-weighted linear filter noise reduction technique, or a deep learning noise reduction model.

Example 27 comprises the subject matter of any variations of any of example(s) 24-26, the operations comprising training the deep learning noise reduction model.

Example 28 comprises the subject matter of any variations of any of example(s) 24-27, the operations comprising generating a deep learning noise reduction model training set; wherein training the deep learning noise reduction model comprises training the deep learning noise reduction model with the deep learning noise reduction model training set.

Example 29 comprises the subject matter of any variations of any of example(s) 24-28, wherein the at least one ocular structure comprises a Schlemm's canal and collecting ducts, wherein generating the deep learning noise reduction model training set comprises generating a Schlemm's canal enhanced training set comprising at least a set of noise-reduced 3D ultrasound imaging of eyes, wherein the eyes have been injected with an intraocular contrast agent.

Example 30 comprises the subject matter of any variations of any of example(s) 24-29, wherein the at least one deep learning ocular structure segmentation model comprises at least one of: a first deep learning ocular structure segmentation model configured to accept at least one portion of the 3D ultrasound imaging in Cartesian (x, y, z) coordinates as an input, and configured to generate a first predicted segmentation volume of the at least one ocular structure based on the at least one portion of the 3D ultrasound imaging in Cartesian (x, y, z) coordinates; or a second, different deep learning ocular structure segmentation model configured to accept at least one portion of the 3D ultrasound imaging in (θ, r, z) coordinates as an input, and configured to generate a second predicted segmentation volume of the at least one ocular structure based on the at least one portion of the 3D ultrasound imaging in (θ, r, z) coordinates.

Example 31 comprises the subject matter of any variations of any of example(s) 24-30, wherein the at least one deep learning ocular structure segmentation model comprises the first deep learning ocular structure segmentation model and the second deep learning ocular structure segmentation model, wherein generating the at least one segmented ocular structure comprises computing a weighted average of the first predicted segmentation volume and the second first predicted segmentation volume.

Example 32 comprises the subject matter of any variations of any of example(s) 24-31, wherein the at least one ocular structure comprises an anterior chamber, and wherein the at least one deep learning ocular structure segmentation model comprises at least one deep learning anterior chamber segmentation model trained on an anterior chamber training set.

Example 33 comprises the subject matter of any variations of any of example(s) 24-32, wherein the at least one clinical metric comprises at least one of: an iridocorneal angle, a volume of the anterior chamber, or an area of the anterior chamber.

Example 34 comprises the subject matter of any variations of any of example(s) 24-33, wherein the at least one clinical metric comprises an iridocorneal angle, wherein the at least one segmented ocular structure comprises a segmented anterior chamber, wherein computing the at least one clinical metric associated with the at least one segmented ocular structure based on the at least one segmented ocular structure comprises: detecting an apex of the segmented anterior chamber; fitting an inner corneal fitting curve to a corneal boundary represented in the at least one portion of the 3D ultrasound imaging based on the segmented anterior chamber; determining a location of Schwalbe's line represented in the at least one portion of the 3D ultrasound imaging based on the inner corneal fitting curve; locating a scleral spur represented in the at least one portion of the 3D ultrasound imaging based on the location of Schwalbe's line; computing at least one of: an angle-opening distance 250 μm (AOD 250), or an AOD 500 μm (AOD 500), based on the scleral spur, the inner corneal fitting curve, and an iris represented in the at least one portion of the 3D ultrasound imaging; computing a trabecular-iris-angle (TIA) based on the apex of the segmented anterior chamber and the AOD 250 or the AOD 500; and computing an iridocorneal angle based on the TIA.

Example 35 comprises the subject matter of any variations of any of example(s) 24-34, wherein the at least one ocular structure comprises at least one ocular abnormality, and where the at least one deep learning ocular structure segmentation model comprises at least one deep learning ocular abnormality segmentation model trained on an ocular abnormality training set.

Example 36 comprises the subject matter of any variations of any of example(s) 24-35, wherein the at least one clinical metric comprises at least one of: a location of the ocular abnormality, a volume of the ocular abnormality, an area of the ocular abnormality, or a length of the ocular abnormality.

Example 37 comprises the subject matter of any variations of any of example(s) 24-36, wherein the at least one ocular abnormality comprises a tumor, a cyst, a melanoma, or a nevus.

Example 38 comprises the subject matter of any variations of any of example(s) 24-37, wherein the at least one ocular structure comprises a Schlemm's canal and collecting channel, and wherein the at least one deep learning ocular structure segmentation model comprises at least one deep learning Schlemm's canal segmentation model trained on a Schlemm's canal training set.

Example 39 comprises the subject matter of any variations of any of example(s) 24-38, wherein the at least one clinical metric comprises at least one of: a cross sectional area of the Schlemm's canal, a number of collecting channels, or a volume of collecting channels.

Example 40 comprises the subject matter of any variations of any of example(s) 24-39, wherein the 3D ultrasound imaging is acquired using at least one of: a linear scan ultrasound acquisition technique, a gimballed scan ultrasound acquisition technique, a phased array 3D ultrasound acquisition technique, a freehand 3D ultrasound acquisition technique, or a 3D ultrasound biomicroscopy (UBM) acquisition technique.

Example 41 comprises the subject matter of any variations of any of example(s) 24-40, wherein the 3D ultrasound imaging comprises 3D ultrasound imaging described in Cartesian (x, y, z) co-ordinates, wherein the 3D ultrasound imaging described in Cartesian (x, y, z) co-ordinates defines an anisotropic volume in Cartesian (x, y, z) co-ordinates, the operations further comprising converting the 3D ultrasound imaging described in Cartesian (x, y, z) co-ordinates to 3D ultrasound imaging described in (θ, r, z) co-ordinates, wherein the 3D ultrasound imaging described in (θ, r, z) co-ordinates defines an isotropic volume in (θ, r, z) coordinates.

Example 42 comprises the subject matter of any variations of any of example(s) 24-41, wherein converting the 3D ultrasound imaging from Cartesian (x, y, z) co-ordinates to (θ, r, z) co-ordinates further comprises correcting a tilt of an optic axis of the eye represented in the 3D ultrasound imaging described in (θ, r, z) relative to a z-axis of the 3D ultrasound imaging described in (θ, r, z).

Example 43 comprises the subject matter of any variations of any of example(s) 24-42, the operations comprising generating a 3D volume rendering based on the 3D ultrasound imaging using a gradient-based optical transfer function (OTF) opacity enhancement ray casting approach; and displaying the 3D volume rendering.

Example 44 comprises the subject matter of any variations of any of example(s) 24-43, the operations comprising receiving input via a user interface for changing an operating parameter of a processor, and in response to receiving the input, changing the operating parameter of the processor, wherein the operating parameter is associated with at least one of: accessing 3D ultrasound imaging of the eye, aligning the at least one portion of the 3D ultrasound imaging, noise-reducing the at least one portion of the 3D ultrasound imaging, generating the at least one segmented ocular structure, correcting a tilt of an optic axis of the eye represented in the 3D ultrasound imaging, generating a 3D volume rendering, or displaying the at least one of: the 3D volume rendering, the at least one segmented ocular structure, the at least one clinical metric, the 3D ultrasound imaging, or a portion of the 3D ultrasound imaging.

Example 45 comprises the subject matter of any variations of any of example(s) 24-45, the operations further comprising training the at least one deep learning ocular segmentation model.

Example 46 comprises the subject matter of any variations of any of example(s) 24-45, the operations further comprising generating at least one deep learning ocular segmentation model training set, wherein the at least one deep learning ocular segmentation training set comprises an anterior chamber training set, an ocular abnormality training set, or a Schlemm's canal training set. Another example comprises a machine readable storage device that stores instructions for execution by a processor to perform any of the described operations of examples 24-46. Another example comprises an apparatus comprising: a memory; a processor, and one or more circuits configured to: perform any of the described operations of examples 24-46.

Example 47 comprises an apparatus that facilitates segmentation of ocular structures represented in three dimensional (3D) ultrasound imaging. The apparatus comprises a processor, a memory configured to store 3D ultrasound imaging data of an eye. The 3D ultrasound imaging data comprises an input/output (I/O) interface, a set of circuits, and an interface that connects the processor, the memory, the I/O interface, and the set of circuits. The set of circuits is configured to access three-dimensional (3D) ultrasound imaging of an eye, pre-process the 3D ultrasound imaging, segment at least one ocular structure represented in the 3D ultrasound imaging using at least one deep learning ocular structure segmentation model configured to generate a predicted segmentation volume of the at least one ocular structure based on at least one portion of the 3D ultrasound imaging, compute at least one clinical metric associated with the at least one segmented ocular structure based on the at least one segmented ocular structure, and output a visual representation of at least one of: the at least one segmented ocular structure, the at least one clinical metric, the 3D ultrasound imaging, or at least one portion of the 3D ultrasound imaging.

Example 48 depends on example 47, wherein pre-processing the 3D ultrasound imaging comprises aligning at least one portion of the 3D ultrasound imaging to reduce misalignment among the 3D ultrasound imaging. Aligning the at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique.

Example 49 depends on example 47, wherein pre-processing the 3D ultrasound imaging comprises noise-reducing at least one portion of the 3D ultrasound imaging. Noise-reducing the 3D ultrasound imaging comprises noise-reducing the 3D ultrasound imaging using at least one of: a rotational frames averaging noise reduction technique, an edge preserving filters noise reduction technique, a median kernel and center-weighted linear filter noise reduction technique, or a deep learning noise reduction model.

Example 50 depends on example 47, wherein the at least one deep learning ocular structure segmentation model comprises at least one of: a first deep learning ocular structure segmentation model configured to accept at least one portion of the 3D ultrasound imaging in Cartesian (x, y, z) coordinates as an input, and configured to generate a first predicted segmentation volume of the ocular structure based on the at least one portion of the 3D ultrasound imaging in Cartesian (x, y, z) coordinates, or a second, different deep learning ocular structure segmentation model configured to accept at least one portion of the 3D ultrasound imaging in (θ, r, z) coordinates as an input, and configured to generate a second predicted segmentation volume of the ocular structure based on the at least one portion of the 3D ultrasound imaging in (θ, r, z) coordinates.

Example 51 depends upon example 50, wherein the at least one deep learning ocular structure segmentation model comprises the first deep learning ocular structure segmentation model and the second, deep learning ocular structure segmentation model, wherein generating the at least one segmented ocular structure comprises computing an average of the first predicted segmentation volume and the second first predicted segmentation volume.

Example 52 depends on example 51, wherein computing an average of the first predicted segmentation volume and the second first predicted segmentation volume comprises computing a weighted averaged of the first predicted segmentation volume and the second first predicted segmentation volume.

Example 53 depends on example 47, wherein the one or more circuits are further configured to: generate a 3D volume rendering based on the 3D ultrasound imaging using a gradient-based optical transfer function (OTF) opacity enhancement ray casting approach, and output a visual representation of the 3D volume rendering.

Example 54 depends on example 47, wherein the at least one ocular structure comprises at least one of: an anterior chamber, a Schlemm's canal and collecting channels, or an ocular abnormality.

Examples herein can include subject matter such as an apparatus, an ultrasound imaging system or apparatus, an ultrasound image processing and analysis system or apparatus, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or operations or of an apparatus or system for processing or analyzing ultrasound images of an eye according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The examples below are set forth in non-transitory computer-readable storage device format, but the disclosure fully contemplates each of such examples as a system of device containing processors, memory, etc., and all such examples are contemplated as falling within the scope of the present disclosure.

Example B1 comprises a non-transitory computer-readable storage device storing instructions that when executed control a processor to perform operations, the operations comprising: accessing 3D ultrasound imaging of an eye, wherein the 3D ultrasound imaging comprises a plurality of 2D ultrasound images; and generating a pairwise aligned set of ultrasound images by aligning, on a 2D ultrasound image by 2D ultrasound image basis, the plurality of 2D ultrasound images using pairwise gray-scale rigid body image registration with normalized cross correlation.

Example B2 comprises the subject matter of any variation of example B1, the operations comprising: generating a segmented anterior chamber by segmenting an anterior chamber represented in the pairwise aligned set of images, wherein the segmented anterior chamber comprises a bottom border, accessing a model of an anterior chamber, wherein the model of the anterior chamber comprises a model of the bottom border of the anterior chamber, a model of an iris, and a model of a lens, generating an aligned segmented anterior chamber bottom border by aligning the segmented anterior chamber bottom border with the model of the bottom border, and aligning the pairwise aligned set of ultrasound images based on the aligned segmented anterior chamber bottom border.

Example B3 comprises the subject matter of any variations of examples B1-B2, wherein generating the segmented anterior chamber comprises generating the segmented anterior chamber using at least one deep learning anterior chamber segmentation model.

Example B4 comprises the subject matter of any variations of examples B1-B3, wherein the model of an anterior chamber comprises a symmetric low order polynomial, an asymmetric low order polynomial, or a high order polynomial, wherein the high order polynomial has a higher order than the symmetric low order polynomial or the asymmetric low order polynomial.

Example B5 comprises the subject matter of any variations of examples B1-B4, wherein aligning the segmented anterior chamber bottom border with the model of the bottom border comprises aligning the segmented anterior chamber bottom border with the model of the bottom border using least squares alignment.

Example B6 comprises the subject matter of any variations of examples B1, wherein the 3D ultrasound imaging comprises a plurality of 2D (y, z) ultrasound images acquired in x, the operations further comprising: accessing a set of orthogonal (x, z) ultrasound images of the eye, wherein the set of orthogonal (x, z) ultrasound images is acquired in y orthogonally to the of plurality of 2D (y, z) ultrasound images acquired in x, where the set of orthogonal (x, z) ultrasound images has fewer members than the plurality of 2D (y, z) ultrasound images, wherein the set of orthogonal (x, z) ultrasound images is acquired at a faster rate than the plurality of 2D (y, z) ultrasound images; and registering the pairwise aligned set of ultrasound images to the set of orthogonal (x, z) ultrasound images.

Example B7 comprises the subject matter of any variations of examples B1-B6, (The non-transitory computer-readable storage device of claim B6,) wherein registering the pairwise aligned set of images to the set of orthogonal (x, z) ultrasound images comprises registering the pairwise aligned set of images to the set of orthogonal (x, z) ultrasound images using rigid body registration with 3 free parameters, wherein the 3 free parameters comprise ($\Delta x$, $\Delta y$, $\Delta z$).

Example B8 comprises the subject matter of any variations of examples B1-B7, wherein the 3D ultrasound imaging comprises a plurality of 2D (y, z) ultrasound images acquired in x, the operations further comprising: accessing a second 3D ultrasound imaging of the eye, wherein the second 3D ultrasound imaging comprises a plurality of 2D (x, z) ultrasound images acquired in y; generating a second pairwise aligned set of ultrasound images by aligning, on a 2D ultrasound image by 2D ultrasound image basis, the plurality of 2D (x, z) ultrasound images using pairwise gray-scale rigid body image registration with normalized cross correlation; and registering the pairwise aligned set of ultrasound images with the second pairwise aligned set of ultrasound images.

Example B9 comprises a machine readable storage device that stores instructions for execution by a processor to perform any of the described operations of examples B1-68.

Example B10 comprises an apparatus comprising: a memory; and one or more processors configured to: perform any of the described operations of examples B1-B10.

Example C1 comprises a non-transitory computer-readable storage device storing instructions that when executed control a processor to perform operations for generating a three-dimensional (3D) volume rendering of an eye, the operations comprising: accessing 3D ultrasound imaging of an eye, wherein the 3D ultrasound imaging comprises a stacked set of two-dimensional (2D) ultrasound images, wherein the set of 2D ultrasound images defines a three-dimensional (3D) volume, wherein each member of the set of 2D ultrasound images comprises a plurality of pixels, a pixel having an associated intensity value, wherein the 3D volume comprises a plurality of voxels, a voxel having at least one of: an associated color value, an associated opacity value, or an associated intensity; denoising the 3D ultrasound imaging; projecting the 3D ultrasound imaging; shading the 3D ultrasound imaging; surface classifying the 3D ultrasound imaging using a gradient-based optical transfer function (OTF) opacity enhancement technique; and generating a 3D volume rending by resampling and compositing the 3D ultrasound imaging.

Example C2 comprises the non-transitory computer-readable storage device of example C1, wherein denoising the 3D ultrasound imaging comprises denoising the 3D ultrasound imaging using at least one of: a Gaussian filter noise reduction technique, a non-linear diffusion filtering noise reduction technique, a rotational frames averaging noise reduction technique, an edge preserving filters noise reduction technique, a median kernel and center-weighted linear filter noise reduction technique, or at least one deep learning noise reduction model, wherein the at least one deep learning noise reduction model is trained on a deep learning noise reduction model training set.

Example C3 comprises the non-transitory computer-readable storage device of example C1, wherein shading the 3D ultrasound imaging comprises shading the 3D ultrasound imaging using at least one of a Phong's reflection model or a depth enhancement shading technique.

Example C4 comprises the non-transitory computer-readable storage device of example C1, wherein surface classifying the 3D ultrasound imaging using a gradient-based optical transfer function (OTF) opacity enhancement technique comprises selectively emphasizing a density of at least one of the plurality of voxels.

Example C5 comprises the non-transitory computer-readable storage device of example C1, wherein surface classifying the 3D ultrasound imaging comprises thresholding the 3D ultrasound imaging based on an intensity profile of the 3D ultrasound imaging.

Example C6 comprises the non-transitory computer-readable storage device of example C5, wherein surface classifying the 3D ultrasound imaging further comprises surface classifying the 3D ultrasound imaging using a feature enhancement technique.

Example C7 comprises the non-transitory computer-readable storage device of example C6, wherein surface classifying the 3D ultrasound imaging using a feature enhancement technique comprises increasing an opacity associated with at least one of the plurality of voxels where a gradient of the 3D volume at the location of the at least one of the plurality of voxels approaches perpendicular to a view direction (V).

Example C8 comprise the non-transitory computer-readable storage device of example C1, wherein resampling and compositing the 3D ultrasound imaging comprises compositing a color associated with at least one of the plurality of voxels and an opacity associated with the at least one of the plurality of voxels using linear interpolation.

Example C9 comprises a machine readable storage device that stores instructions for execution by a processor to perform any of the described operations of examples C1-C8.

Example C10 comprises an apparatus comprising: a memory; and one or more processors configured to: perform any of the described operations of examples C1-C8.

Example D1 comprises a non-transitory computer-readable storage device storing instructions that when executed control a processor to perform operations, the operations comprising: accessing three-dimensional (3D) ultrasound imaging of an eye, wherein the 3D ultrasound imaging defines a 3D volume in Cartesian (x, y, z) coordinates, wherein the 3D ultrasound imaging comprises a plurality of 2D (y, z) images acquired in x; converting the 3D volume to an isotropic volume in ($\theta$, r, z) coordinates; defining an x-y plane perpendicular to a z axis of the isotropic volume, where the x-y plane is set at the center of the isotropic volume; rotating the x-y plane by a first angle interval; and extracting a radial image based on the x-y coordinates of the rotated x-y plane using interpolation from the isotropic volume, where the radial image is described in (e, r, z) coordinates.

Example D2 comprises the non-transitory computer readable storage device of example D1, wherein extracting the radial image based on the x-y coordinates of the rotated x-y plane using interpolation from the isotropic volume comprises extracting coordinates of the radial image according to $x_1 = r \cos \theta$, $y_1 = r \sin \theta$ using bicubic trilinear sampling.

Example D3 comprises the non-transitory computer readable storage device of example D1, wherein the first angle interval is 0.5 degrees.

Example D4 comprises the non-transitory computer readable storage device of example D1, the operations further comprising correcting a tilt of an optic axis of the eye represented in the isotropic volume in ($\theta$, r, z) coordinates relative to the z-axis of the isotropic volume in ($\theta$, r, z) coordinates.

Example D5 comprises a machine readable storage device that stores instructions for execution by a processor to perform any of the described operations of examples D1-D4.

Example D6 comprises an apparatus comprising: a memory; and one or more processors configured to: perform any of the described operations of examples D1-D4.

Example E1 comprises a non-transitory computer readable storage device storing instructions that when executed control a processor to perform operations, the operations comprising: accessing 3D ultrasound imaging of an eye represented in cartesian (x, y, z) co-ordinates; converting the 3D ultrasound imaging of an eye represented in cartesian (x, y, z) co-ordinates to a 3D radial ($\theta$, r, z) coordinates volume; and noise reducing the 3D radial ($\theta$, r, z) coordinates volume using at least one of: a rotational frames averaging noise reduction technique, an anisotropic diffusion filter, a non-local mean filter, or a median kernel and center-weighted linear filter noise reduction technique.

Example E2 comprises the non-transitory computer-readable storage device of example E1, the operations further comprising noise reducing the 3D radial ($\theta$, r, z) coordinates volume using a deep learning noise reduction model trained on a deep learning noise reduction model training set.

Example E3 comprises the non-transitory computer-readable storage device of example E2, wherein the deep learning noise reduction model comprises a generative adversarial network optimized with Wasserstein distance and perceptual loss.

Example E4 comprises a machine readable storage device that stores instructions for execution by a processor to perform any of the described operations of examples E1-E3.

Example E5 comprises an apparatus comprising: a memory; and one or more processors configured to: perform any of the described operations of examples E1-E3.

Example E6 comprises a non-transitory computer readable storage device storing instructions that when executed control a processor to perform operations, the operations comprising: generating a deep learning noise reduction model training set.

Example E7 comprises the non-transitory computer-readable storage device of example E6, wherein generating the deep learning noise reduction model training set comprises: accessing a plurality of 3D ultrasound imaging of eyes; extracting a subsampled noisy set of 3D ultrasound imaging from the plurality of 3D ultrasound imaging of eyes, where the subsampled noisy set comprises fewer members than the plurality of 3D ultrasound imaging of eyes; and generating a noise reduced set of 3D ultrasound imaging by noise reducing each member of the plurality of 3D ultrasound imaging of eyes using rotational frames averaging.

Example E8 comprises the non-transitory computer-readable storage device of example E7, wherein extracting a subsampled noisy set of 3D ultrasound imaging from the plurality of 3D ultrasound imaging of eyes comprises extracting an equally sampled noisy set of 3D ultrasound imaging from the plurality of 3D ultrasound imaging of eyes, or an unequally sampled noisy set of 3D ultrasound imaging from the plurality of 3D ultrasound imaging of eyes.

Example E9 comprises the non-transitory computer-readable storage device of example E7, wherein each member of the plurality of 3D ultrasound imaging of eyes is acquired using dense sampling in x.

Example E10 comprises the non-transitory computer-readable storage device of example E7, wherein each member of the plurality of 3D ultrasound imaging of eyes is acquired using simulated spatial compounding.

Example E11 comprises a machine readable storage device that stores instructions for execution by a processor to perform any of the described operations of examples E6-E9.

Example E12 comprises a machine readable storage device that stores instructions for execution by a processor to perform any of the described operations of examples E6-E8, and E10.

Example E13 comprises an apparatus comprising: a memory; and one or more processors configured to: perform any of the described operations of examples E6-E9.

Example E14 comprises an apparatus comprising: a memory; and one or more processors configured to: perform any of the described operations of examples E6-E8, and E10.

Example I1 comprises a non-transitory computer readable storage device storing instructions that when executed control a processor to perform operations, the operations comprising: accessing 3D ultrasound imaging of an eye represented in cartesian (x, y, z) co-ordinates, wherein the eye has been injected with an intraocular contrast agent that distends Schlemm's canal and collecting channels; converting the 3D ultrasound imaging of an eye represented in cartesian (x, y, z) co-ordinates to a 3D radial ($\theta$, r, z) coordinates volume; and noise reducing the 3D radial ($\theta$, r, z) coordinates volume using at least one of: a rotational frames averaging noise reduction technique, an anisotropic diffusion filter, a non-local mean filter, or a median kernel and center-weighted linear filter noise reduction technique.

Example I2 comprises the non-transitory computer-readable storage device of example I1, wherein the median kernel has dimensions of (5, 3, 3), and the center-weighted linear filter has dimensions of (7, 3, 3).

Example I3 comprises the non-transitory computer-readable storage device of example I1, the operations further comprising noise reducing the 3D radial ($\theta$, r, z) coordinates volume using a deep learning noise reduction model trained on a Schlemm's canal deep learning noise reduction model training set.

Example I4 comprises the non-transitory computer-readable storage device of example I3, wherein the deep learning noise reduction model comprises a generative adversarial network optimized with Wasserstein distance and perceptual loss.

Example I5 comprises a machine readable storage device that stores instructions for execution by a processor to perform any of the described operations of examples I1-I4.

Example I6 comprises an apparatus comprising: a memory; and one or more processors configured to: perform any of the described operations of examples I1-I4.

Example I7 comprises a non-transitory computer readable storage device storing instructions that when executed control a processor to perform operations, the operations comprising: generating a Schlemm's canal deep learning noise reduction model training set.

Example I8 comprises the non-transitory computer-readable storage device of example I7, wherein generating the Schlemm's canal deep learning noise reduction model training set comprises: accessing a plurality of 3D ultrasound imaging of eyes, wherein at least one of the eyes has been injected with an intraocular contrast agent that distends Schlemm's canal and collecting channels; extracting a subsampled noisy set of 3D ultrasound imaging from the plurality of 3D ultrasound imaging of eyes, where the subsampled noisy set comprises fewer members than the plurality of 3D ultrasound imaging of eyes; and generating a noise reduced set of 3D ultrasound imaging by noise reducing each member of the plurality of 3D ultrasound imaging of eyes using rotational frames averaging.

Example I9 comprises the non-transitory computer-readable storage device of example I8, wherein extracting a subsampled noisy set of 3D ultrasound imaging from the plurality of 3D ultrasound imaging of eyes comprises extracting an equally sampled noisy set of 3D ultrasound imaging from the plurality of 3D ultrasound imaging of eyes, or an unequally sampled noisy set of 3D ultrasound imaging from the plurality of 3D ultrasound imaging of eyes.

Example I10 comprises the non-transitory computer-readable storage device of example I8, wherein each member of the plurality of 3D ultrasound imaging of eyes is acquired using dense sampling in x.

Example I11 comprises the non-transitory computer-readable storage device of example I8, wherein each member of the plurality of 3D ultrasound imaging of eyes is acquired using simulated spatial compounding.

Example I12 comprises a machine readable storage device that stores instructions for execution by a processor to perform any of the described operations of examples I7-I10.

Example I13 comprises a machine readable storage device that stores instructions for execution by a processor to perform any of the described operations of examples I7-I9, and I11.

Example I14 comprises an apparatus comprising: a memory; and one or more processors configured to: perform any of the described operations of examples I7-I10.

Example I15 comprises an apparatus comprising: a memory; and one or more processors configured to: perform any of the described operations of examples I7-I9, and I11.

Example F1 comprises a non-transitory computer-readable storage device storing instructions that when executed control at least one processor to perform operations, the operations comprising: accessing a first three-dimensional (3D) ultrasound imaging of an eye, where the first 3D ultrasound imaging defines an anisotropic 3D volume in Cartesian (x, y, z) co-ordinates; extracting a first set of Cartesian two-dimensional (2D) ultrasound images from the first 3D ultrasound imaging, where a member of the first set of Cartesian 2D ultrasound images is represented in (y, z) co-ordinates; providing the first set of Cartesian 2D ultrasound images to a first deep learning anterior chamber (AC) segmentation model configured to generate an anisotropic predicted segmentation volume of an anterior chamber represented in the first 3D ultrasound imaging; receiving, from the first deep learning AC segmentation model, an anisotropic predicted segmentation volume of the AC, where the anisotropic predicted segmentation volume is represented in (x, y, z) co-ordinates; generating a second, different 3D ultrasound imaging by converting the first 3D ultrasound imaging to radial (θ, r, z) co-ordinates, where the second 3D ultrasound imaging defines an isotropic 3D volume in radial (θ, r, z) co-ordinates; extracting a set of radial 2D ultrasound images from the second, different 3D ultrasound imaging, where a member of the set of radial 2D ultrasound images is represented in (r, z) co-ordinates; providing the set of radial 2D ultrasound images to a second, different deep learning AC segmentation model configured to generate an isotropic predicted segmentation volume of the AC represented in the second, different 3D ultrasound imaging; receiving, from the second deep learning AC segmentation model, a first isotropic predicted segmentation volume of the AC, where the first isotropic predicted segmentation volume is represented in (θ, r, z) co-ordinates; converting the anisotropic predicted segmentation volume to a second, different isotropic predicted segmentation volume represented in (θ, r, z) co-ordinates; generating a combined isotropic predicted segmentation volume by computing a weighted average of the first isotropic predicted segmentation volume and the second isotropic predicted segmentation volume; and generating a segmented AC based on the combined isotropic predicted segmentation volume.

Example F2 comprises the non-transitory computer-readable storage device of example F1, wherein the first 3D ultrasound imaging is acquired using 3D ultrasound biomicroscopy (3D-UBM).

Example F3 comprises the non-transitory computer-readable storage device of example F1, wherein extracting the set of radial 2D ultrasound images from the second, different 3D ultrasound imaging comprises extracting, from the second, different 3D ultrasound imaging, 360 (r, z) images at an angle interval of 0.5.

Example F4 comprises the non-transitory computer-readable storage device of example F1, wherein the first deep learning AC segmentation model is trained on a set of 2D (y, z) images extracted from a plurality of anisotropic Cartesian 3D ultrasound imaging eye volumes represented in (x, y, z) co-ordinates, where each member of the plurality of anisotropic Cartesian 3D ultrasound imaging eye volumes has an associated AC ground truth.

Example F5 comprises the non-transitory computer-readable storage device of example F4, wherein the second deep learning AC segmentation model is trained on a set of radial 2D (r, z) images extracted from a plurality of isotropic radial 3D ultrasound imaging eye volumes generated by converting the plurality of anisotropic Cartesian 3D ultrasound imaging eye volumes to radial (θ, r, z) co-ordinates.

Example F6 comprises the non-transitory computer-readable storage device of example F1, wherein the first deep learning AC segmentation model comprises a convolutional neural network (CNN) having a fully convolutional network architecture.

Example F7 comprises the non-transitory computer-readable storage device of example F6, wherein the first deep learning AC segmentation model is optimized to reduce a loss function associated with the first deep learning AC segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Example F8 comprises the non-transitory computer-readable storage device of example F1, wherein the second, deep learning AC segmentation model comprises a convolutional neural network (CNN) having a fully convolutional network architecture.

Example F9 comprises the non-transitory computer-readable storage device of example F8, wherein the second deep learning AC segmentation model is optimized to reduce a loss function associated with the second deep learning AC segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Example F10 comprises the non-transitory computer-readable storage device of example F1, the operations further comprising training at least one of the first deep learning AC segmentation model or the second deep learning AC segmentation model, wherein training the at least one of the first deep learning AC segmentation model or the second deep learning AC segmentation model comprises: accessing an anterior chamber training set, wherein the anterior chamber training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes has an associated anterior chamber ground truth; extracting a set of training 2D (y, z) images from the anterior chamber training set; training the first deep learning AC segmentation model with the set of training 2D (y, z) images and associated anterior chamber ground truth; generating a plurality of isotropic radial 3D ultrasound imaging eye volumes by converting the plurality of training anisotropic Cartesian 3D ultrasound imaging eye volumes to radial (θ, r, z) co-ordinates; extracting a set of training radial 2D (r, z) images from the plurality of isotropic radial 3D ultrasound imaging eye volumes; and training the second deep learning AC segmentation model with the set of training radial 2D (r, z) images and associated anterior chamber ground truth.

Example F11 comprises the non-transitory computer-readable storage device of example F10, wherein training the first deep learning AC segmentation model with the set of training 2D (y, z) images comprises at least optimizing the first deep learning AC segmentation model to reduce a loss function associated with the first deep learning AC segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example F12 comprises the non-transitory computer-readable storage device of example F10, wherein training the second deep learning AC segmentation model with the set of training radial 2D (r, z) images comprises at least optimizing the second deep learning AC segmentation model to reduce a loss function associated with the second deep learning AC segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example F13 comprises the non-transitory computer-readable storage device of example F10, wherein each member of the plurality of training anisotropic Cartesian 3D ultrasound imaging eye volumes is acquired using 3D ultrasound biomicroscopy (3D-UBM) imaging.

Example F14 comprises a machine readable storage device that stores instructions for execution by a processor to perform any of the described operations of examples F1-13.

Example F15 comprises an apparatus comprising: a memory; and one or more processors configured to: perform any of the described operations of examples F1-13.

Example F16 comprises a non-transitory computer-readable storage device storing instructions that when executed control at least one processor to perform operations, the operations comprising: accessing an anterior chamber training set, wherein the anterior chamber training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes has an associated anterior chamber ground truth; extracting a set of training 2D (y, z) images from the anterior chamber training set; training a first deep learning AC segmentation model configured to generate an anisotropic predicted segmentation volume of an anterior chamber with the set of training 2D (y, z) images and associated anterior chamber ground truth; generating a plurality of isotropic radial 3D ultrasound imaging eye volumes by converting the plurality of training anisotropic Cartesian 3D ultrasound imaging eye volumes to radial (θ, r, z) co-ordinates; extracting a set of training radial 2D (r, z) images from the plurality of isotropic radial 3D ultrasound imaging eye volumes; and training a second deep learning AC segmentation model configured to generate an isotropic predicted segmentation volume of an AC with the set of training radial 2D (r, z) images and associated anterior chamber ground truth.

Example F17 comprises the non-transitory computer-readable storage device of example F16, wherein training the first deep learning AC segmentation model with the set of training 2D (y, z) images comprises at least optimizing the first deep learning AC segmentation model to reduce a loss function associated with the first deep learning AC segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example F18 comprises the non-transitory computer-readable storage device of example F16, wherein training the second deep learning AC segmentation model with the set of training radial 2D (r, z) images comprises at least optimizing the second deep learning AC segmentation model to reduce a loss function associated with the second deep learning AC segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example F19 comprises the non-transitory computer-readable storage device of example F16, wherein each member of the plurality of training anisotropic Cartesian 3D ultrasound imaging eye volumes is acquired using 3D ultrasound biomicroscopy (3D-UBM) imaging.

Example F20 comprises a machine readable storage device that stores instructions for execution by a processor to perform any of the described operations of examples F16-19.

Example F21 comprises an apparatus comprising: a memory; and one or more processors configured to: perform any of the described operations of examples F16-19.

Example G1 comprises a non-transitory computer-readable storage device storing instructions that when executed control a processor to perform operations for determining a location of a scleral spur represented in ultrasound imaging, the operations comprising: accessing a 2D radial view ultrasound image of an eye, and a segmented anterior chamber associated with the 2D radial view, wherein the 2D radial view ultrasound image comprises a plurality of pixels, a pixel having an associated grayscale intensity; defining an inner corneal fitting curve based on the 2D radial view and the segmented anterior chamber; selecting a first point i on the inner corneal fitting curve; selecting a second, different point i+1 on the inner corneal fitting curve; computing a first sum S(i) of pixel grayscale intensity values along a first line normal to the tangent of the inner corneal fitting curve at the first point i; computing a second sum S(i+1) of pixel grayscale intensity values along a second line normal to the tangent of the inner corneal fitting curve at the second point i+1; determining a location of Schwalbe's line represented in the 2D radial view, wherein determining the location of Schwalbe's line comprises finding where on the inner corneal fitting line S(i)–S(i+1) is greater than a preset threshold; determining a location of a scleral spur represented in the 2D radial view, wherein determining the location of the scleral spur comprises locating a point on the inner corneal fitting curve a first distance posterior to the location of Schwalbe's line.

Example G2 comprises the non-transitory computer-readable storage device of claim G1, wherein the first line extends 0.1 mm toward the outer cornea from the first point, and wherein the second line extends 0.1 mm toward the outer cornea from the second point.

Example G3 comprises the non-transitory computer-readable storage device of claim G1, wherein the preset threshold is a grayscale pixel intensity level threshold based on an intensity level of the 2D radial view ultrasound image or the entire 3D image.

Example G4 comprises the non-transitory computer-readable storage device of claim G1, wherein the first distance is 1 mm.

Example G5 comprises a machine readable storage device that stores instructions for execution by a processor to perform any of the described operations of examples G1-4.

Example G6 comprises an apparatus comprising: a memory; and one or more processors configured to: perform any of the described operations of examples G1-4.

Example H1 comprises a non-transitory computer-readable storage device storing instructions that when executed control at least one processor to perform operations, the operations comprising: accessing a first three-dimensional (3D) ultrasound imaging of a region of interest (ROI) associated with a patient, where the ROI comprises an ocular abnormality of a human eye, where the first 3D ultrasound imaging defines an anisotropic 3D volume in Cartesian (x, y, z) co-ordinates; extracting a first set of Cartesian two-dimensional (2D) ultrasound images from the first 3D ultrasound imaging, where a member of the first set of Cartesian 2D ultrasound images is represented in (y, z) co-ordinates; providing the first set of Cartesian 2D ultrasound images to a first deep learning ocular abnormality segmentation model configured to generate an anisotropic predicted segmentation volume of an ocular abnormality; receiving, from the first deep learning ocular abnormality segmentation model, an anisotropic predicted segmentation volume of the ocular abnormality, where the anisotropic predicted segmentation volume is represented in (x, y, z) co-ordinates; generating a second, different 3D ultrasound imaging by converting the first 3D ultrasound imaging to radial ($\theta$, r, z) co-ordinates, where the second 3D ultrasound imaging defines an isotropic 3D volume in radial ($\theta$, r, z) co-ordinates; extracting a set of radial 2D ultrasound images from the second, different 3D ultrasound imaging, where a member of the set of radial 2D ultrasound images is represented in (r, z) co-ordinates; providing the set of radial 2D ultrasound images to a second, different deep learning ocular abnormality segmentation model configured to generate an isotropic predicted segmentation volume of an ocular abnormality; receiving, from the second deep learning ocular abnormality segmentation model, a first isotropic predicted segmentation volume of the ocular abnormality, where the first isotropic predicted segmentation volume is represented in ($\theta$, r, z) co-ordinates; converting the anisotropic predicted segmentation volume to a second, different isotropic predicted segmentation volume represented in ($\theta$, r, z) co-ordinates; generating a combined isotropic predicted segmentation volume by computing a weighted average of the first isotropic predicted segmentation volume and the second isotropic predicted segmentation volume; and generating a segmented ocular abnormality based on the combined isotropic predicted segmentation volume.

Example H2 comprises the non-transitory computer-readable storage device of example H1, wherein the first 3D ultrasound imaging is acquired using 3D ultrasound biomicroscopy (3D-UBM) imaging.

Example H3 comprises the non-transitory computer-readable storage device of example H1, wherein extracting the set of radial 2D ultrasound images from the second, different 3D ultrasound imaging comprises extracting, from the second, different 3D ultrasound imaging, 360 (r, z) images at an angle interval of 0.5.

Example H4 comprises the non-transitory computer-readable storage device of example H1, wherein the first deep learning ocular abnormality segmentation model is trained on a set of 2D (y, z) images extracted from a plurality of anisotropic Cartesian 3D ultrasound imaging eye volumes represented in (x, y, z) co-ordinates, where each member of the plurality of anisotropic Cartesian 3D ultrasound imaging eye volumes is associated with a patient, respectively, and where each member of the plurality of anisotropic Cartesian 3D ultrasound imaging eye volumes has an associated ocular abnormality ground truth.

Example H5 comprises the non-transitory computer-readable storage device of example H4, wherein the second deep learning ocular abnormality segmentation model is trained on a set of radial 2D (r, z) images extracted from a plurality of isotropic radial 3D ultrasound imaging eye volumes generated by converting the plurality of anisotropic Cartesian 3D ultrasound imaging eye volumes to radial ($\theta$, r, z) co-ordinates.

Example H6 comprises the non-transitory computer-readable storage device of example H1, wherein the first deep learning ocular abnormality segmentation model comprises a convolutional neural network (CNN) having a fully convolutional network architecture.

Example H7 comprises the non-transitory computer-readable storage device of example H6, wherein the first deep learning ocular abnormality segmentation model is optimized to reduce a loss function associated with the first deep learning ocular abnormality segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Example H8 comprises the non-transitory computer-readable storage device of example H1, wherein the second deep learning ocular abnormality segmentation model comprises a convolutional neural network (CNN) having a fully convolutional network architecture.

Example H9 comprises the non-transitory computer-readable storage device of example H8, wherein the second deep learning ocular abnormality segmentation model is optimized to reduce a loss function associated with the second deep learning ocular abnormality segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Example H10 comprises the non-transitory computer-readable storage device of example H1, the operations further comprising training at least one of the first deep learning ocular abnormality segmentation model or the second deep learning ocular abnormality segmentation model, wherein training the at least one of the first deep learning ocular abnormality segmentation model or the second deep learning ocular abnormality segmentation model comprises: accessing an ocular abnormality training set, wherein the ocular abnormality training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes is associated with a patient, respectively, wherein each member of the plurality of training anisotropic Cartesian 3D ultrasound imaging eye volumes has an associated ocular abnormality ground truth; extracting a set of training 2D (y, z) images from the ocular abnormality training set; training the first deep learning ocular abnormality segmentation model with the set of training 2D (y, z) images and associated anterior chamber ground truth; generating a plurality of isotropic radial 3D ultrasound imaging eye volumes by converting the plurality of training anisotropic Cartesian 3D ultrasound imaging eye volumes to radial ($\theta$, r, z) co-ordinates; extracting a set of training radial 2D (r, z) images from the plurality of isotropic radial 3D ultrasound imaging eye volumes; and training the second deep learning ocular abnormality segmentation model with the set of training radial 2D (r, z) images and associated ocular abnormality ground truth.

Example H11 comprises the non-transitory computer-readable storage device of example H10, wherein training the first deep learning ocular abnormality segmentation model with the set of training 2D (y, z) images comprises at least optimizing the first deep learning ocular abnormality segmentation model to reduce a loss function associated with the first deep learning ocular abnormality segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example H12 comprises the non-transitory computer-readable storage device of example H11, wherein training the second deep learning ocular abnormality segmentation model with the set of training radial 2D (r, z) images comprises at least optimizing the second deep learning ocular abnormality segmentation model to reduce a loss function associated with the second deep learning ocular abnormality segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example H13 comprises the non-transitory computer-readable storage device of example H10, wherein each member of the plurality of training anisotropic Cartesian 3D ultrasound imaging eye volumes is acquired using 3D ultrasound biomicroscopy (3D-UBM) imaging.

Example H14 comprises a machine readable storage device that stores instructions for execution by a processor to perform any of the described operations of examples H1-13.

Example H15 comprises an apparatus comprising: a memory; and one or more processors configured to: perform any of the described operations of examples H1-13.

Example H16 comprises a non-transitory computer-readable storage device storing instructions that when executed control at least one processor to perform operations, the operations comprising: accessing an ocular abnormality training set, wherein the ocular abnormality training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes is associated with a patient, respectively, wherein each member of the plurality of training anisotropic Cartesian 3D ultrasound imaging eye volumes has an associated ocular abnormality ground truth; extracting a set of training 2D (y, z) images from the ocular abnormality training set; training a first deep learning ocular abnormality segmentation model configured to generate an anisotropic predicted segmentation volume of an ocular abnormality with the set of training 2D (y, z) images and associated ocular abnormality ground truth; generating a plurality of isotropic radial 3D ultrasound imaging eye volumes by converting the plurality of training anisotropic Cartesian 3D ultrasound imaging eye volumes to radial ($\theta$, r, z) co-ordinates; extracting a set of training radial 2D (r, z) images from the plurality of isotropic radial 3D ultrasound imaging eye volumes; and training a second deep learning ocular abnormality segmentation model configured to generate an isotropic predicted segmentation volume of an ocular abnormality with the set of training radial 2D (r, z) images and associated ocular abnormality ground truth.

Example H17 comprises the non-transitory computer-readable storage device of example H16, wherein training the first deep learning ocular abnormality segmentation model with the set of training 2D (y, z) images comprises at least optimizing the first deep learning ocular abnormality segmentation model to reduce a loss function associated with the first deep learning ocular abnormality segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example H18 comprises the non-transitory computer-readable storage device of example H16, wherein training the second deep learning ocular abnormality segmentation model with the set of training radial 2D (r, z) images comprises at least optimizing the second deep learning ocular abnormality segmentation model to reduce a loss function associated with the second deep learning ocular abnormality segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example H19 comprises the non-transitory computer-readable storage device of example H16, wherein each member of the plurality of training anisotropic Cartesian 3D ultrasound imaging eye volumes is acquired using 3D ultrasound biomicroscopy (3D-UBM) imaging.

Example $H_2O$ comprises a machine readable storage device that stores instructions for execution by a processor to perform any of the described operations of examples H16-19.

Example H21 comprises an apparatus comprising: a memory; and one or more processors configured to: perform any of the described operations of examples H16-19.

Example J1 comprises a non-transitory computer-readable storage device storing instructions that when executed control at least one processor to perform operations, the operations comprising: accessing a first three-dimensional (3D) ultrasound imaging of an eye, where the first 3D ultrasound imaging defines an anisotropic 3D volume in Cartesian (x, y, z) co-ordinates, wherein the eye has been injected with an intraocular contrast agent that distends Schlemm's canal or collecting channels; extracting a first set of Cartesian two-dimensional (2D) ultrasound images from the first 3D ultrasound imaging, where a member of the first set of Cartesian 2D ultrasound images is represented in (y, z) co-ordinates; providing the first set of Cartesian 2D ultrasound images to a first deep learning Schlemm's canal segmentation model configured to generate an anisotropic predicted segmentation volume of a Schlemm's canal represented in the first 3D ultrasound imaging; receiving, from the first deep learning Schlemm's canal segmentation model, an anisotropic predicted segmentation volume of the Schlemm's canal, where the anisotropic predicted segmentation volume is represented in (x, y, z) co-ordinates; generating a second, different 3D ultrasound imaging by converting the first 3D ultrasound imaging to radial ($\theta$, r, z) co-ordinates, where the second 3D ultrasound imaging defines an isotropic 3D volume in radial ($\theta$, r, z) co-ordinates; extracting a set of radial 2D ultrasound images from the second, different 3D ultrasound imaging, where a member of the set of radial 2D ultrasound images is represented in (r, z) co-ordinates; providing the set of radial 2D ultrasound images to a second, different deep learning Schlemm's canal segmentation model configured to generate an isotropic predicted segmentation volume of the Schlemm's canal represented in the second, different 3D ultrasound imaging; receiving, from the second deep learning Schlemm's canal segmentation model, a first isotropic predicted segmentation volume of the Schlemm's canal, where the first isotropic predicted segmentation volume is represented in (θ, r, z) co-ordinates;

converting the anisotropic predicted segmentation volume to a second, different isotropic predicted segmentation volume represented in (θ, r, z) co-ordinates; generating a combined isotropic predicted segmentation volume by computing a weighted average of the first isotropic predicted segmentation volume and the second isotropic predicted segmentation volume; and generating a segmented Schlemm's canal based on the combined isotropic predicted segmentation volume.

Example J2 comprises the non-transitory computer-readable storage device of example J1, wherein the first 3D ultrasound imaging is acquired using 3D ultrasound biomicroscopy (3D-UBM) imaging.

Example J3 comprises the non-transitory computer-readable storage device of example J1, wherein extracting the set of radial 2D ultrasound images from the second, different 3D ultrasound imaging comprises extracting, from the second, different 3D ultrasound imaging, 360 (r, z) images at an angle interval of 0.5.

Example J4 comprises the non-transitory computer-readable storage device of example J1, wherein the first deep learning Schlemm's canal segmentation model is trained on a set of 2D (y, z) images extracted from a plurality of anisotropic Cartesian 3D ultrasound imaging eye volumes represented in (x, y, z) co-ordinates, where each member of the plurality of anisotropic Cartesian 3D ultrasound imaging eye volumes has an associated Schlemm's canal ground truth, where each member of the plurality of anisotropic Cartesian 3D ultrasound eye volumes represents an eye that has been injected with an intraocular contrast agent that distends Schlemm's canal or collecting channels.

Example J5 comprises the non-transitory computer-readable storage device of example J4, wherein the second deep learning Schlemm's canal segmentation model is trained on a set of radial 2D (r, z) images extracted from a plurality of isotropic radial 3D ultrasound imaging eye volumes generated by converting the plurality of anisotropic Cartesian 3D ultrasound imaging eye volumes to radial (θ, r, z) co-ordinates.

Example J6 comprises the non-transitory computer-readable storage device of example J1, wherein the first deep learning Schlemm's canal segmentation model comprises a convolutional neural network (CNN) having a fully convolutional network architecture.

Example J7 comprises the non-transitory computer-readable storage device of example J6, wherein the first deep learning Schlemm's canal segmentation model is optimized to reduce a loss function associated with the first deep learning Schlemm's canal segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Example J8 comprises the non-transitory computer-readable storage device of example J1, wherein the second deep learning Schlemm's canal segmentation model comprises a convolutional neural network (CNN) having a fully convolutional network architecture.

Example J9 comprises the non-transitory computer-readable storage device of example J8, wherein the second deep learning Schlemm's canal segmentation model is optimized to reduce a loss function associated with the second deep learning Schlemm's canal segmentation model using at least one of: a stochastic gradient descent loss function optimization technique, an RMSprop loss function optimization technique, an Adagrad loss function optimization technique, an Adadelta loss function optimization technique, or Adam loss function optimization technique.

Example J10 comprises the non-transitory computer-readable storage device of example J1, the operations further comprising training at least one of the first deep learning Schlemm's canal segmentation model or the second deep learning Schlemm's canal segmentation model, wherein training the at least one of the first deep learning Schlemm's canal segmentation model or the second deep learning Schlemm's canal segmentation model comprises: accessing a Schlemm's canal training set, wherein the Schlemm's canal training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes has an associated Schlemm's canal ground truth, wherein each member of the plurality of training anisotropic Cartesian 3D ultrasound imaging eye volumes represents an eye that has been injected with an intraocular contrast agent that distends Schlemm's canal or collecting channels; extracting a set of training 2D (y, z) images from the Schlemm's canal training set; training the first deep learning Schlemm's canal segmentation model with the set of training 2D (y, z) images and associated anterior chamber ground truth; generating a plurality of isotropic radial 3D ultrasound imaging eye volumes by converting the plurality of training anisotropic Cartesian 3D ultrasound imaging eye volumes to radial (θ, r, z) co-ordinates; extracting a set of training radial 2D (r, z) images from the plurality of isotropic radial 3D ultrasound imaging eye volumes; and training the second deep learning Schlemm's canal segmentation model with the set of training radial 2D (r, z) images and associated anterior chamber ground truth.

Example J11 comprises the non-transitory computer-readable storage device of example J10, wherein training the first deep learning Schlemm's canal segmentation model with the set of training 2D (y, z) images comprises at least optimizing the first deep learning Schlemm's canal segmentation model to reduce a loss function associated with the first deep learning Schlemm's canal segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example J12 comprises the non-transitory computer-readable storage device of example J10, wherein training the second deep learning Schlemm's canal segmentation model with the set of training radial 2D (r, z) images comprises at least optimizing the second deep learning Schlemm's canal segmentation model to reduce a loss function associated with the second deep learning Schlemm's canal segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example J13 comprises the non-transitory computer-readable storage device of example J10, wherein each member of the plurality of training anisotropic Cartesian 3D ultrasound imaging eye volumes is acquired using 3D ultrasound biomicroscopy (3D-UBM) imaging.

Example J14 comprises a machine readable storage device that stores instructions for execution by a processor to perform any of the described operations of examples J1-13.

Example J15 comprises an apparatus comprising: a memory; and one or more processors configured to: perform any of the described operations of examples J1-13.

Example J16 comprises a non-transitory computer-readable storage device storing instructions that when executed control at least one processor to perform operations, the operations comprising: accessing a Schlemm's canal training set, wherein the Schlemm's canal training set comprises a plurality of training anisotropic Cartesian 3D ultrasound imaging eye volumes represented in (x, y, z) co-ordinates, wherein each member of the plurality of training anisotropic Cartesian 3D ultrasound imaging eye volumes has an associated Schlemm's canal ground truth, wherein each member of the plurality of training anisotropic Cartesian 3D ultrasound eye volumes represents an eye that has been injected with an intraocular contrast agent that distends Schlemm's canal or collecting channels; extracting a set of training 2D (y, z) images from the Schlemm's canal training set; training a first deep learning Schlemm's canal segmentation model configured to generate an anisotropic predicted segmentation volume of an anterior chamber with the set of training 2D (y, z) images and associated anterior chamber ground truth; generating a plurality of isotropic radial 3D ultrasound imaging eye volumes by converting the plurality of training anisotropic Cartesian 3D ultrasound imaging eye volumes to radial (θ, r, z) co-ordinates; extracting a set of training radial 2D (r, z) images from the plurality of isotropic radial 3D ultrasound imaging eye volumes; and training a second deep learning Schlemm's canal segmentation model configured to generate an isotropic predicted segmentation volume of a Schlemm's canal with the set of training radial 2D (r, z) images and associated Schlemm's canal ground truth.

Example J17 comprises the non-transitory computer-readable storage device of example J16, wherein training the first deep learning Schlemm's canal segmentation model with the set of training 2D (y, z) images comprises at least optimizing the first deep learning Schlemm's canal segmentation model to reduce a loss function associated with the first deep learning Schlemm's canal segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example J18 comprises the non-transitory computer-readable storage device of example J16, wherein training the second deep learning Schlemm's canal segmentation model with the set of training radial 2D (r, z) images comprises at least optimizing the second deep learning Schlemm's canal segmentation model to reduce a loss function associated with the second deep learning Schlemm's canal segmentation model using at least one of: a stochastic gradient descent loss function optimization technique, an RMSprop loss function optimization technique, an Adagrad loss function optimization technique, an Adadelta loss function optimization technique, or an Adam loss function optimization technique.

Example J19 comprises the non-transitory computer-readable storage device of example J16, wherein each member of the plurality of training anisotropic Cartesian 3D ultrasound imaging eye volumes is acquired using 3D ultrasound biomicroscopy (3D-UBM) imaging.

Example J20 comprises a machine readable storage device that stores instructions for execution by a processor to perform any of the described operations of examples J16-19.

Example J21 comprises an apparatus comprising: a memory; and one or more processors configured to: perform any of the described operations of examples J16-19.

What is claimed is:

1. An apparatus comprising:
    a memory configured to store instructions that when executed control a processor to perform operations;
    an input/output (I/O) interface;
    one or more processors;
    an interface that connects the memory, the I/O interface, and the one or more processors, the one or more processors configured to:
        access three-dimensional (3D) ultrasound imaging of an eye;
        generate at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging, wherein the at least one segmented ocular structure comprises at least one segmented anterior chamber;
        compute an iridocorneal angle based on a trabecular-iris angle (TIA) of the at least one segmented anterior chamber; and
        display at least one of: the at least one segmented anterior chamber, iridocorneal angle, the 3D ultrasound imaging, or the at least one portion of the 3D ultrasound imaging.

2. The apparatus of claim 1, wherein the one or more processors are configured to align the at least one portion of the 3D ultrasound imaging to reduce misalignment among the 3D ultrasound imaging; wherein aligning the at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique.

3. The apparatus of claim 1, wherein the one or more processors are configured to noise-reduce the 3D ultrasound imaging, wherein the noise-reducing of the 3D ultrasound imaging comprises noise-reducing the at least one portion of the 3D ultrasound imaging using at least one of: a rotational frames averaging noise reduction technique, an edge preserving filters noise reduction technique, a median kernel and center-weighted linear filter noise reduction technique, or at least one deep learning noise reduction model, wherein the at least one deep learning noise reduction model is trained on a deep learning noise reduction model training set.

4. The apparatus of claim 3, wherein the one or more processors are configured to train the at least one deep learning noise reduction model.

5. The apparatus of claim 4, wherein the one or more processors are configured to generate the deep learning noise reduction model training set, wherein training the deep learning noise reduction model comprises training the at least one deep learning noise reduction model with the deep learning noise reduction model training set.

6. The apparatus of claim 5, wherein the at least one ocular structure comprises a Schlemm's canal and collecting channels, wherein generating the deep learning noise reduction model training set comprises generating a Schlemm's canal enhanced noise reduction training set comprising at least one set of 3D ultrasound imaging of the eye, wherein the eye has been injected with an intraocular contrast agent that distends the Schlemm's canal or the collecting channels.

7. The apparatus of claim 1, wherein the at least one deep learning ocular structure segmentation model comprises at least one of:
a first deep learning ocular structure segmentation model configured to accept at least one portion of the 3D ultrasound imaging in Cartesian (x, y, z) coordinates as an input, and configured to generate a first predicted segmentation volume of the at least one ocular structure based on the at least one portion of the 3D ultrasound imaging in Cartesian (x, y, z) coordinates; or
a second, different deep learning ocular structure segmentation model configured to accept at least one portion of the 3D ultrasound imaging in (θ, r, z) coordinates as an input, and configured to generate a second predicted segmentation volume of the at least one ocular structure based on the at least one portion of the 3D ultrasound imaging in (θ, r, z) coordinates.

8. The apparatus of claim 7, wherein the at least one deep learning ocular structure segmentation model comprises both the first deep learning ocular structure segmentation model and the second deep learning ocular structure segmentation model, and wherein generating the at least one segmented ocular structure further comprises computing a weighted average of the first predicted segmentation volume and the second predicted segmentation volume.

9. The apparatus of claim 1, wherein:
computing the iridocorneal angle comprises:
detecting an apex of the at least one segmented anterior chamber;
fitting an inner corneal fitting curve to a corneal boundary represented in the at least one portion of the 3D ultrasound imaging based on the segmented anterior chamber;
determining a location of Schwalbe's line represented in the at least one portion of the 3D ultrasound imaging based on the inner corneal fitting curve;
locating a scleral spur represented in the at least one portion of the 3D ultrasound imaging based on the location of Schwalbe's line;
computing at least one of: an angle-opening distance 250 μm (AOD 250), or an AOD 500 μm (AOD 500), based on the scleral spur, the inner corneal fitting curve, and an iris represented in the at least one portion of the 3D ultrasound imaging;
computing the TIA based on the apex of the segmented anterior chamber and the AOD 250 or the AOD 500; and
computing the iridocorneal angle based on the TIA.

10. The apparatus of claim 1, wherein the at least one ocular structure comprises at least one ocular abnormality, and wherein the at least one deep learning ocular structure segmentation model comprises at least one deep learning ocular abnormality segmentation model trained on an ocular abnormality training set.

11. The apparatus of claim 10, wherein the at least one clinical metric comprises at least one of: a location of the ocular abnormality, a volume of the ocular abnormality, an area of the ocular abnormality, or a length of the ocular abnormality.

12. A non-transitory computer-readable storage device storing computer-executable instructions that when executed control a processor to perform operations, the operations comprising:
accessing three-dimensional (3D) ultrasound imaging of an eye;
generating at least one segmented ocular structure by segmenting at least one ocular structure represented in the 3D ultrasound imaging using at least one deep learning ocular structure segmentation model configured to generate a predicted segmentation volume of the at least one ocular structure based on at least one portion of the 3D ultrasound imaging, wherein the at least one deep learning ocular structure segmentation model comprises a first deep learning ocular structure segmentation model based on Cartesian coordinates and a second deep learning ocular structure segmentation model based on polar coordinates, and wherein the at least one segmented ocular structure is generated with a weighted average of outputs from the first deep learning ocular structure segmentation model and the second deep learning ocular structure segmentation model;
computing at least one clinical metric associated with the at least one segmented ocular structure based on the at least one segmented ocular structure; and
displaying at least one of: the at least one segmented ocular structure, the at least one clinical metric, the 3D ultrasound imaging, or the at least one portion of the 3D ultrasound imaging.

13. The non-transitory computer-readable storage device of claim 12, wherein:
the operations comprise aligning the at least one portion of the 3D ultrasound imaging to reduce misalignment among the 3D ultrasound imaging; and
aligning the at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique.

14. The non-transitory computer-readable storage device of claim 12, wherein:
the operations comprise noise-reducing the 3D ultrasound imaging, wherein the noise-reducing of the 3D ultrasound imaging comprises noise-reducing the at least one portion of the 3D ultrasound imaging using at least one of: a rotational frames averaging noise reduction technique, an edge preserving filters noise reduction technique, a median kernel and center-weighted linear filter noise reduction technique, or a deep learning noise reduction model;
the operations comprise training the deep learning noise reduction model;
the operations comprise generating a deep learning noise reduction model training set, wherein training the deep learning noise reduction model comprises training the deep learning noise reduction model with the deep learning noise reduction model training set;

the at least one ocular structure comprises a Schlemm's canal and collecting ducts;

generating the deep learning noise reduction model training set comprises generating a Schlemm's canal enhanced training set comprising at least a set of noise-reduced 3D ultrasound imaging of the eye; and the eye has been injected with an intraocular contrast agent.

15. The non-transitory computer-readable storage device of claim 12, wherein the first deep learning ocular structure segmentation model is configured to accept at least one portion of the 3D ultrasound imaging in Cartesian (x, y, z) coordinates as an input, and to generate a first predicted segmentation volume of the at least one ocular structure based on the at least one portion of the 3D ultrasound imaging in Cartesian (x, y, z) coordinates; and the second deep learning ocular structure segmentation model configured to accept at least one portion of the 3D ultrasound imaging in (θ, r, z) coordinates as an input, and to generate a second predicted segmentation volume of the at least one ocular structure based on the at least one portion of the 3D ultrasound imaging in (θ, r, z) coordinates.

16. The non-transitory computer-readable storage device of claim 15, wherein the weighted average output of the first deep learning ocular structure segmentation model and the second deep learning ocular structure segmentation mode are used to predict the first predicted segmentation volume and the second predicted segmentation volume, respectively.

17. The non-transitory computer-readable storage device of claim 12, wherein the at least one ocular structure comprises an anterior chamber, and wherein the at least one deep learning ocular structure segmentation model comprises at least one deep learning anterior chamber segmentation model trained on an anterior chamber training set.

18. The non-transitory computer-readable storage device of claim 17, wherein the at least one clinical metric comprises at least one of: an iridocorneal angle, a volume of the anterior chamber, or an area of the anterior chamber.

19. The non-transitory computer-readable storage device of claim 12, wherein:

the at least one clinical metric comprises an iridocorneal angle;

the at least one segmented ocular structure comprises a segmented anterior chamber; and computing the at least one clinical metric associated with the at least one segmented ocular structure based on the at least one segmented ocular structure comprises:

detecting an apex of the segmented anterior chamber;

fitting an inner corneal fitting curve to a corneal boundary represented in the at least one portion of the 3D ultrasound imaging based on the segmented anterior chamber;

determining a location of Schwalbe's line represented in the at least one portion of the 3D ultrasound imaging based on the inner corneal fitting curve;

locating a scleral spur represented in the at least one portion of the 3D ultrasound imaging based on the location of Schwalbe's line;

computing at least one of: an angle-opening distance 250 μm (AOD 250), or an AOD 500 μm (AOD 500), based on the scleral spur, the inner corneal fitting curve, and an iris represented in the at least one portion of the 3D ultrasound imaging;

computing a trabecular-iris-angle (TIA) based on the apex of the segmented anterior chamber and the AOD 250 or the AOD 500; and computing the iridocorneal angle based on the TIA.

20. The non-transitory computer-readable storage device of claim 12, wherein the at least one ocular structure comprises at least one ocular abnormality, and wherein the at least one deep learning ocular structure segmentation model comprises at least one deep learning ocular abnormality segmentation model trained on an ocular abnormality training set.

21. The non-transitory computer-readable storage device of claim 12, wherein the operations comprise:

training the at least one deep learning ocular structure segmentation model; and generating at least one deep learning ocular segmentation model training set, wherein the at least one deep learning ocular segmentation model training set comprises an anterior chamber training set, an ocular abnormality training set, or a Schlemm's canal training set.

22. An apparatus that facilitates segmentation of ocular structures represented in three dimensional (3D) ultrasound imaging, the apparatus comprising:

a processor;

a memory configured to store a 3D ultrasound imaging of an eye;

an input/output (I/O) interface;

a set of circuits; and an interface that connects the processor, the memory, the I/O interface, and the set of circuits, the set of circuits configured to:

access the 3D ultrasound imaging;

noise-reduce the 3D ultrasound imaging using at least one deep learning noise reduction model;

segment a Schlemm's canal and collecting ducts represented in the 3D ultrasound imaging using at least one deep learning ocular structure segmentation model configured to generate a predicted segmentation volume of the Schlemm's canal and collecting ducts based on at least one portion of the noise-reduced 3D ultrasound imaging, wherein the at least one deep learning ocular structure segmentation model is trained on at least one image of an eye injected with an intraocular contrast agent;

compute at least one clinical metric associated with the at least one segmented ocular structure based on the at least one segmented ocular structure; and output a visual representation of at least one of: the at least one segmented ocular structure, the at least one clinical metric, the 3D ultrasound imaging, or the at least one portion of the 3D ultrasound imaging.

23. The apparatus of claim 22, wherein pre-processing the 3D ultrasound imaging comprises aligning the at least one portion of the 3D ultrasound imaging to reduce misalignment among the 3D ultrasound imaging; wherein aligning the at least one portion of the 3D ultrasound imaging comprises aligning the at least one portion of the 3D ultrasound imaging using at least one of: a pairwise alignment technique, a pairwise-model alignment technique, a pairwise-orthogonal alignment technique, a full-orthogonal alignment technique, or a 3D grayscale alignment with a normalized cross correlation objective function technique.

24. The apparatus of claim 22, wherein the at least one deep learning ocular structure segmentation model comprises at least one of:

a first deep learning ocular structure segmentation model configured to accept at least one portion of the 3D ultrasound imaging in Cartesian (x, y, z) coordinates as an input, and configured to generate a first predicted segmentation volume of the ocular structure based on the at least one portion of the 3D ultrasound imaging in Cartesian (x, y, z) coordinates; or a second, different deep learning ocular structure segmentation model configured to accept at least one portion of the 3D ultrasound imaging in (ft r, z) coordinates as an input, and configured to generate a second predicted segmentation volume of the ocular structure based on the at least one portion of the 3D ultrasound imaging in (ft r, z) coordinates.

25. The apparatus of claim 24, wherein the at least one deep learning ocular structure segmentation model comprises both the first deep learning ocular structure segmentation model and the second deep learning ocular structure segmentation model, and wherein generating the at least one segmented ocular structure comprises computing a weighted average of the first predicted segmentation volume and the second predicted segmentation volume.

26. The apparatus of claim 22, wherein the at least one ocular structure comprises at least one of: an anterior chamber, a Schlemm's canal and collecting channels, or an ocular abnormality.

* * * * *